United States Patent [19]
Ueda et al.

[11] Patent Number: 5,953,459
[45] Date of Patent: Sep. 14, 1999

[54] DITHER MATRIX PRODUCING METHOD

[75] Inventors: Masashi Ueda; Ryohei Komiya, both of Nagoya, Japan

[73] Assignee: Brother Kogyo Kabushiki Kaisha, Nagoya, Japan

[21] Appl. No.: 08/803,959

[22] Filed: Feb. 21, 1997

[30]    Foreign Application Priority Data

| Feb. 23, 1996 | [JP] | Japan | 8-036760 |
| Feb. 23, 1996 | [JP] | Japan | 8-036761 |
| Feb. 23, 1996 | [JP] | Japan | 8-036762 |
| Apr. 1, 1996 | [JP] | Japan | 8-078930 |
| Apr. 4, 1996 | [JP] | Japan | 8-082870 |
| May 7, 1996 | [JP] | Japan | 8-112351 |

[51] Int. Cl.$^6$ .............. H04N 1/405; G06K 9/38
[52] U.S. Cl. ............ 382/237; 382/270; 382/252; 358/457; 358/466
[58] Field of Search ................ 382/237, 271, 382/252, 270; 358/457, 456, 466, 298, 475

[56]    References Cited

U.S. PATENT DOCUMENTS

| 5,111,310 | 5/1992 | Parker et al. | 358/457 |
| 5,204,760 | 4/1993 | Murayama et al. | 358/457 |
| 5,317,418 | 5/1994 | Lin | 358/455 |
| 5,535,020 | 7/1996 | Ulichney | 358/455 |
| 5,684,932 | 11/1997 | Shu | 358/298 |

FOREIGN PATENT DOCUMENTS

| A-0-593 304 | 4/1994 | European Pat. Off. . |
| A-6-508007 | 9/1994 | Japan . |

OTHER PUBLICATIONS

R. Ulichney, "The Void–and–Cluster Method for Dither Array Generation", SPIE vol. 1913, pp. 332–343.
J. Jarvis et al., "A Survey of Techniques for the Display of Continuous Tone Pictures on Bilevel Displays", Computer Graphics and Image Processing 5, 13–40 (1976).
R. Floyd et al., "An Adaptive Algorithm for Spatial Grey-scale", Proceeding of the S.I.D., vol. 17, Second Quarter 1976, pp. 75–77.

*Primary Examiner*—Edward L. Coles
*Assistant Examiner*—Joe Davis
*Attorney, Agent, or Firm*—Oliff & Berridge, PLC

[57]    ABSTRACT

A plurality of uniform density pixel matrices Di are prepared so that each matrix Di will have all pixels of a uniform density i. First, in S110, the pixels of one uniform density pixel matrix Di are converted into binary values (0 or 1) while performing an error diffusion operation. Thus obtained binary value pixel matrix Fi is stored in the working memory 14. Then, while the uniform density value i is repeatedly incremented, the above-described converting-and-storing processes are repeated. Afterward, binary values throughout all the binary value pixel matrices are summed at each pixel position. Thus, in S150, an accumulated value matrix M1 is produced to have a corresponding element constructed from the total value. Next, threshold values of a dither matrix DM are determined based on the elements of the matrix M1. That is, the threshold values are determined one by one using the elements of the matrix M1 from its element having the lowest value. Thus obtained threshold values are stored in the dither matrix storage memory 16 in S170.

73 Claims, 43 Drawing Sheets

FIG. 11 (a)

| DENSITY VALUE i<br>PIXEL POSITION(X,Y) | 0 | 1 | 2 | 3 | 4 | 5 | 6 | ---------- | 255 |
|---|---|---|---|---|---|---|---|---|---|
| ⋮ | ⋮ | ⋮ | ⋮ | ⋮ | ⋮ | ⋮ | ⋮ | ---------- | ⋮ |
| (15, 36) | ○ | ○ | ● | ● | ● | ● | ● | ---------- | ● |
| (15, 37) | ○ | ○ | ○ | ○ | ○ | ● | ● | ---------- | ● |
| (15, 38) | ○ | ○ | ○ | ○ | ○ | ○ | ○ | ---------- | ● |
| (15, 39) | ○ | ○ | ○ | ○ | ● | ● | ● | ---------- | ● |
| (15, 40) | ○ | ○ | ○ | ● | ● | ● | ● | ---------- | ● |
| ⋮ | ⋮ | ⋮ | ⋮ | ⋮ | ⋮ | ⋮ | ⋮ |  | ⋮ |

○: OFF
●: ON

FIG. 11 (b)

| DENSITY VALUE i<br>PIXEL POSITION(X,Y) | 0 | 1 | 2 | 3 | 4 | 5 | 6 | ---------- | 255 |
|---|---|---|---|---|---|---|---|---|---|
| ⋮ | ⋮ | ⋮ | ⋮ | ⋮ | ⋮ | ⋮ | ⋮ | ---------- | ⋮ |
| (15, 36) | ○ | ○ | ● | ○ | ● | ○ | ○ | ---------- | ● |
| (15, 37) | ○ | ○ | ○ | ● | ● | ○ | ● | ---------- | ● |
| (15, 38) | ○ | ○ | ○ | ○ | ● | ● | ○ | ---------- | ● |
| (15, 39) | ○ | ○ | ○ | ● | ○ | ● | ○ | ---------- | ● |
| (15, 40) | ○ | ● | ○ | ○ | ● | ● | ○ | ---------- | ● |
| ⋮ | ⋮ | ⋮ | ⋮ | ⋮ | ⋮ | ⋮ | ⋮ |  | ⋮ |

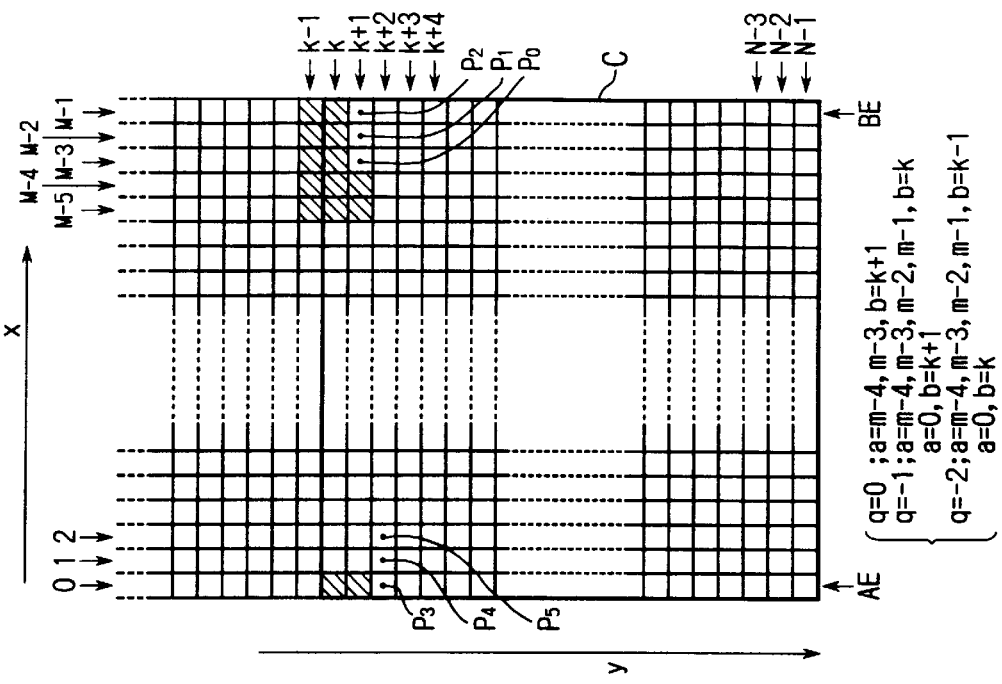
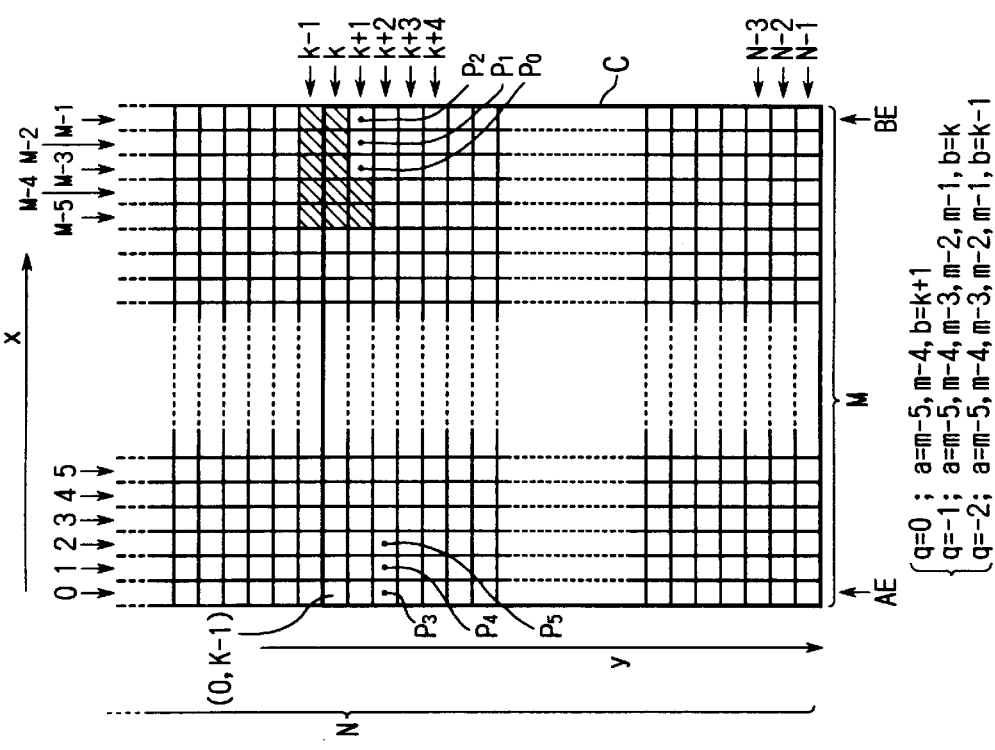

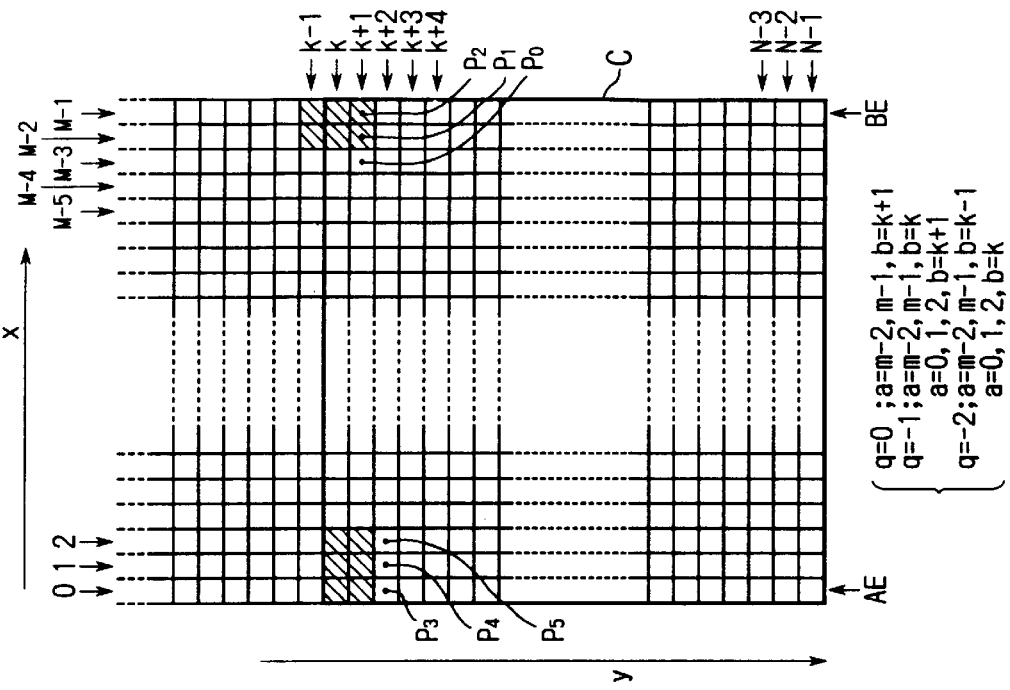
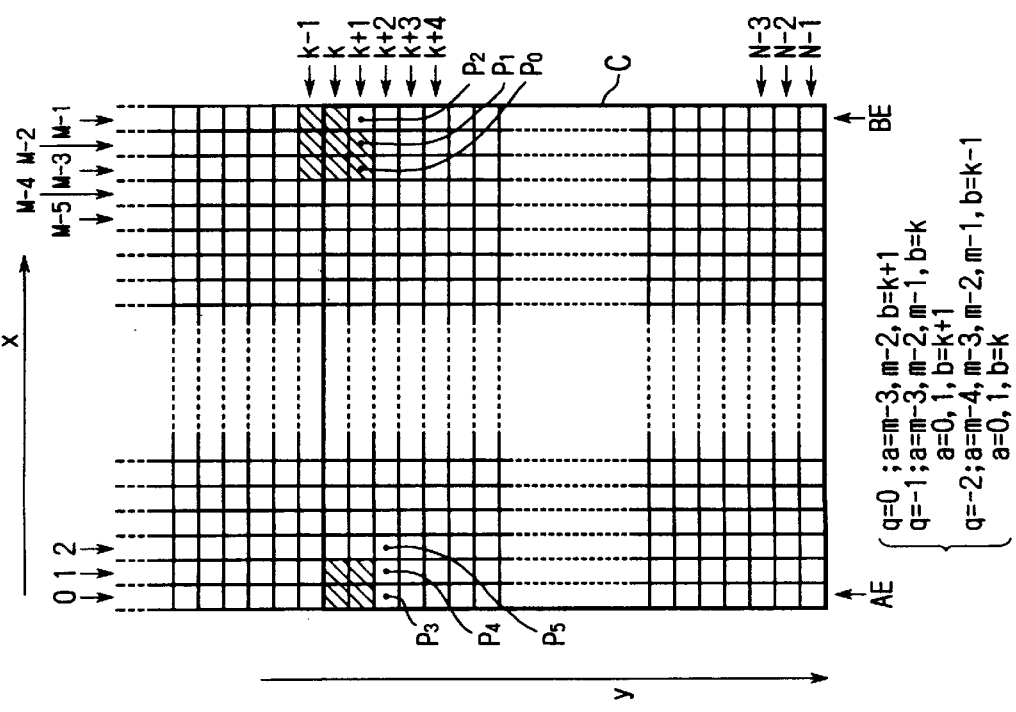

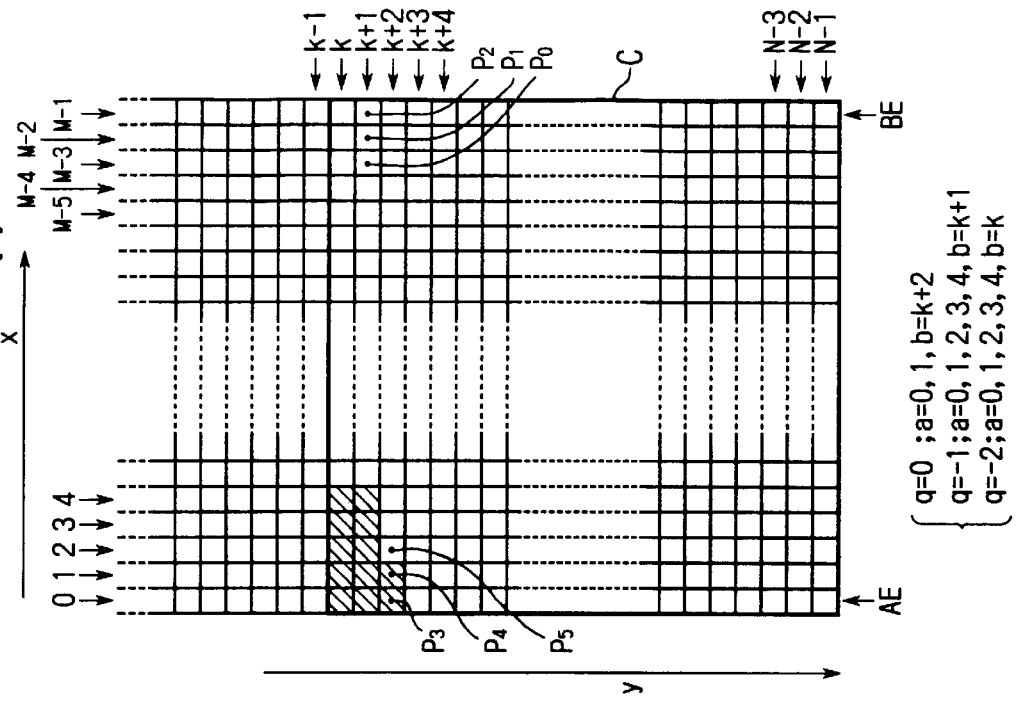
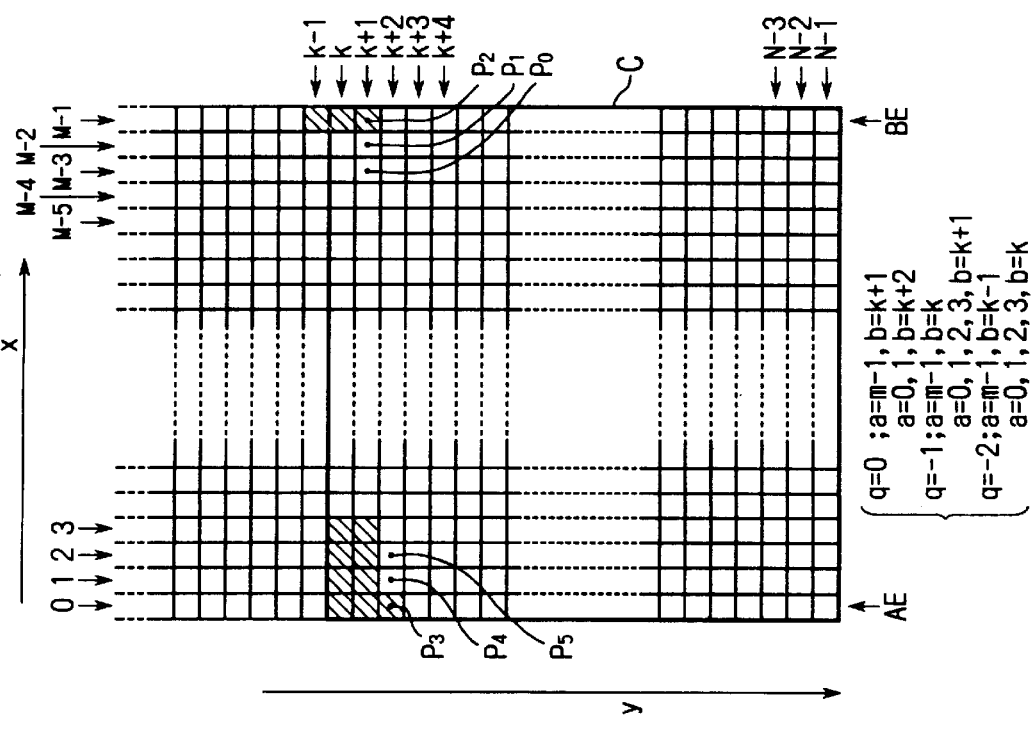

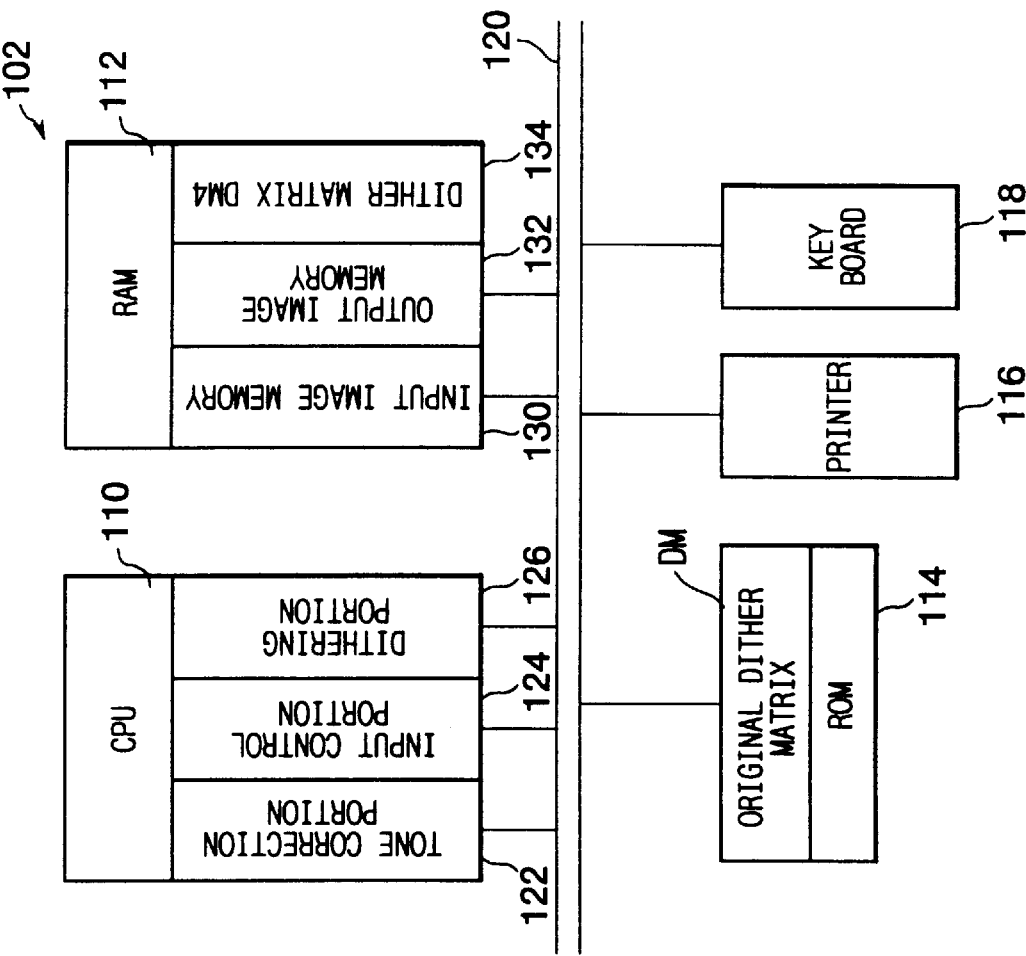

$$Out = int\{(^{IN}256)^{\gamma} * 256\}$$

FIG. 46 (a)

| THRESHOLD VALUE IN MATRIX DM | THRESHOLD VALUE IN MATRIX DM4 |
|---|---|
| 0 | 0 |
| 1 | 9 |
| 2 | 13 |
| 3 | 17 |
| 4 | 21 |
| 5 | 24 |
| 6 | 26 |
| 7 | 29 |
| 8 | 31 |
| 9 | 34 |
| 10 | 36 |
| ⋮ | ⋮ |
| 246 | 249 |
| 247 | 250 |
| 248 | 250 |
| 249 | 251 |
| 250 | 251 |
| 251 | 252 |
| 252 | 253 |
| 253 | 253 |
| 254 | 254 |
| 255 | 255 |

FIG. 46 (b)

| THRESHOLD VALUE IN MATRIX DM | THRESHOLD VALUE IN MATRIX DM4 |
|---|---|
| 0 | 0 |
| 1 | 1 |
| 2 | 2 |
| 3 | 3 |
| 4 | 3 |
| 5 | 4 |
| 6 | 5 |
| 7 | 5 |
| 8 | 6 |
| 9 | 6 |
| 10 | 6 |
| ⋮ | ⋮ |
| 4086 | 254 |
| 4087 | 254 |
| 4088 | 254 |
| 4089 | 254 |
| 4090 | 254 |
| 4091 | 254 |
| 4092 | 254 |
| 4093 | 254 |
| 4094 | 254 |
| 4095 | 255 |

FIG. 47

ROM (ORIGINAL DITHER MATRIX) DM

| ADDRESS | | Data |
|---|---|---|
| X | Y | |
| 0 | 0 | 6329 |
| 0 | 1 | 2841 |
| 0 | 2 | 11087 |
| 0 | 3 | 4365 |
| ⋮ | ⋮ | ⋮ |
| 0 | N-2 | 961 |
| 0 | N-1 | 8003 |
| 1 | 0 | 1325 |
| 1 | 1 | 5556 |
| ⋮ | ⋮ | ⋮ |
| M-1 | N-5 | 532 |
| M-1 | N-4 | 9430 |
| M-1 | N-3 | 3714 |
| M-1 | N-2 | 7146 |
| M-1 | N-1 | 15472 |

RAM (DITHER MATRIX) DM4

| ADDRESS | | Data Low | Data High |
|---|---|---|---|
| dx | dy | | |
| 0 | 0 | | |
| 0 | 1 | | |
| 0 | 2 | | |
| 0 | 3 | | |
| ⋮ | ⋮ | | |
| 0 | N-2 | | |
| 0 | N-1 | | |
| 1 | 0 | | |
| 1 | 1 | | |
| ⋮ | ⋮ | | |
| M-1 | N-4 | | |
| M-1 | N-3 | | |
| M-1 | N-2 | | |
| M-1 | N-1 | | |

DITHER MATRIX PRODUCING METHOD

BACKGROUND OF THE INVENTION

1. Field of the Invention

The present invention relates to a method of producing a dither matrix for converting continuous tone images into pseudo-halftone images.

2. Description of Related Art

Image data representative of continuous tone images is generally constructed from about eight bit data indicative of 256 tone levels. However, output devices, such as printers, for producing visible images based on the image data are generally bilevel output devices. The bilevel output devices produce images by printing dots or non-dots on recording sheets. For example, the bilevel output devices produce binary images through selectively providing ink dots onto the recording sheets. The bilevel output devices are simple in construction and easy to control.

In order to record eight bit continuous tone images with the bilevel output devices, the eight bit data for each picture element (pixel) is compared with a single predetermined threshold value, thereby determining whether or not to provide ink onto the recording sheets. According to this method, however, it becomes impossible to reproduce the great variety of tone levels which are originally represented by eight bit data. This is because eight bit data can represent 256 tones per color, and therefore can represent 16,777,216 tones for three colors in total.

In order to solve this problem, there has been proposed a half-toning method for representing various tone levels through providing a corresponding number of dots within a certain amount of area.

This halftoning methods employ various types of operations such as an error diffusion operation, a random number threshold-using dithering operation, and an ordered-dithering operation.

Those conventional half toning operations suffer from the following problems.

When a continuous tone image is halftoned with using the error diffusion operation, a density value of each pixel of the continuous tone image is modified according to errors generated at neighboring pixels. The modified density value is compared with a predetermined threshold value. Based on the compared result, the pixel density value is converted into a binary value. The error or difference between the binary value-representing value and the modified pixel density value will be diffused to neighboring pixels. It, however, requires a long period of time to perform those calculation processings onto all the pixels of the image. The obtained binary images will suffer from undesirable textures.

The random number threshold-using dithering operation employs a dither matrix whose threshold value elements are constructed from random numbers. Generally, each continuous tone image, to be dithered with the dither matrix, is wider than the dither matrix. The dither matrix is repeatedly laid down over the continuous tone image in a periodic manner. A density value of each pixel of the continuous tone image is simply compared with a threshold value on a corresponding location of the dither matrix. When the pixel density is higher than the corresponding threshold value, the pixel is turned ON. When the pixel density is equal to or lower than the corresponding threshold value, the pixel is turned OFF. Accordingly, it is possible to perform the processing within a short period of time. However, because the threshold values of the dither matrix are determined by random numbers, the resultant binary image becomes noisy.

The ordered-dithering operation also employs a dither matrix whose threshold values are determined one by one spirally around the matrix center. The dither matrix is repeatedly laid down over the continuous tone image in a periodic manner. A density value of each pixel of the continuous tone image is simply compared with a threshold value on a corresponding location of the dither matrix. Dots in the resultant binary image, however, tend to be gathered around certain dots and are erroneously realized as large dots. The resolution of the resultant binary image becomes deteriorated. Bayer method, another method of producing an ordered-dither matrix, arranges the threshold values of the dither matrix according to another rule. The obtained dither matrix can more uniformly distribute dots on the resultant binary image. However, because the Bayer's dither matrix is produced still according to a fixed rule, undesirable textures are still generated in the resultant binary images. Especially, densities in the dark portions are insufficiently reproduced.

Because the dither matrix DM is replicated on the continuous tone image as shown in FIG. 1, a plurality of portions in the continuous tone image are successively converted into binary image portions. Accordingly, the resultant binary image will suffer from non-uniform colors or tones at edges BD1 and BD2 between the dither matrix-replicated portions. Accordingly, undesirable boundary lines such as white lines will tend to periodically appear in the resultant binary image.

SUMMARY OF THE INVENTION

It is therefore, an object of the present invention to overcome the above-described drawbacks, and to provide a method of producing an improved dither matrix which can produce, within a short period of time, pseudo-halftone images which are not noisy, but which are still free from any undesirable textures or boundary lines.

In order to attain the above and other objects, the present invention provides a method of producing a dither matrix, the dither matrix being for converting a continuous tone image data representative of a density level within a predetermined input density range into pseudo-halftone image data representative of either one of two density levels, the method comprising the steps of: preparing a plurality of binary value pixel matrices, each of which includes a plurality of pixels which are two-dimensionally arranged and have binary values; and producing a dither matrix constructed from a plurality of elements which are arranged two-dimensionally, each of the plurality of elements having a threshold value which is determined based on the binary values of the plurality of binary value pixel matrices at corresponding pixels. The binary value pixel matrix preparing step may include the steps of: preparing a plurality of uniform density pixel matrices for a plurality of density values, the plurality of density values being distributed discretely in a predetermined density range, each of the plurality of uniform density pixel matrices having a plurality of pixels which are arranged two-dimensionally and which have density values equal to the corresponding density value; and producing the plurality of binary value pixel matrices based on the plurality of uniform density pixel matrices. The binary value pixel matrix producing step may include the steps of: subjecting all the pixels of each uniform density pixel matrix to an error-diffusion binary conversion process to convert the density values of the pixels into binary values while distributing generated errors to neighboring pixels; and producing a binary value pixel matrix based on the binary values produced for pixels which are located at least within a part of each uniform density pixel matrix.

According to another aspect, the present invention provides a method of converting an input continuous tone image into a pseudo-halftone image, the method comprising the steps of: preparing a plurality of binary value pixel matrices, each of which includes a plurality of pixels which are arranged two-dimensionally and which have binary values; producing a dither matrix constructed from a plurality of elements which are arranged two-dimensionally, each of the plurality of elements having a threshold value which is determined based on the binary values of the plurality of binary value pixel matrices at corresponding pixels; comparing input continuous tone image data representative of each pixel of the input continuous tone image with a threshold value of the dither matrix at a corresponding location; and determining, based on the compared result, pseudo-halftone image data representative of each pixel of a pseudo-halftone image.

According to still another aspect, the present invention provides a tone conversion device for converting tone of input image data, the device comprising: first memory means for storing a plurality of values in correspondence with a plurality of recording dot locations; tone setting means for setting a conversion characteristic; tone conversion means for converting the values stored in the first memory means based on the conversion characteristic set by the tone setting means; second memory means for storing the values converted by the tone conversion means; comparison means for comparing image data with the values stored in the second memory means; and output means for outputting record signals for the plurality of recording dot locations based on the comparison results.

BRIEF DESCRIPTION OF THE DRAWINGS

The above and other objects, features and advantages of the invention will become more apparent from reading the following description of the preferred embodiment taken in connection with the accompanying drawings in which:

FIGS. 11(a) and 11(b) show how pixels are turned on and off in each pixel position in each matrix Di;

FIGS. 24(a)–24(f) illustrate how error is distributed to neighboring pixels as a subject pixel is shifted one by one;

FIG. 41 shows a dither matrix for multilevel printing;

FIG. 42 is a block diagram of a tone conversion device of an eleventh embodiment;

FIGS. 46(a) and 46(b) show how tone level is converted through the tone conversion process;

FIG. 47 shows an original dither matrix DM and a dither matrix DM4 according to a twelfth embodiment;

DETAILED DESCRIPTION OF THE PREFERRED EMBODIMENTS

Figure 1:
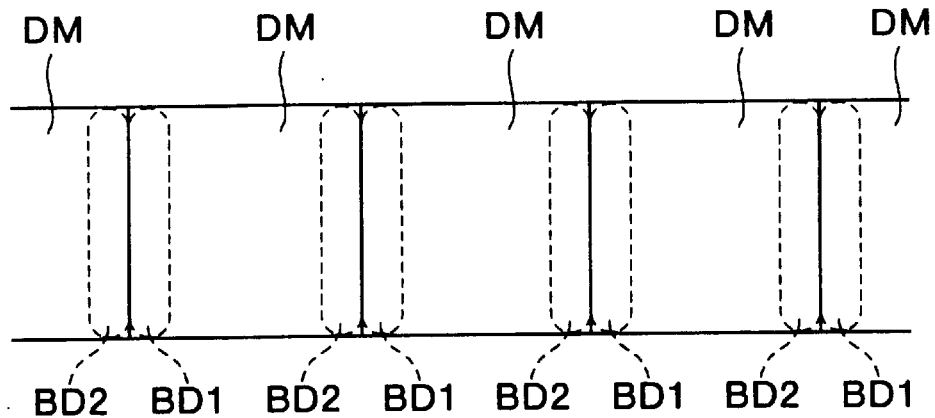
FIG. 1 illustrates how a dither matrix is repeatedly laid down over an input continuous tone image.

A dither matrix producing method according to preferred embodiments of the present invention will be described while referring to the accompanying drawings wherein like parts and components are designated by the same reference numerals.

A first preferred embodiment will be described below with reference to FIGS. 2 through 6.

Figure 2:
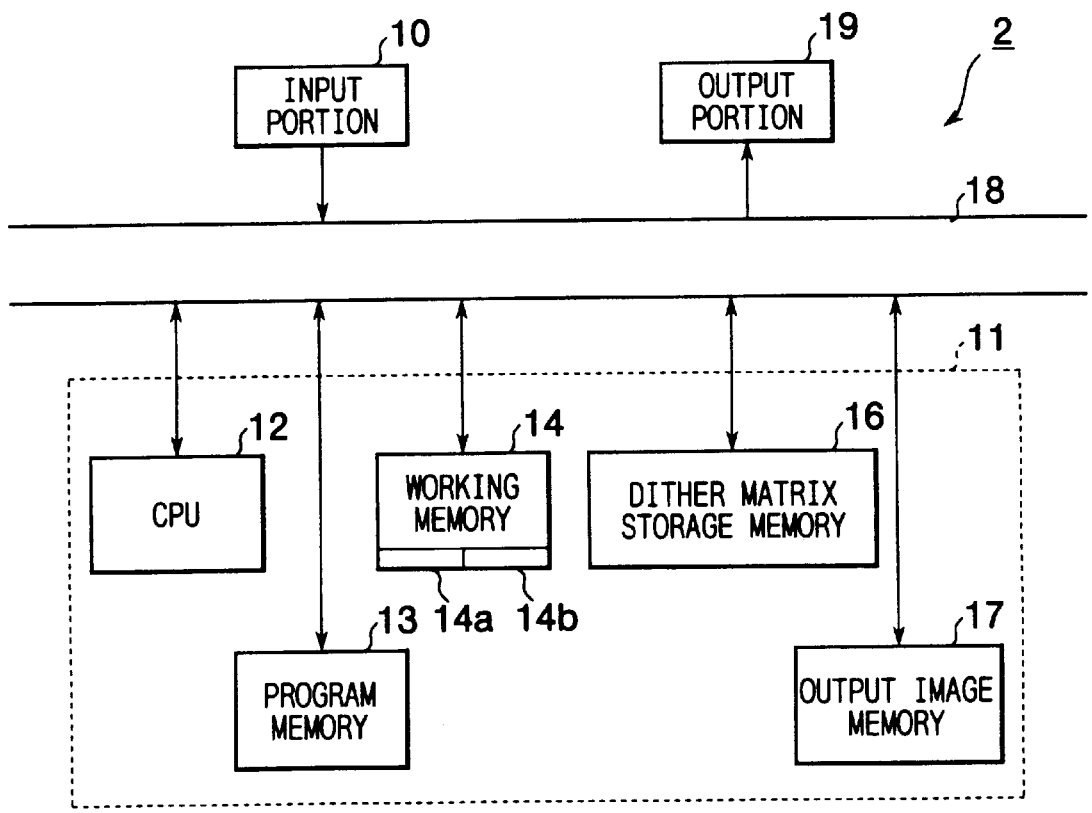
FIG. 2 is a block diagram showing a main portion of a dither matrix producing device of a first embodiment of the present invention.

FIG. 2 is a block diagram of a dither matrix producing device 2 of the present embodiment. The dither matrix producing device 2 is for producing a dither matrix DM which is to be used for dithering or converting continuous tone image data, representative of 256 tone levels, into pseudo-halftone image data representative of only binary levels. The device 2 is also for converting input continuous tone images with 256 tone levels into binary output images with using the produced dither matrix DM.

A main part of the dither matrix producing device 2 is constructed from a microcomputer portion 11. The microcomputer portion 11 includes: a CPU 12; a program memory 13 constructed from a ROM; a working memory 14 constructed from a RAM; a dither matrix storage memory 16 constructed from another RAM; and an output image memory 17 constructed from still another RAM. The microcomputer portion 11 is connected to an input portion 10 and to an output portion 19 via a system bus 18.

The input portion 10 is constructed from an interface for receiving both data and instructions inputted from a key board or an external storage device (not shown). For example, the input portion 10 inputs data and various instructions required for producing a dither matrix DM. The input portion 10 is further for inputting eight bit image data indicative of a plurality of pixels of a continuous, tone image.

The CPU 12 is for executing a dither matrix producing program shown in FIG. 6 for producing a dither matrix DM as will be described later. The program is stored in the program memory 13. The working memory 14 is for temporarily storing data required by the CPU 12 to execute the program. The working memory 14 is formed with an error buffer 14a for storing errors obtained during the dither matrix production process. The error buffer 14a has N by M memory locations (0, 0)–(M−1, N−1) where M and N are integers higher than one and the product of M and N is equal to or higher than 256. The working memory 14 is also formed with an accumulated result matrix memory 14b which also has N by M memory locations (0, 0)–(M−1, N−1).

Figure 3:
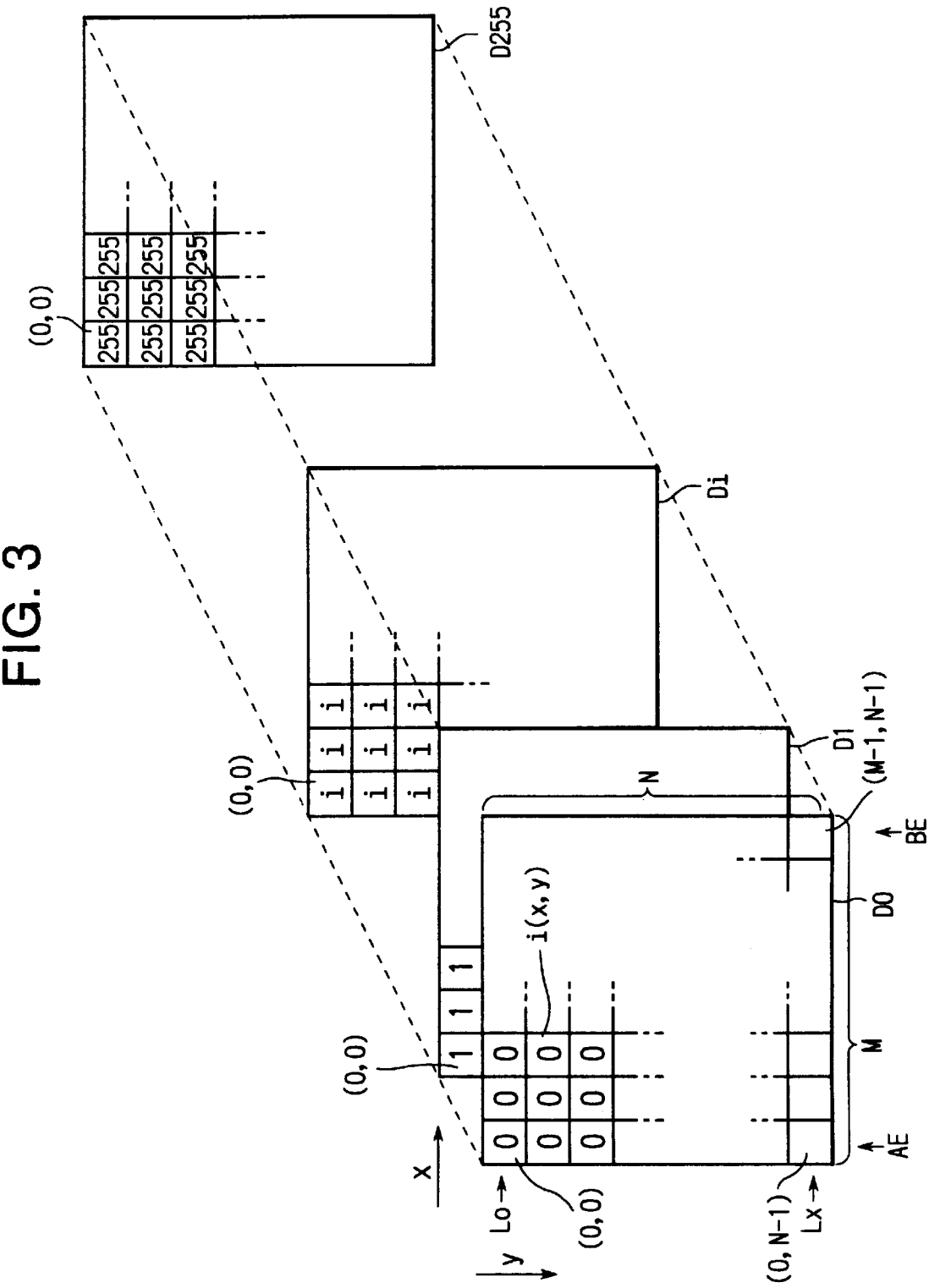
FIG. 3 illustrates uniform density pixel matrices D0–D255.

As described later, the working memory 14 previously stores therein a plurality of (256, in this example) uniform density pixel matrices Di (i=0 to 255), i.e., D0–D255 shown in FIG. 3. As shown in FIG. 3, each uniform density pixel matrix Di has a plurality of pixels which are arranged at N pixel lines and in M pixel columns. In each matrix Di, all the pixels have the same density value i. For example, all the pixels in the matrix D0 have the density value i of zero (0), and all the pixels in the matrix D255 have the density value i of 255.

The dither matrix storage memory 16 is for storing data of a dither matrix DM produced by the CPU 12. The memory 16 also has N by M memory locations (0, 0)–(M−1, N−1).

It is noted that the CPU 12 is also for performing a dithering operation to convert eight bit continuous tone image data, inputted in the input portion 10, into binary image data. The output image memory 17 is for temporarily storing the thus produced binary image data. The output portion 19 is constructed from a bilevel printing device for printing binary images based on the binary image data through selectively printing dots or non-dots on printing sheets through an electrophotographic manner.

It is noted that as shown in FIG. 3, in each uniform density pixel matrix Di, pixels are arranged in N pixel lines and in M pixel columns. A main scanning direction X is defined along each pixel line, and an auxiliary scanning direction Y is defined along each pixel column. All the pixel positions are defined by (x, y) coordinates along X and Y axes. An original pixel point (0,0) is located at an upper-and-left corner of each matrix Di. A last pixel point (M−1, N−1) is located at a lower-and-right corner of each matrix Di. The M pixel columns are arranged in the main scanning direction x from a leading edge AE to a trailing edge BE. As will be described later, during the dither matrix production process, the pixels are processed from left to right along each pixel line in the main scanning direction X. The pixel lines are processed from top (leading pixel line L0) to bottom (trailing pixel line Lx) in the auxiliary scanning direction Y. That is, the pixels (0, 0), (1, 0), . . . , and (M−1, 0) are first processed in this order. When the pixel (M−1, 0) is processed, the processing for the next pixel line is started. That is, pixels (0, 1), (1, 1), . . . , and (M−1, 1) are processed in this order. In the same manner, the subsequent pixel lines are successively processed. Then, pixels (0, N−1), (1, N−1, 1), . . . , and (M−1, N−1) are processed in this order. Then, the process for the entire matrix Di is completed.

Figure 5:
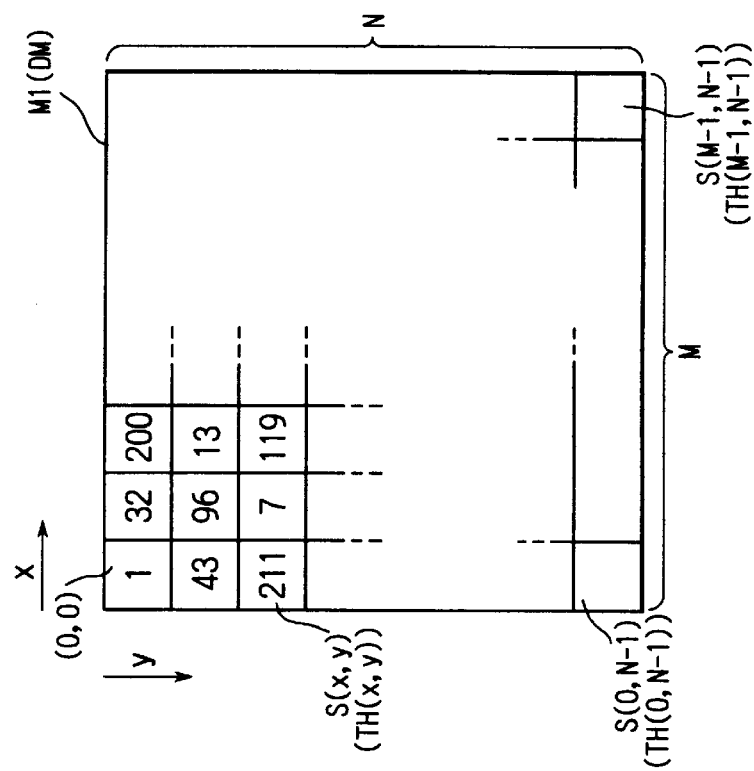
FIG. 5 illustrates a structure of an accumulated result matrix M1 (or a dither matrix DM)

With the above-described structure, the dither matrix producing device 2 produces the dither matrix DM shown in FIG. 5 in a manner described below.

Figure 4:
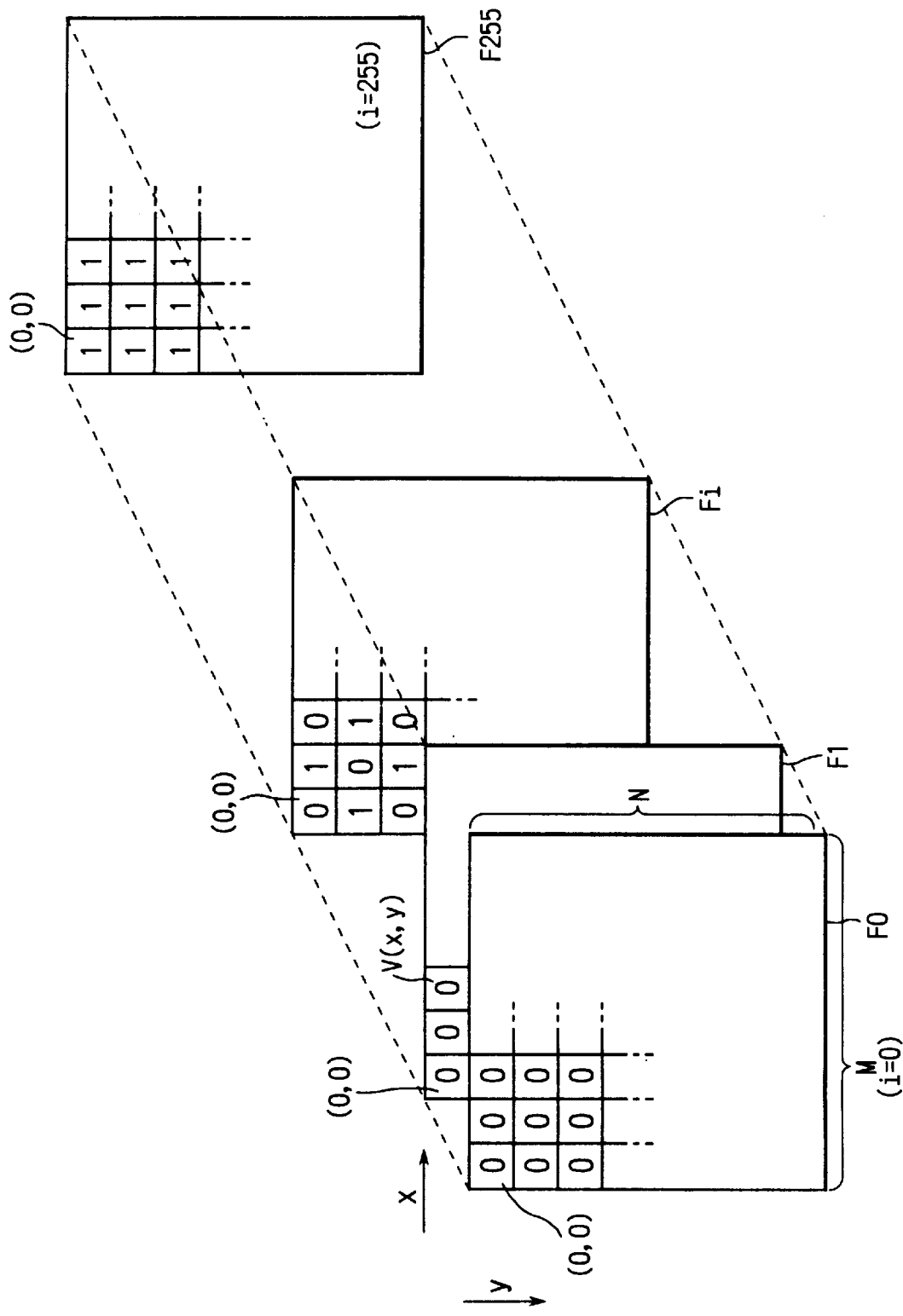
FIG. 4 illustrates binary value pixel matrices F0–F255.
Figure 6:
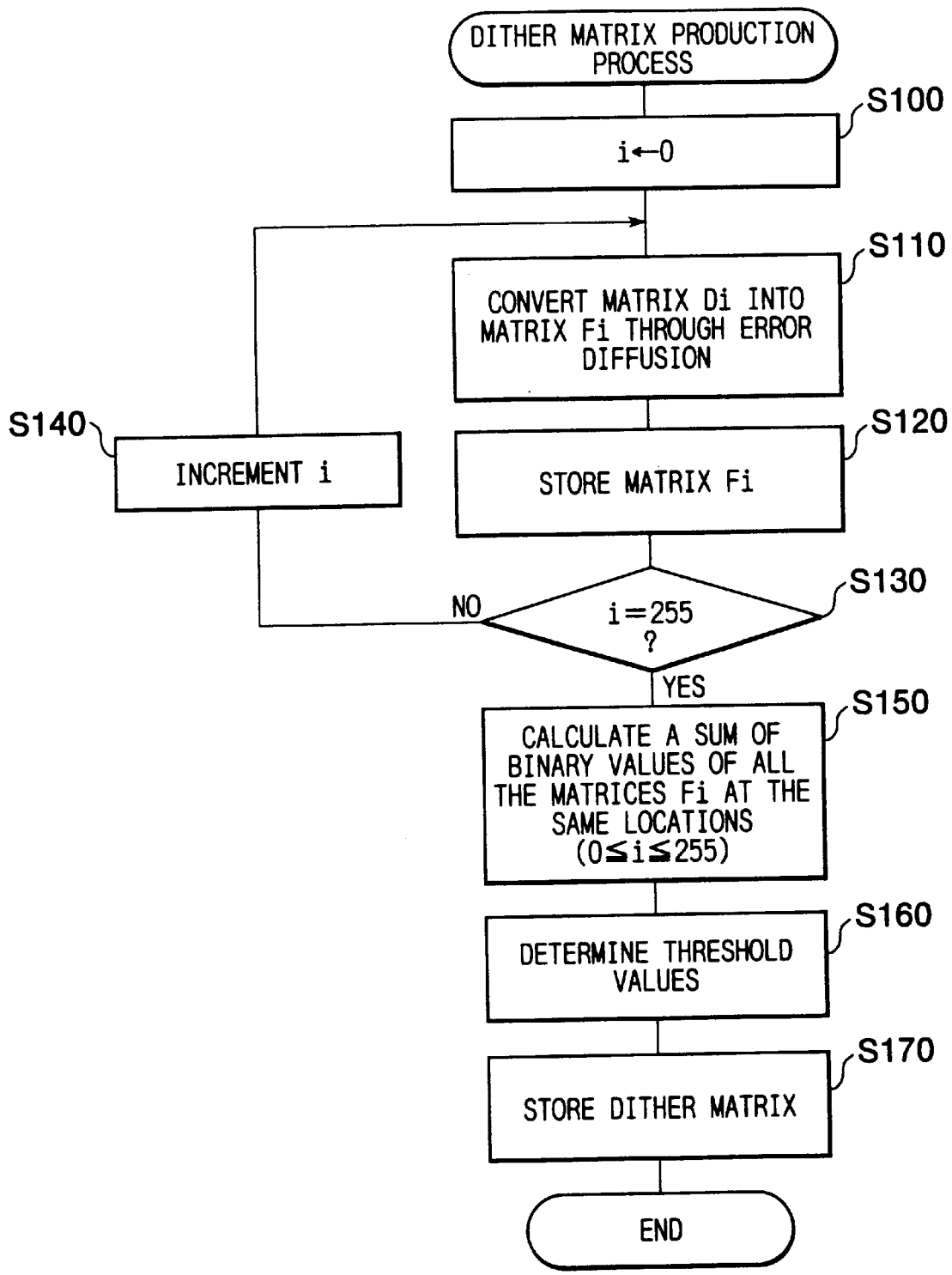
FIG. 6 is a flowchart of a dither matrix producing process of the first embodiment.

As shown in FIG. 6, first, the CPU 12 initializes, in S100, a uniform density value i to zero (0). Next, in S110, the CPU 12 converts the density values i(x, y) (=i) of all the pixels (x, y), in the matrix Di (i=0), one by one into binary values V(x, y) while distributing produced binary conversion errors to neighboring pixels. As a result, the density i of each pixel in the matrix Di is set to either one of "one (1)" and "zero (0)". In other words, each pixel is turned ON or OFF. It is noted that through the initialization step of S100, the matrix D0 is first subjected to the binary conversion process. Because all the pixels of the matrix D0 have the density values of zero (0), all the pixel values are converted into zero (0). As a result, a binary value pixel matrix F0 is produced. This matrix is shown in FIG. 4.

Thus obtained binary value pixel matrix F0 is stored in the working memory 14 in S120. Then, in S130, the CPU 12 judges whether or not the present density value i is equal to 255. Because the density value i is first set to zero (0) (No in S130), the program proceeds to S140 where the uniform density value i is incremented by one. In S110, the CPU 12 converts the density values i(x, y) (i=1) of all the pixels (x, y) of the matrix D1 into binary values V(x, y). That is, the CPU 12 converts the matrix D1 into a matrix F1. In S120, the matrix F1 is stored in the working memory 14.

The above-described processes of S110, S120, and S130 are repeated while the uniform density value i is incremented one by one in S140. When the processes of S110 and S120 for the uniform density pixel matrix D255 (i=255) are completed, the working memory 14 stores therein 256 binary value pixel matrices F0–F255 as shown in FIG. 4, which are obtained based on all the uniform density matrices D0–D255. All the pixel positions in each binary value pixel matrix Fi are defined as (x, y) in the same manner as those of the corresponding matrix Di. The original point (0,0) is located at an upper-and-left corner of each matrix Fi as shown in FIG. 4.

Because the uniform density value i now reaches 255 (yes in S130), the CPU 12 calculates, in S150, a total value S(x,y) of the binary values V(x,y) throughout all the matrices F0–F255 at each pixel position (x, y). The CPU 12 performs this calculation for all the pixel positions (0,0)–(M−1, N−1) in the matrices F0–F255. The CPU 12 then stores the resultant total values S(0,0)–S(M−1, N−1) in the accumulated binary value memory 14b, thereby producing an accumulated result matrix M1 shown in FIG. 5.

The calculation performed in S150 will be described below in greater detail.

First, binary values V(0,0) in all the matrices F0–F255, at the original point (0, 0), are accumulated or summed into a total value S(0, 0). The resultant total value S(0, 0) is stored in a corresponding location (0, 0) of the memory area 14b as shown in FIG. 5. The same processings are conducted for all the remaining pixel points (1,0)–(M−1, N−1), thereby filling all the element locations (0,0)–(M−1,N−1) of memory area 14b with the resultant accumulated values S(0,0)–S(M−1, N−1). As a result, the accumulated value matrix M1 is obtained.

Because each pixel state V(x, y) in each binary value pixel matrix Fi is either zero (OFF) or one (ON), the above-described accumulating operation serves to count, at each pixel position (x,y), the total number of turned-ON pixels throughout all the matrices F0–F255.

Next, in S160, a dither matrix DM is produced based on the accumulated result matrix M1, and the produced dither matrix DM is stored in the dither matrix storage memory 16 in S170.

This dither matrix producing-and-storing steps (S160 and S170) will be described in greater detail below. It is noted that each of all the integers between 1 and 255 be preferably set as a threshold value in at least one of all the elements of the dither matrix DM.

First, the lowest accumulated value S(x,y) is selected from all the elements S(0,0)–S(M−1, N−1) in the accumulated result matrix M1. A threshold value TH(x,y) is determined based on the selected lowest accumulated value S(x,y). Then, the threshold value TH(x,y) is set as an element of the dither matrix DM at a position (x,y) corresponding to the pixel position (x,y) of the lowest accumulated value S(x,y). For example, a threshold "1" is set in correspondence with the lowest accumulated value. Then, the second lowest accumulated value S(x,y) is selected and retrieved from the matrix M1. Based on the retrieved value, a threshold value TH(x,y), "2" for example, is determined for a corresponding element (x,y) of the dither matrix DM. Thus, the threshold values TH(x,y) between 1 and 255 are successively determined for all the pixels from the lowest accumulated result pixel. Then, in S170, the thus determined threshold values TH(x,y) ($0 \leq x \leq M-1$, $0 \leq y \leq N-1$) are stored in corresponding memory locations (0,0)–(M−1,N−1) of the memory 16.

For example, if the lowest value is at (0, 0) in the accumulated result matrix M1, the corresponding threshold value, "1" for example, is determined and stored in a memory location (0, 0) of the memory 16. Then, all the successive threshold values 2–255 are successively stored in memory locations (x, y) corresponding to the remaining accumulated result values.

For example, the threshold values TH(x,y) may be determined as equal to the accumulated result values S(x,y). In this case, the accumulating step S150 serves as the dither matrix producing step. Accordingly, the CPU 12 performs no specific operations in S160. The accumulated result matrix M1 is used as the dither matrix DM and stored in the dither matrix storage memory 16 in S170.

In the manner as described above, in S160, the CPU 12 may set threshold values TH(x,y) so that the threshold values TH(x,y) will increase as the accumulated result values S(x,y) increase from the lowest. For example, the CPU 12 may set a threshold value of one (1) at the pixel position (x, y) where the lowest accumulated result value S is located. The CPU 2 may increase the threshold value TH(x,y) one by one as the accumulated result value S(x,y) increases. Contrarily, the CPU 12 may set threshold values TH(x,y) so that the threshold value TH(x,y) will decrease as the accumulated result value S(x,y) decreases from the highest value. For example, the CPU 12 may set a threshold value of 255 at the pixel position where the highest accumulated result value S is obtained. The CPU 2 may decrease the threshold value one by one as the accumulated result value S(x,y) decreases.

In both of these cases, when the same accumulated result values S are obtained for two or more elements (x,y) in the accumulated result matrix M1, the same threshold values S(x,y) may be set to the corresponding two or more elements (x,y) in the dither matrix DM. Alternatively, the same accumulated result values may be arranged in a certain order, and different threshold values TH may be set to the corresponding two or more elements.

Alternatively, the program memory 13 may be previously formed with a table in which a plurality of threshold values TH are stored in correspondence with a plurality of different accumulated values S. In S160, the CPU 12 may convert the accumulated result values S(x,y) of the accumulated result matrix M1 into threshold values TH(x,y) while referring to the table.

Thus produced dither matrix DM will be used for dithering or converting input continuous tone images into pseudo-halftone images. The produced pseudo-halftone images are temporarily stored in the memory 17 before being outputted to the output portion 10.

The dither matrix DM dithers or converts the inputted continuous tone images as described below. Because the dither matrix DM is generally smaller than each continuous tone image, the dither matrix DM is repeatedly laid down over the input image in a periodic manner, thus tiling the input image. Then, a density value of each pixel of the input image is compared with a correspondingly-located threshold value TH(x,y) of the dither matrix DM. When the density of the pixel is higher than the threshold value, the pixel is turned ON. When the density of the pixel is equal to or lower than the threshold value, the pixel is turned OFF. Based on the thus produced binary states, the output portion 19, i.e., the color printer is controlled to print dots or non-dots on recording sheets.

Next will be given a detailed description of the binary conversion process of S110.

As described already, in a subject matrix Di subjected to the conversion process of S110, pixels are processed from left to right along each pixel line in the main scanning direction X. The pixel lines are processed from top to bottom in the auxiliary scanning direction Y.

In S110, the density value i of each pixel in the subject matrix Di is converted into a binary value (0 or 1) while a generated error (which will be referred to as "binary-conversion error" hereinafter) is distributed to neighboring pixels. In order to distribute the binary-conversion errors to neighboring pixels, various types of error diffusion operations can be employed. For example, the conversion step of S110 can employ an error diffusion method, a minimized average error method, or the like. The minimized average error method is for adding, to a density value of a subject pixel to be processed, fractional portions of binary-conversion errors which are generated when neighboring pixels are processed. This method is described by J. F. Jarvis, C. N. Judice, and W. H. Ninke, in "A Survey of Techniques for the Display of Continuous Tone Pictures on Bilevel Displays", Computer Graphics and Image Processing.5, 13–40(1976). The error diffusion method is for distributing an error, generated when each pixel is processed, to neighboring pixels not yet processed. This method is described in great detail by Robert W. Floyd and Louis Steinberg in "An Adaptive Algorithm for Spatial Greyscale", Proceeding of the S.I.D. Vol.17/2,1976.

A first example of the binary conversion process of S110 will be described below. This example employs the minimized average error method.

When a certain pixel (x, y) in the subject matrix Di is subjected to the conversion process, the density value i(x, y) of the subject pixel (x, y) is first modified by fractional portions of binary-conversion errors which are generated at already-processed neighboring pixels. Thus, the density value i(x,y) is modified into a modified value I(x, y). In this example, the subject pixel (x, y) receives fractional portions of the errors from already-processed twelve neighboring pixels: two preceding pixels (x–2, y) and (x–1, y) on the same pixel line; five pixels (x–2, y–1), (x–1, y–1), (x, y–1), (x+1, y–1), and (x+2, y–1) on the upper pixel line; and further five pixels (x–2, y–2), (x–1, y–2), (x, y–2), (x+1, y–2), and (x+2, y–2) on the further upper pixel line. For example, the subject pixel (x,y) receives a 5/48th part of an error generated at the pixel (x–2, y). Thus, the subject density value i(x,y) is added with a sum E of the error fractions distributed from the already-processed twelve neighboring pixels. Thus modified density value I(x,y) is then compared with a predetermined threshold value (128 in this example). When the modified density value I is higher than 128, the pixel is turned ON. That is, the binary state value V(x,y) is determined as one (1). When the modified density value I is equal to or lower than 128, the pixel is turned OFF. That is, the binary state value V(x,y) is determined as zero (0). A binary conversion error "e(x, y)" for the subject pixel (x, y) is then determined as a difference between the modified value I(x, y) and the binary state-representing value 0 (OFF) or 255 (ON). The thus obtained binary conversion error "e(x, y)" is stored in the error buffer 14a at a corresponding location (x, y).

This conversion process will be described below in greater detail.

First, the density value i(x, y) of the subject pixel (x, y) is modified by a sum E of fractional portions of binary errors "e" generated at already-processed twelve neighboring pixels. The modified density value I(x, y) is calculated as follows:

$$I(x,y) \leftarrow i(x,y) + E \quad (1)$$

It is noted that the binary error sum E is calculated based on a coefficient matrix α and the binary errors "e" generated during the conversion processes at neighboring twelve pixels.

$$E(x,y) \leftarrow (1/\Sigma \alpha ab) \times \Sigma(\alpha ab \times eab) \quad (2)$$

The coefficient matrix a is shown below. (This matrix α is stored in the memory 13.)

$$\alpha \equiv \begin{pmatrix} 1 & 3 & 5 & 3 & 1 \\ 3 & 5 & 7 & 5 & 3 \\ 5 & 7 & * & & \end{pmatrix} \quad (3)$$

α ab is a coefficient value located at a location (a, b) in the matrix α. $-2 \leq a \leq 2$, $-2 \leq b \leq 0$. eab is a binary conversion error e(x+a,y+b) generated at a neighboring pixel (x+a,y+b). The neighboring pixel (x+a,y+b) is located at a position corresponding to a location (a, b) relative to the subject pixel (x,y) indicated by * in the coefficient matrix α. The error eab, i.e., e(x+a,y+b) is retrieved from a corresponding location (x+a,y+b) of the error buffer 14a.

Then, the modified density I(x, y) is compared with the predetermined threshold t (128). When I(x, y)>t, the subject pixel (x, y) is turned ON. That is, the subject pixel density is converted into V(x,y) of one (1). When I(x, y)≦t, on the other hand, the subject pixel (x, y) is turned OFF. That is, the subject pixel density is converted into V(x,y) of zero (0).

When the subject pixel is turned ON, a binary conversion error e(x, y) is calculated in the following formula (4):

$$e(x,y) \leftarrow I(x,y) - 255 \quad (4)$$

When the subject pixel is turned OFF, on the other hand, a binary conversion error e(x, y) is calculated in the following formula (5):

$$e(x,y) \leftarrow I(x,y) \quad (5)$$

Thus calculated binary conversion error e(x, y) is stored in the buffer 14a at a corresponding location (x,y).

The above-described calculations are successively performed for all the pixels (x, y) in the subject matrix Di. As a result, the subject matrix Di is converted into a corresponding matrix Fi.

A second example of the binary conversion step of S110 will be described below.

The second example employs the error diffusion method. According to this method, when a binary conversion error e(x, y) is produced during a conversion process for a subject pixel (x, y), the binary conversion error e(x, y) is first broken up into twelve parts, which are then distributed to neighboring pixels not yet processed. For example, 7/48th part of the error e(x,y) is provided to the next pixel (x+1, y) on the same pixel line, and 5/48th part is provided to the further next pixel (x+2, y) also on the same pixel line. Similarly, other remaining parts of the error e(x,y) are distributed to: five pixels (x–2, y+1), (x–1, y+1), (x, y+1), (x+1, y+1), and (x+2, y+1) on the lower pixel line; and five pixels (x–2, y+2), (x–1, y+2), (x, y+2), (x+1, y+2), and (x+2, y+2) on the next lower pixel line. Thus distributed errors are accumulated in the error buffer 14a at memory locations corresponding to the twelve neighboring pixels. Therefore, before each pixel (x, y) is subjected to the conversion process, fractional portions of binary errors from the already-processed 12 neighboring pixels are accumulated as an error sum E(x, y) in a corresponding memory location (x, y) of the error buffer 14a. Accordingly, when the subject pixel (x, y) is to be processed, the density i(x,y) is modified by the error sum E(x, y) which is simply retrieved from the corresponding memory location (x, y) of the buffer memory 14a.

This conversion process will be described below in greater detail.

When a certain pixel (x, y) is subjected to the conversion process, an error sum E(x, y) is retrieved from the corresponding memory location (x, y) in the buffer memory 14a. The error sum E is an accumulated amount of errors distributed from already-processed 12 neighboring pixels. The density value i(x, y) is modified by the error sum E(x, y). That is, the modified density I(x, y) is calculated through the following formula (6):

$$I(x,y) \leftarrow i(x,y) + E(x,y) \qquad (6)$$

Then, the modified density I(x, y) is compared with the predetermined threshold t (128). When I(x, y)>t, the subject pixel is turned ON. That is, the subject pixel density is converted into the binary value V(x,y) of one (1). When I(x, y)≦t, the subject pixel is turned OFF. That is, the subject pixel density is converted into the binary value V(x,y) of zero (0).

When the subject pixel (x, y) is turned ON, a binary conversion error e(x, y) is calculated for the subject pixel in the following formula (7):

$$e(x,y) \leftarrow I(x,y) - 255 \qquad (7)$$

When the subject pixel is turned OFF, on the other hand, a binary conversion error e(x, y) is calculated for the subject pixel in the following formula (8):

$$e(x,y) \leftarrow I(x,y) \qquad (8)$$

Thus produced binary conversion error e(x, y) is then distributed to the neighboring 12 pixels not yet processed in a weighted basis defined by the following matrix β:

$$\beta \equiv \begin{pmatrix} & & * & 7/48 & 5/48 \\ 3/48 & 5/48 & 7/48 & 5/48 & 3/48 \\ 1/48 & 3/48 & 5/48 & 3/48 & 1/48 \end{pmatrix} \qquad (9)$$

where * indicates a subject pixel position (x, y), and each value indicates a coefficient to be multiplied with the error e(x, y) before being distributed to a neighboring pixel which is located relative to the subject pixel (x, y) as shown in the matrix β. (The matrix β is stored in the memory 13.) Thus distributed error fractional portions are accumulated in corresponding memory locations in the error buffer 14a. For example, the next pixel (x+1, y) on the same pixel line receives a 7/48th part of the error e(x, y). The 7/48th part of the error e(x, y) is therefore accumulated in the corresponding memory location (x+1, y) in the error buffer 14a.

The above-described calculations are successively performed for all the pixels (x, y) in the subject matrix Di. As a result, the matrix Di is converted into a corresponding matrix Fi.

As described above, according to the present embodiment, each uniform density pixel matrix Di is converted into a binary value pixel matrix Fi. That is, density values i(x,y) of pixels in each matrix Di are converted into binary values V(x,y) while generated binary conversion errors are distributed to neighboring pixels. The resultant binary values V(x,y) are then accumulated into a sum value S(x,y) throughout all the matrices F0–F255 at each pixel position (x,y). Threshold values TH(x,y) of the dither matrix DM are determined based on the accumulated values S(x,y). The thus produced threshold values TH(x,y) look arranged irregularly, but are not arranged completely at random. When input continuous tone images are dithered with the thus produced dither matrix DM, obtained binary images will be formed with no undesirable textures, but still will not be noisy.

To summarize, the dither matrix producing method of the present embodiment applies, into a dither matrix, a binary value arrangement produced through the error diffusion operation. In the thus produced dither matrix DM, threshold values TH(x, y) are properly distributed. That is, the arrangement of the threshold values is free from any fixed rules, is sufficiently irregular, but is not completely at random. The produced dither matrix DM can therefore convert continuous tone images into pseudo-halftone images which are not noisy with respect to human visual sense, which have a sufficiently high degree of resolution, and still which do not suffer from any undesirable textures. While obtaining these advantages resulted from the error diffusion operation, the dither matrix DM can convert continuous tone images into pseudo-halftone images within a short period of time.

According to the present embodiment, the uniform density pixel matrices Di are subjected to the error diffusion operation. The resultant binary value pixel matrices F1–F255 are used to determine the dither matrix pattern DM. Accordingly, any one can easily produce a dither matrix DM. The device 2 of the present embodiment can produce the dither matrix DM within a short period of time through simply subjecting each matrix Di to the error-diffusing binary conversion process only once.

A second embodiment of the present invention will be described below with reference to FIGS. 7 and 8.

In the first embodiment, the accumulated result matrix M1 and the dither matrix DM are produced to have sizes N×M the same as those of the uniform density pixel matrices D0–D255. In other words, the matrices M1 and DM are produced based on all the pixels (0,0)–(M−1,N−1) of the matrices D0–D255. However, according to the second embodiment, the matrices M1 and DM are produced to have sizes much smaller than those of the matrices D0–D255. In more concrete terms, the matrices M1 and DM are produced based on only a predetermined area within the matrices D0–D255.

Figure 7:
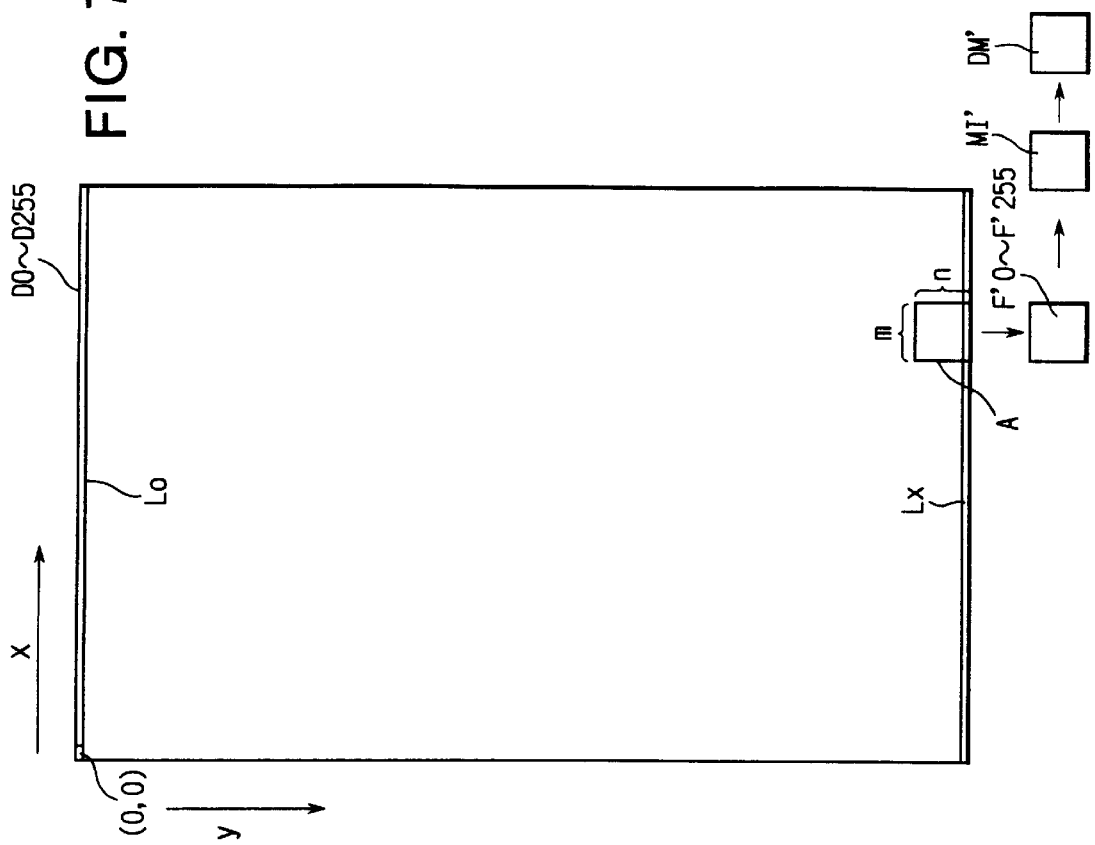
FIG. 7 shows how a predetermined portion A is located in each matrix Di.
Figure 8:
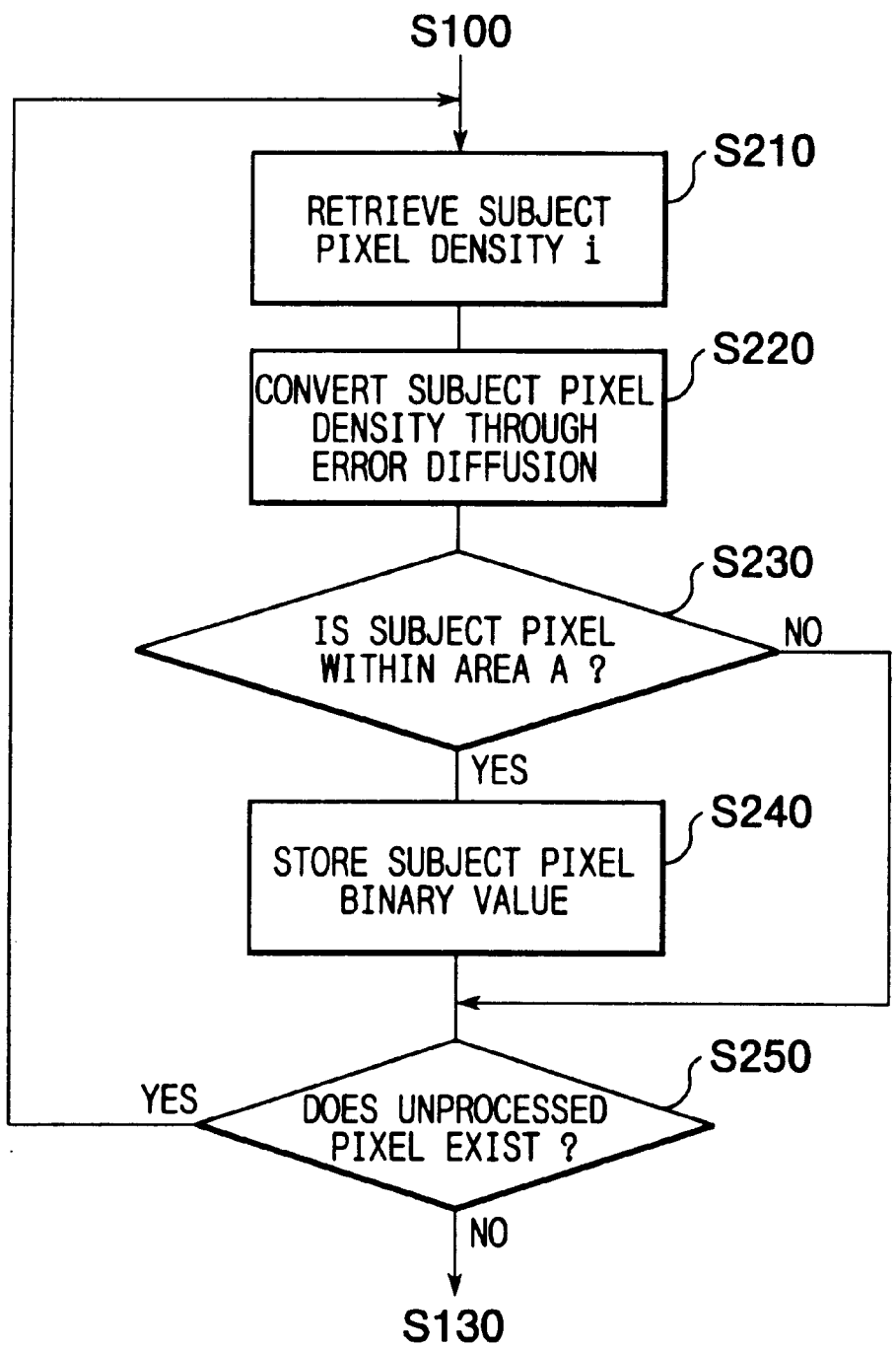
FIG. 8 shows a flowchart of a main portion of a dither matrix producing process according to a second embodiment.

As shown in FIG. 7, a region A is defined within each matrix Di. According to the present embodiment, when the pixels in each matrix Di are converted into binary values, binary values of only the pixels within the region A are stored in the working memory 14. Accordingly, binary value pixel matrices F0' through F255' are produced based on binary values obtained on only pixels within the regions A of the corresponding matrices D0–D255. According to this example, the region A is located at the same position throughout all the matrices D0–D255. The region A is constructed from n by m pixels. It is noted that the product of m and n is equal to or higher than 256.

As shown in FIG. 7, the region A does not include the leading pixel line L0, but includes the last pixel line Lx. The region A is thus set for the following reasons: In the same manner as in the first embodiment, the error diffusion operation is started from the leading pixel line L0 and ended at the last pixel line Lx. No pixel lines exist preceding the leading pixel line L0. When the pixel values on the leading pixel line L0 are converted into binary values, the produced errors are diffused to neighboring pixels on the same and following lines. Accordingly, much more distortions are liable to occur in the binary states at the pixels on the leading pixel line L0 than at pixels on the following pixel lines. Accordingly, there is a possibility that dots generated in the leading pixel line L0 will tend to be concentrated around certain pixels and therefore will generate undesirable patterns. However, effects from these distortions decrease away from the leading pixel line L0. The distortion effects become minimum at the last pixel line Lx.

Next, the dither matrix producing process according to the present embodiment will be described in greater detail.

The process is the same as that of the first embodiment except for S110 and S120 of the first embodiment. According to the present embodiment, the steps S110 and S120 are replaced with steps S210–S250 shown in FIG. 8. That is, after the uniform density value i is initialized to zero (0) in S100, density value i(x,y) (=i) of one pixel (x,y) of the subject pixel Di (i=0) is retrieved from the working memory 14 in S210. In this example, the subject pixel (x,y) is initially located on the original point (0, 0). Next, in S220, the density value i(x,y) of the subject pixel is converted into a binary value V(x,y) of 0 or 1 while performing an error diffusion operation in the same manner as in the first embodiment. That is, the density value i(x,y) is modified into a modified value I(x,y) by an error sum E from neighboring pixels. When I>t, V(x,y) is set to one (1), and when I≦t, V(x,y) is set to zero (0). Then, a binary error e(x, y) is calculated, and stored in the buffer memory 14a. That is, when employing the minimized average error method, the error e(x, y) is stored in a memory location (x, y) of the buffer memory 14a. When employing the error diffusion method, the error e(x, y) is divided into several fractions, and stored in memory locations for neighboring unprocessed pixels.

Then, it is judged in S230 whether or not the subject pixel (x, y) is located in the region A. When the subject pixel (x, y) is located in the region A (yes in S230), the binary value V(x, y) is stored in the working memory 14 at a corresponding location (x, y) in S240. When the subject pixel is not located in the region A (no in S230), on the other hand, the binary value V(x, y) is not stored in the working memory 14.

Next, in S250, it is judged whether or not any unprocessed pixels remain in the subject matrix Di. When some unprocessed pixels still exist (yes in S250), the program returns to S210 where the above-described processes are attained for the next unprocessed pixel. Thus, during a repeated routine of S210–S250, the pixels of the subject matrix Di are processed one by one in the same manner. It is noted that the judgment in S250 may be modified so as to judge whether or not any unprocessed pixels exist in the region A.

When the negative judgment is achieved in S250, that is, when all the pixels in the subject matrix Di have been processed, a corresponding binary value pixel matrix Fi' is ;completely produced in the memory 14. Then, the program proceeds to S130 (FIG. 6) where it is judged whether or not the present value i reaches 255. When i is not equal to 255 (no in S130), the value i is incremented by one in S140, and the program returns to S210.

Then, in the same manner as described above, the next matrix Di+1 is processed to produce a corresponding matrix Fi+1'. Thus, the matrices D0–D255 are successively processed to produce binary value pixel matrices F0'–F255'. When the affirmative judgment is attained in S130, therefore, the working memory 14 stores 256 matrices F'0–F–255 each of which has been produced from the region A of a corresponding one of the matrices D0–D255. Each matrix Fi' is therefore constructed from only n by m pixels.

Then, in S150, the CPU 12 accumulates the binary values V(x,y) throughout all the matrices F'0–F'255 at each pixel position (x,y) to produce an accumulated value S(x, y). Thus, an accumulated result matrix M'1 is produced. The matrix M'1 therefore has n by m elements. Then, in S160, threshold values TH(x,y) of a dither matrix DM' are calculated based on the accumulated values S(x,y) of the matrix M'1 in S160 in the same manner as in the first embodiment so that each of all the integers between 1 and 255 will be set as a threshold value in at least one of all the n by m elements. The thus produced dither matrix DM' has therefore n by m threshold values TH(x,y), and is stored in the memory 16 in S170.

Thus, according to the present embodiment, after the pixel density values i of the matrices D0–D255 are converted into zero or one through the error diffusion conversion process, the binary values are accumulated only within the region A which has the same size with the dither matrix DM' desired to be produced. The threshold values of the dither matrix DM' are determined based on the thus accumulated values. Because the region A does not include the leading pixel line L0, but includes the last pixel line Lx, the matrix M'1 and therefore the dither matrix DM' are not affected by the distortions which are generated at the leading pixel line L0 during the error diffusion conversion process. The dither matrix DM' can produce a higher quality pseudo-halftone images.

In the above-described first and second embodiments, the working memory 14 stores all the uniform density pixel matrices D0–D255. However, the working memory 14 may store only 256 density values i of 0 to 255 because all the pixels in the matrices Di have the same density values i. Alternatively, the working memory 14 may store only the minimum density value "zero (0)", "the maximum density value (255)", and a step value Sp indicative of an interval with which the density values i are discretely distributed from the minimum value "zero (0)" to "the maximum value (255)". In this example, the step value Sp is one (1).

In the above-described first and second embodiments, binary values V(x,y) are accumulated throughout all the matrices F0–F255 (F'0–F'255) at each pixel position (x, y), and set as a corresponding element S(x,y) of the matrix M1 (M'1). In other words, the total number of the turned-ON pixels is counted at each pixel position, and the counted result is set as a corresponding element of the matrix M1 (M'1). However, the total number of turned-OFF pixels (0) may be counted at each pixel position, and the counted result may be set as a corresponding element of the matrix M1 (M'1). The dither matrix DM (DM') can be produced based on the thus produced matrix M1 (M'1).

The accumulated values S(x,y) may be used as threshold values TH(x,y) of the dither matrix DM. However, the accumulated values S(x,y) may be multiplied by a certain amount of coefficient before being determined as the threshold values TH(x,y) of the dither matrix.

Additionally, the binary value Vi(x,y) located at each pixel position (x, y) in each matrix Fi (Fi') may be multiplied by a coefficient k(i) before being accumulated into a corresponding element S(x,y) of the accumulated result matrix M1 (M'1). The coefficient k(i) may be changed according to the amount of the density value i. A representative example of this calculation method is represented by the following formulas:

$$k(i) \leftarrow i/255$$
$$S(x,y) \leftarrow \Sigma(k(i) \cdot Vi(x,y))$$

where (x, y) represents a pixel point on each pixel matrix Fi (Fi') and an element point on a produced matrix M1 (M'1).

In the above description, the density values of each uniform density pixel matrix Di are converted into either one (1) or zero (0). However, the density values may be converted into one of any other binary values V(x,y). In this case, the matrix M1 (M1') may still be produced through counting the number of pixels which have either one of the two numbers. Then, the matrix M1 (M1') may be converted into a dither matrix DM (DM'). The binary values V(x,y) may be accumulated into a total value for each position (x,y), which will then be used as corresponding element S(x,y) of the accumulated result matrix M1 (M1').

In the second embodiment, the regions A on all the uniform density pixel matrices D0–D255 are located at the same positions with one another. The regions A may be set at different positions in the matrices D0–D255. This is because contribution, of effects in the distortion occurring in the leading pixel line L0, onto the subsequent pixel lines differs according to the amount of the uniform density value i.

Additionally, for the same reasons as described above, the sizes of the uniform density pixel matrices D0–D255 may be changed according to the uniform density values i.

A third embodiment will be described below with reference to FIGS. 9–11, 13(c) and 13(d).

According to the present embodiment, each pixel (x,y) in each matrix Di is converted into a binary value dependent on a binary state of a corresponding pixel (x,y) in the already-processed at least one matrix Di. For example, each pixel (x,y) of a subject matrix Di may be converted into a binary value dependent on a binary state of a corresponding pixel (x,y) in another matrix Di which has been already processed and which has a uniform density value i closest to that of the subject matrix Di. Thus, the respective matrices Di are subjected to the error diffusion-employed conversion process dependently on the already-processed matrix. With the above-described operation, it is further possible to prevent the binary value accumulated states in the matrix M1 from being concentrated around certain values but to cause them to be more properly distributed between 1 and 255. A dither matrix DM, obtained based on the conversion processes, will have threshold values distributed more properly within the range of 1 and 255.

The dither matrix producing process of the present embodiment will be described below with reference to FIGS. 9 through 11.

Figure 9:
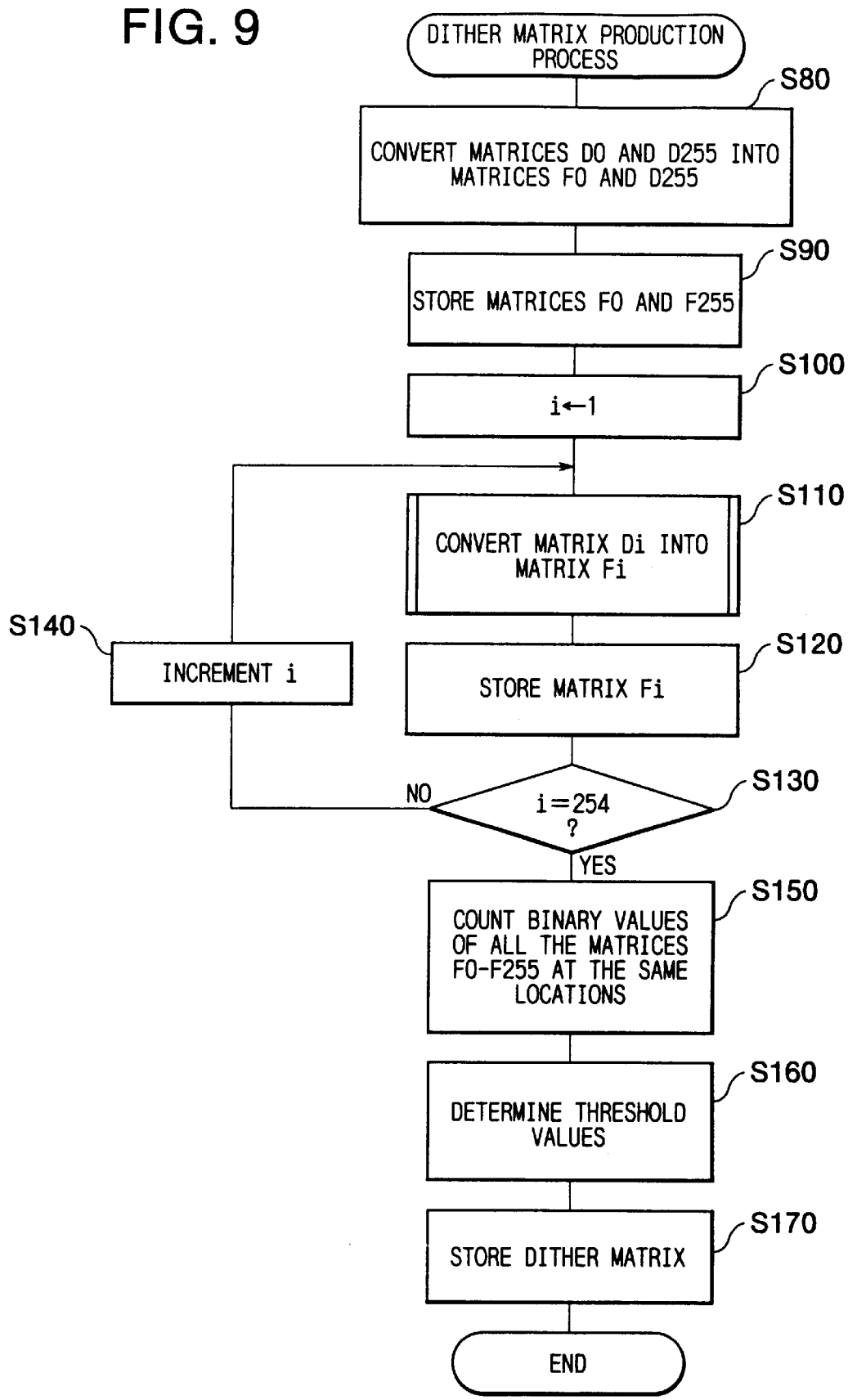
FIG. 9 shows a flowchart of a dither matrix producing process according to a third embodiment.
Figure 10:
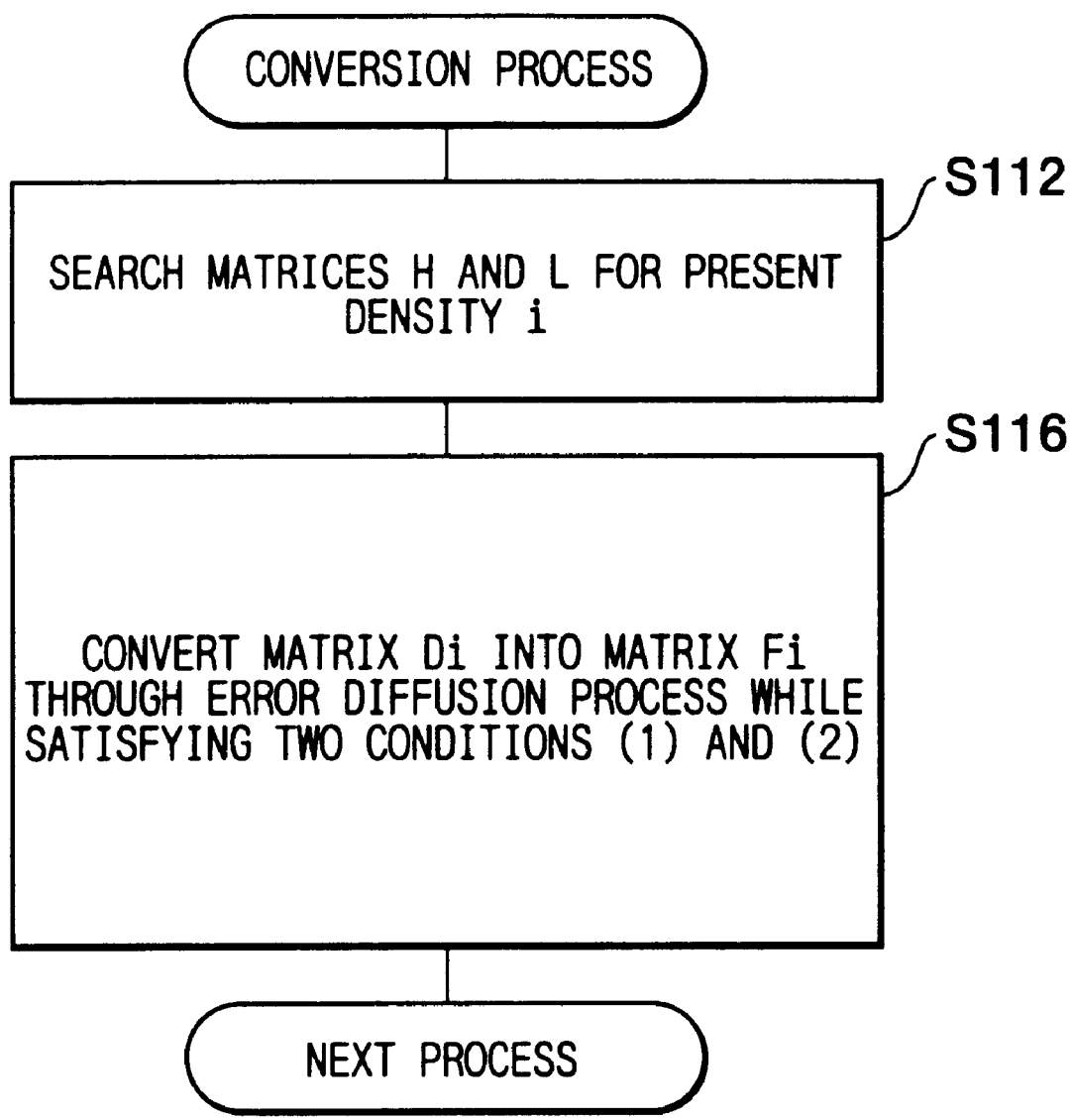
FIG. 10 shows a flowchart of a binary conversion process in the process of FIG. 9.

The dither matrix conversion process of FIG. 9 is the same as that of the first embodiment (FIG. 6) except that S80 and S90 are added, S100 is modified to initialize the pixel density value i to 1, S110 is performed as shown in FIG. 10, and S130 is modified to judge whether or not the present value i is equal to 254.

According to the present embodiment, in S80, both the two matrices D0 and D255 are first converted into two matrices F0 and F25. Because all the pixels in the matrix D0 have density values i of zero (0), the matrix F0 has all the pixels of zero (0) ("OFF"). Similarly, because all the pixels in the matrix D255 have density values i of 255, the matrix F255 has all the pixels of one (1) ("ON"). The matrices F0 and F255 are stored in the working memory 14 in S90. Then, after the value i is initialized to one in S100, the matrices D1 through D254 are successively converted into binary value pixel matrices F1 through F254 in S110.

This conversion process of S110 according to the present embodiment will be described below with reference to FIG. 10.

First, in S112, the CPU 12 searches the content of the working memory 14 to find out an upper-closest binary value pixel matrix H and a lower-closest binary value pixel matrix L for the subject matrix Di. The upper-closest binary value pixel matrix H is defined as a binary value pixel matrix FiH which has been already obtained through the conversion process (S80 or S110) based on a uniform density pixel matrix DiH whose density value iH is higher than the present value i but is closest to the present value i. The lower-closest binary value pixel matrix L is defined as a binary value pixel matrix FiL which has been already obtained through the conversion process (S80 or S110) based on a uniform density pixel matrix DiL whose density value iL is lower than the present value i but is closest to the present value i. Accordingly, for each value i, the matrix H is the matrix F255 and the matrix L is a matrix F(i–1). For example, when the present value i is equal to one, the upper-closest matrix H and the lower-closest matrix L are the matrices F255 and F0, respectively.

Next, in S116, the subject matrix Di is converted into a binary value pixel matrix Fi while performing the error diffusion operation. That is, pixels (x,y) of the subject matrix Di are successively converted into binary values. This conversion process of S116 is the same as that of the first embodiment except that the conversion process of the present embodiment is modified to satisfy the following conditions:

[1] The density value i at each pixel (x,y) on the subject matrix Di is compulsively converted into an "ON" state (1) when corresponding pixels (x,y) on both of the upper-closest and lower-closest matrices H and L have been converted into "ON" states (1); and

[2] The density value i at each pixel (x,y) on each dither matrix Di is compulsively converted into an "OFF" state (0) when corresponding pixels (x,y) on both the upper-closest and lower-closest matrices H and L have been converted into "OFF" states.

In more concrete terms, when the corresponding pixels (x,y) on the matrixes L and H have been converted into different binary values, a conversion process is attained for the subject pixel (x,y) in the same manner as in the first embodiment. That is, the density value i(x,y) of a subject pixel (x,y) is added with a sum E of errors diffused from neighboring pixels, and the thus modified density value I(x,y) is compared with the threshold value t. When the modified density I(x,y) is higher than the threshold t, the pixel is determined as ON. When the modified density I(x,y) is equal to or lower than the threshold t, on the other hand, the pixel (x,y) is determined as OFF. A generated error e will be diffused to neighboring pixels.

Contrarily, when the binary states of the corresponding pixels on the matrices L and H are the same as each other and therefore satisfy the above-described condition [1] or [2], the above-described threshold-comparing operations are not conducted. That is, after the density value i(x,y) of the subject pixel (x,y) is modified by the error sum E distributed from neighboring pixels, the modified density I(x,y) of the subject pixel is automatically converted into ON or OFF according to the above-described condition [1] or [2]. Thereafter, a binary conversion error e is determined as a difference between the thus determined binary value (255 (On) or 0 (OFF)) and the modified density value I(x,y). The error will be diffused to neighboring pixels. That is, when the subject pixel satisfies the condition [1], the pixel is turned ON regardless of a relationship between the modified value and the predetermined threshold value t. When the subject pixel satisfies the condition [2], the pixel is turned OFF regardless of a relationship between the modified value I(x,y) and the predetermined threshold value t.

When all the pixels of the matrix Di are thus converted into binary values and the matrix Di is completely converted into the matrix Fi, the matrix Fi is stored in the memory 14 in S120. The matrices D1–D254 are successively converted into the matrices F1–F254 through S110 through S140. Then, in the same manner as in the first embodiment, the total number S(x,y) of turned-ON signals is counted on each pixel position (x,y) throughout the matrices F0 through F255 in S150, and threshold values TH(x,y) of the dither matrix DM are determined in S160 and then stored in S170.

FIG. 11(*a*) illustrates how each pixel position (x,y) on each matrix Di is turned ON or OFF. As apparent from the drawing, for each pixel position (x,y), when a certain pixel on a certain matrix Di is turned ON, corresponding pixels i'(x,y) on all the subsequent matrices Di' (i'>i) satisfy the condition [1] and therefore are turned ON. Contrarily, when the conversion process is achieved as in the first embodiment without referring to the above-described condition [1] or [2], even when a certain pixel i(x,y) on a certain matrix Di is turned ON, corresponding pixels i'(x,y) on the subsequent matrices Di' (i'>i) may possibly be turned OFF as shown in FIG. 11(*b*). Accordingly, in the present embodiment, the total number S(x,y) of the ON-turned pixels will be more widely distributed between 0 to 255 than in the first embodiment. Threshold values TH(x,y) of a dither matrix DM, produced based on the thus produced matrix M1, will also be more properly distributed. The thus produced dither matrix DM can dither continuous tone images into a higher quality pseudo-half tone images.

Figure 13:
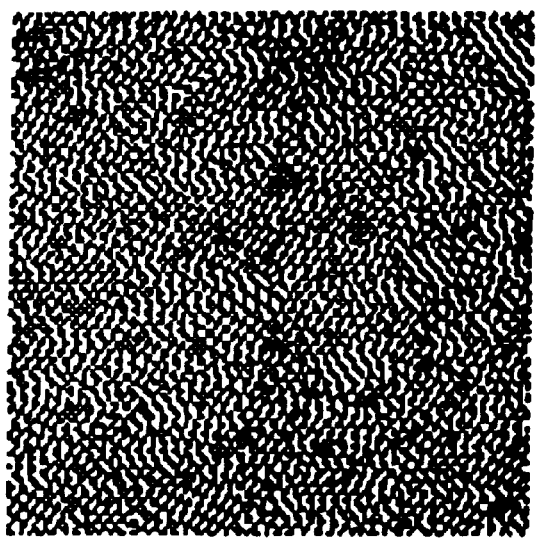
FIGS. 13(a)–13(d) illustrate binary pixel matrices obtained according to the third and fourth embodiments.
Figure 13:
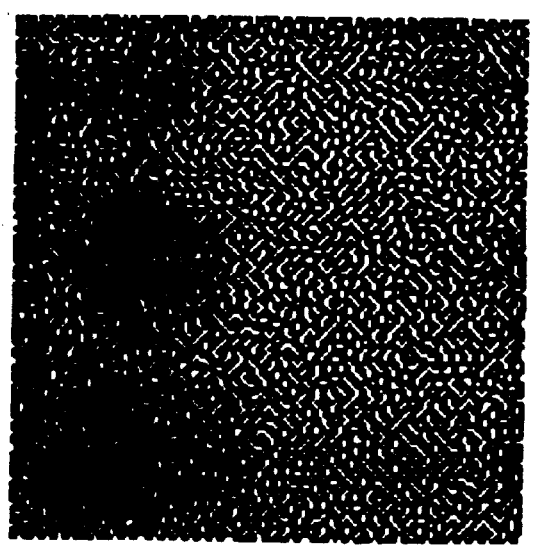
Figure 13:
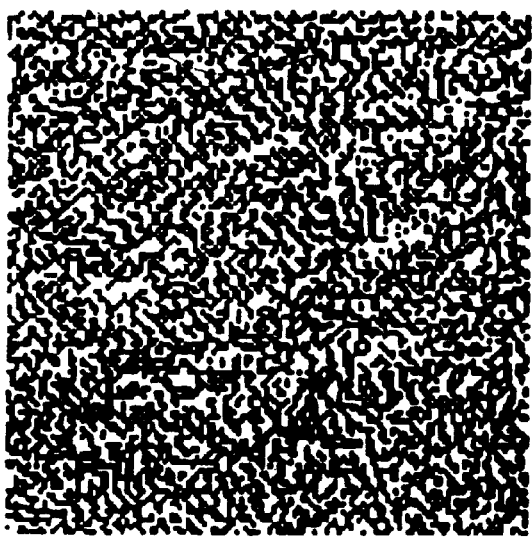
Figure 13:
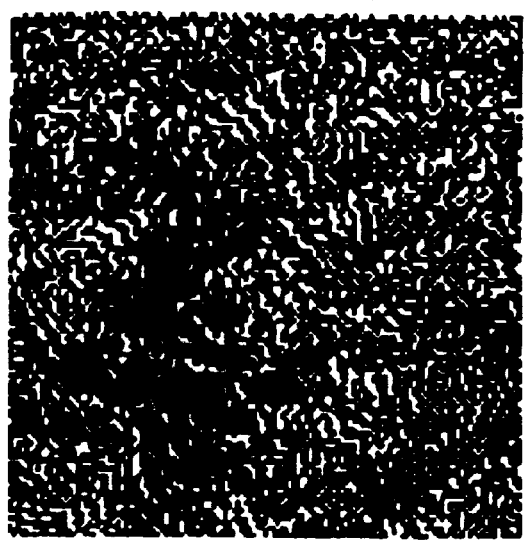

FIGS. 13(*c*) and 13(*d*) show matrices F128 and F192 obtained according to the present embodiment. In each drawing, black dots represent ON pixels, and white dots represent OFF pixels. As apparent from the drawings, both of the ON and OFF dots are distributed over each matrix irregularly to a proper extent but not completely at random. Accordingly, threshold values of a dither matrix DM, produced based on those matrices, will also be properly distributed from 0 to 255.

In the above description, the conversion process of S110 is repeatedly performed while the uniform density value i is incremented one by one in S140. Accordingly, the condition [2] is not necessarily referred to. That is, each matrix Di may be converted into a matrix Fi while simply referring to the already-processed lower-closest binary matrix L. Pixels (x,y) of each matrix Di may be turned ON when the corresponding pixels (x,y) of the lower-closest binary matrix L have been turned ON. That is, when ON appears on a certain pixel (x,y) at a certain matrix Di, the CPU 12 may continue turning ON the corresponding pixels (x,y) of the subsequent matrices Di' (i'>i). Then, a threshold value TH(x,y) of each element (x,y) in the dither matrix DM may be determined as a density value i of a matrix Di, at which the corresponding pixel (x,y) has been first converted into ON as shown in FIG. 11(*a*). For example, a threshold value of "2" may be set to an element (15,36) in the case of FIG. 11(*a*). In this case, the threshold value TH(x,y) may be determined as a product of the first turned-ON matrix density value i and a certain coefficient.

Alternatively, the conversion process of S110 may be repeatedly performed while the uniform density value i is decreased one by one from 254 to 1 in S140. In this case, the conversion process can be performed while referring only to the condition [2]. That is, each matrix Di may be converted into a matrix Fi simply referring to the already-processed upper-closest binary matrix H. Pixels (x,y) of each matrix Di may be turned OFF when the corresponding pixel (x,y) of the upper-closest binary matrix H has been turned OFF. That is, when OFF appears on a certain pixel (x,y) at a certain matrix Di, the CPU 12 may continue turning OFF the corresponding pixels (x,y) in the subsequent matrices Di' (i'>i). A threshold value TH(x,y) of each element (x,y) in the dither matrix DM may be determined as a density value i(x,y) of a matrix Di, at which the corresponding pixel position (x,y) has been first converted into OFF. Also in this case, the threshold value TH(x,y) may be determined as a product of the first turned-OFF matrix density value i and a certain coefficient.

In the above description, the uniform density value i is increased or decreased one by one in S140 while the conversion process is repeatedly performed in S110. However, the uniform density value i may be increased in increments of two or more or may be decreased in decrements of two or more. For example, matrices D1, D3, D5, . . . may be converted into matrices F1, F3, F5, . . . , and then the remaining matrices D2, D4, . . . are converted into matrices F2, F4, . . . so that all the matrices F1–F254 will be obtained at last. In this case, both of the conditions [1] and [2] are necessarily considered.

A fourth embodiment will be described below with reference to FIGS. 12 through 15.

Figure 12:
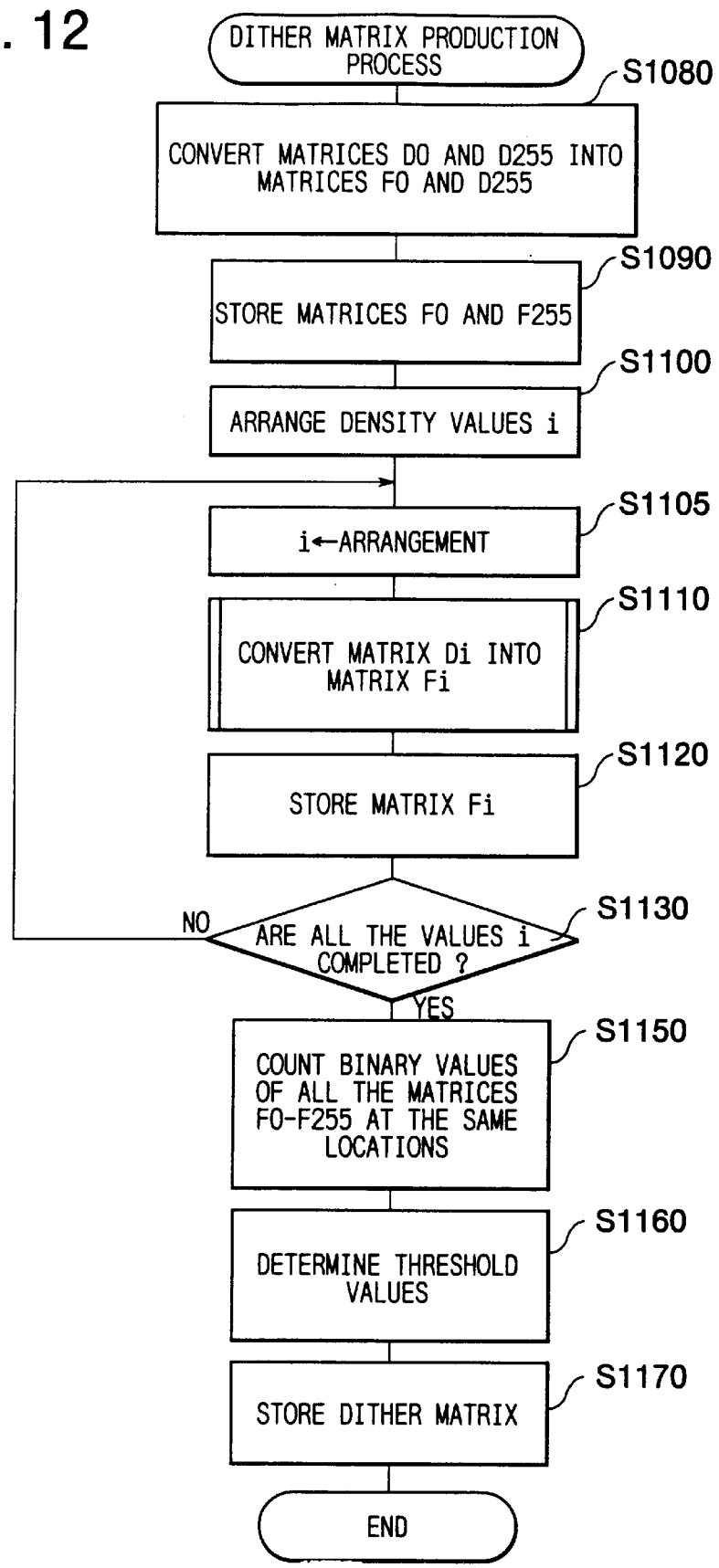
FIG. 12 shows a flowchart of a dither matrix producing process according to a fourth embodiment.

The dither matrix production process of the fourth embodiment is shown in FIG. 12. In this method, the steps S1080, S1090, S1110, S1120, S1150, S1160, and S1170 are respectively the same as those of the steps S80, S90, S110, S120, S150, S160, and S170 of the third embodiment. Description of these steps are therefore omitted.

The present embodiment is different from the third embodiment in the order of converting the matrices D1–D254 into matrices F1–F254. That is, in S1100, the uniform density values i of 1 to 254 are first arranged in a predetermined order. Then, in S1105, one uniform density value i is selected from the arrangement according to the predetermined order. A matrix Di of the retrieved uniform density value i is then subjected to the converting-and-storing processes of S1110 and S1120. When the converting-and-storing processes are completed for the matrices Di of all the uniform density values 1–254 (yes in S1130), the processes of S1150, S1160, and S1170 are performed.

Details of the value arrangement production process of S1100 are described below.

The uniform density values i of 1 to 254 are arranged so that each density value i is equal to a central integer between its upper-closest density value iH and its lower-closest uniform density value iL. The upper-closest density value iH for each value i is defined as a density value which is higher than but closest to that value i in all the values appearing in the value arrangement preceding that density value i. The lower-closest density value iL for each value i is defined as a density value which is lower than but closest to that value i in all the values appearing in the value arrangement preceding that density value i.

In more concrete terms, the uniform density values i of 128, 64, 192, 32, 96, 160, 224, and so on are arranged in this order. The value 128 is a central integer between its value iL of zero (0) and its value iH of 255. (It is noted that the other central integer 129 may be located in place of 128.) The value 64 is a central integer between 0 (iL) and 128 (iH). The value 192 is a central value between 128 (iL) and 255 (iH). (It is noted that the other central integer 191 may be located in place of 192.) Similarly, the value 32 is a central integer between zero (0) and 64. The value 96 is a central integer between 64 and 128. The value 160 is a central integer between 128 and 192. The value 224 is a central value between 192 and 255. (It is noted that the other central integer 223 may be located in place of 224.)

This density value arrangement may be previously calculated and stored in the program memory 13, and may be retrieved therefrom during the process of S1100.

The routine of S1105–S1130 are repeatedly performed while density values 128, 64, . . . are successively selected from the value arrangement in S1105. As a result, matrices D128, D64, . . . are successively converted into binary matrices F128, F64, . . . in this order. When each matrix Di is subjected to the conversion process of S1110, the matrix Di is converted into the matrix Fi while referring to its lower-closest matrix L (FiL) and its upper-closest matrix H (FiH). Because each value i is a central integer between the values iL and iH, each matrix Di can be equally influenced from the binary value distributions obtained at the upper-closest matrix H and at the lower-closest matrix L. Accordingly, each matrix Fi will have uniformly-distributed binary values. A dither matrix DM, produced based on the thus produced matrices F0–F255, can convert continuous tone images into binary images with a high resolution and without any undesirable textures.

FIGS. 13(*a*) and 13*b* show matrices F128 and F192 obtained according to the present embodiment. In each drawing, black dots represent ON pixels, and white dots represent OFF pixels. As apparent from the drawings, both of the ON dots and OFF dots are distributed over the matrix more uniformly in comparison with the matrices of FIGS. 13(*c*) and 13(*d*). Accordingly, the threshold values of a dither matrix DM, produced based on matrices F0–F254 including these matrices, can convert continuous tone images into binary images with a higher resolution and without any undesirable textures.

In the above description, the uniform density values i are arranged in S1100 before the conversion operation of S1105–S1130 so that each value i is a central value between its precedingly-arranged upper-closest and lower-closest values iH and iL.

Figure 14:
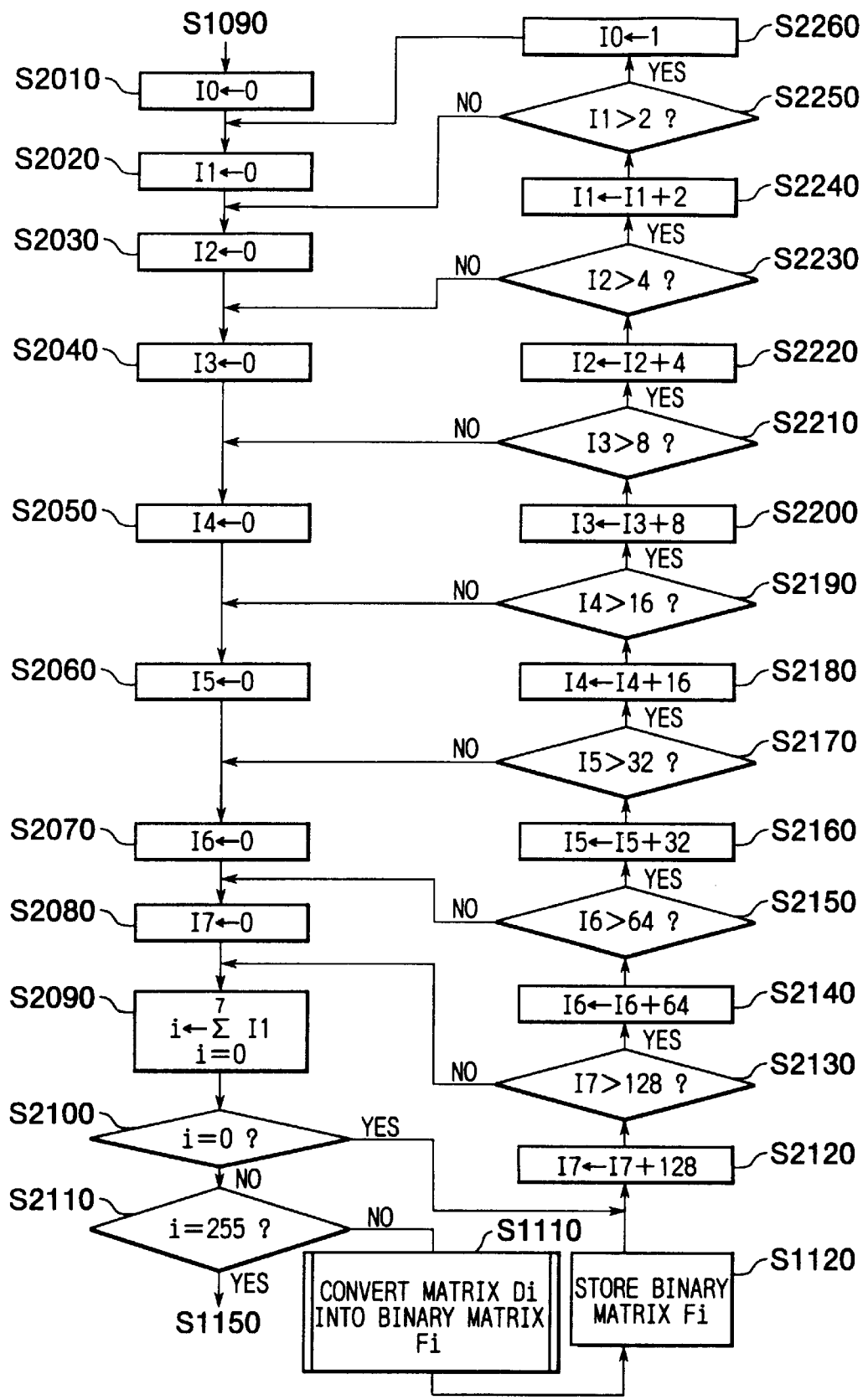
FIG. 14 is a main portion of flowchart of a modification of the fourth embodiment.

Alternatively, the processes of S1100–S1130 will be modified to determine a value i of a subject matrix Di to be processed, as a central value between density values i of already-processed two matrices Di, and then to process the subject matrix. FIG. 14 shows an example of processes for calculating the value i of the subject matrix Di to be processed. This process takes place of S1100 through S1130 in FIG. 12. In this process, first, eight variables I0 through I7 are initialized to zero (0) in S2010 through S2080. Then, a density value i is set to a sum of the eight variables I0 through I7 in S2090. If the value i is equal to zero (0), variable I7 is incremented by 128 in S2120. Because I7 thus becomes equal to 128 (S2130:NO), the density value i is set in S2090 to a sum of the present eight variables I0 through I7, that is, to 128. Because the value i is not equal to 0 (S2100:NO) and the value i is not equal to 255 (S2110:NO), the converting-and-storing processes in S1110 and S1120 are executed in the same manner as those of FIG. 12. That is, the matrix Di (i=128) is converted into a matrix Fi (i=128) in S1110, and the matrix Fi (i=128) is stored in S1120.

Next, the variable I7 is further increased by 128 in S2120. As a result, I7 becomes equal to 256. Because I7 becomes higher than 128 (S2130:YES), the variable I6 is increased by 64 in S2140. As a result, I6 becomes equal to 64. Because I6 is equal to 64 (S2150:NO), the variable I7 is initialized to zero (0) in S2080. In S2090, the value i is now set to 64 which is a sum of the present eight variables I0 through I7. The processes in S2100, S2110, S1110, and S1120 are executed to convert the matrix Di (i=64), and a produced matrix Fi (i=64) is stored in S1120.

Next, I7 is set to 128 in S2120. Because I7 becomes equal to 128 (S2130:NO), and because I0 through I5 are zero (0), I6 is equal to 64, and I7 is equal to 128, the value i is now set to 192 in S2090. After S2100 and S2110 are executed, the matrix D192 is converted into a matrix F192 in S1110, and the produced matrix F192) is stored in S1120. Because I0 through I5 are now equal to zero (0), I6 is now equal to 64, and I7 is now equal to 128 (S2130:YES, S2140:YES, S2150:YES), the variable I5 is increased by 32, and accordingly I5 becomes equal to 32 in S2160. Because I5 is equal to 32 (S2170:NO), S2070 and S2080 are executed. Because I0 through I4 are now equal to zero (0), I5 is equal to 32, I6 is equal to 0, and I7 is equal to zero (0), the value i becomes 32 in S2090, and the matrix D32 is converted into a matrix F32 in S1110.

Then, the process returns to S2090 via S2120 and S2130. Because I0 through I4 are still equal to zero (0), I5 is equal to 32, I6 is equal to zero (0), and I7 is equal to 128, the value i is set to 160 in S2090. The matrix D160 is converted into a matrix F160 in S1110. Because I0 through I4 are still equal to zero (0), I5 is equal to 32, I6 is equal to 64, and I7 is equal to zero (0) via S2120–S2150 and S2080, the value i is now set to 96 in S2090, and the matrix D96 is converted into a matrix F96 in S1110.

Likewise, in accordance with values of the variables I0 through I7, the value i is further successively set to 224, 16, 144, 80, . . . , 127 via the processes of S2020–S2080 and S2120–S2260 in order to convert the uniform density pixel matrices D224, D16, D144, . . . , and D127 into matrices F224, F16, F144, . . . , and F127. At last, I0 becomes 1, I1 becomes 2, I2 becomes 4, I3 becomes 8, I4 becomes 16, I5 becomes 32, I6 becomes 64, and I7 becomes 128. The value i is therefore set to 255 in S2090. Because the value thus becomes equal to 255 (S2110:YES), the program proceeds to S1150 (FIG. 12). As described above, the calculation is successively performed to determine the central values (i) of the precedingly-calculated values, and the conversion process is successively performed onto the matrices of the determined values (i).

In the above description, conversion processes are achieved onto the matrices Di of the successively-determined values (i) which are equal to the exact center of the values iH and iL of the already-processed matrices H and L. However, the conversion processes may not be performed onto matrices Di with its density value i being the exact center of the values iH and iH of the matrices L and H. Alternatively, the conversion processes may be performed onto matrices Di which have such values i that fall within a range between the preceding upper-closest and lower-closest values iH and iL but that is closer to either one of the values iH and iL than to the other. For example, the values i of the matrices Di may be located at a position which divides the range between the preceding upper-closest and lower-closest values iH and iL at 1:2, 1:3, 2:1, 3:1, or the like.

Figure 15:
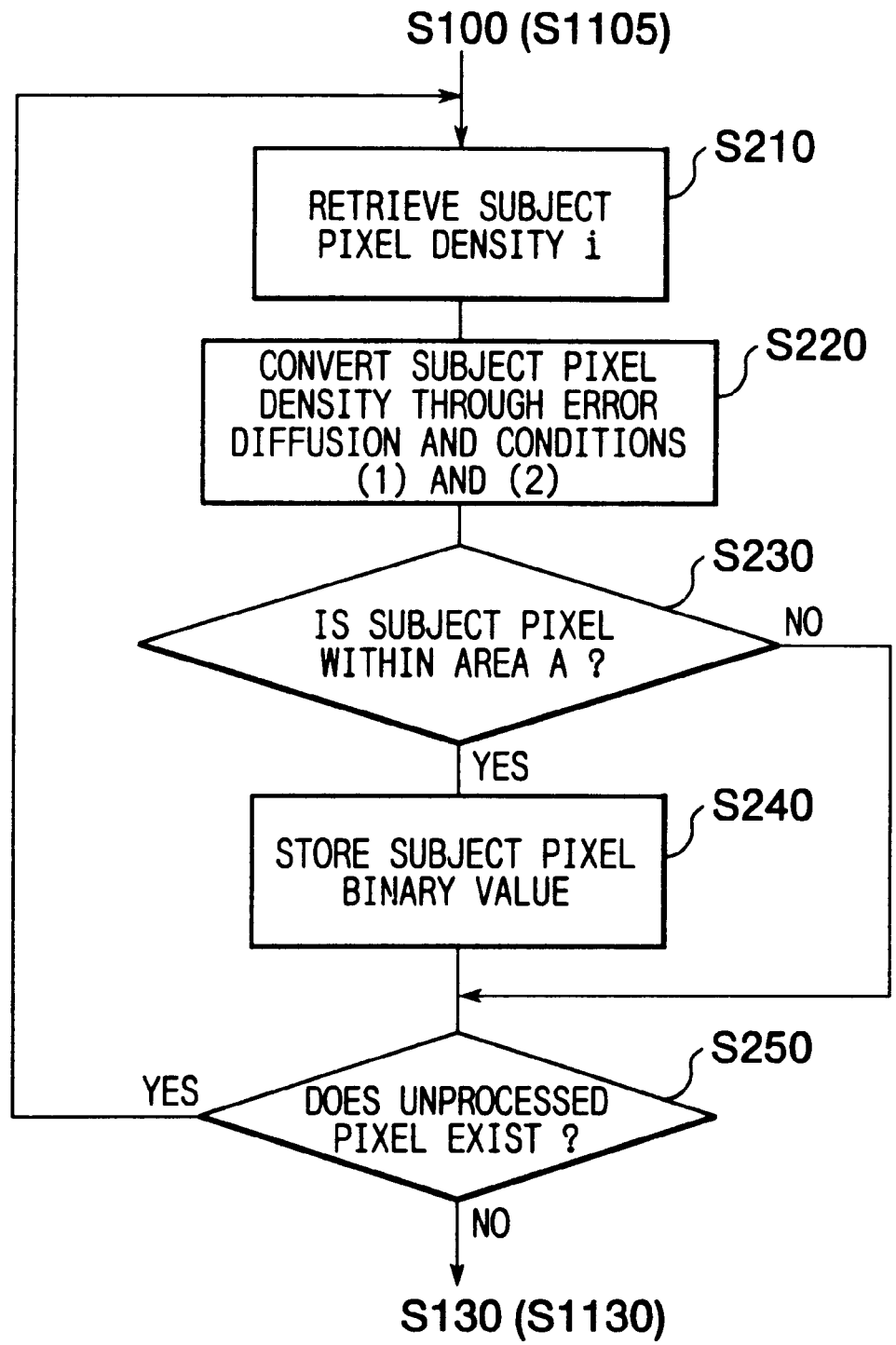
FIG. 15 is a main portion of flowchart of another modification of the fourth embodiment.

The above-described conversion manner of the third and fourth embodiments may be applied to the second embodiment. In this case, the converting-and-storing steps of S110 and S120 of the third embodiment and S1110 and S1120 of the fourth embodiment may be modified as shown in FIG. 15. The series of processes S210–S250 in FIG. 15 are the same as those of the second embodiment (FIG. 8) except for the conversion step S220. According to the present embodiment, in S220, pixels (x,y) of the subject matrix Di are converted into binary values while referring to the conditions [1] and [2] in the same manner as in the steps S112 and S116.

According to the fourth embodiment, the effects as shown in FIG. 11(a) are also obtained. Accordingly, a threshold value TH(x,y) of each element (x,y) in the dither matrix DM may be determined as a density value i of a matrix Di, at which the corresponding pixel (x,y) has been first converted into ON (or OFF) as shown in FIG. 11(a).

Figure 16:
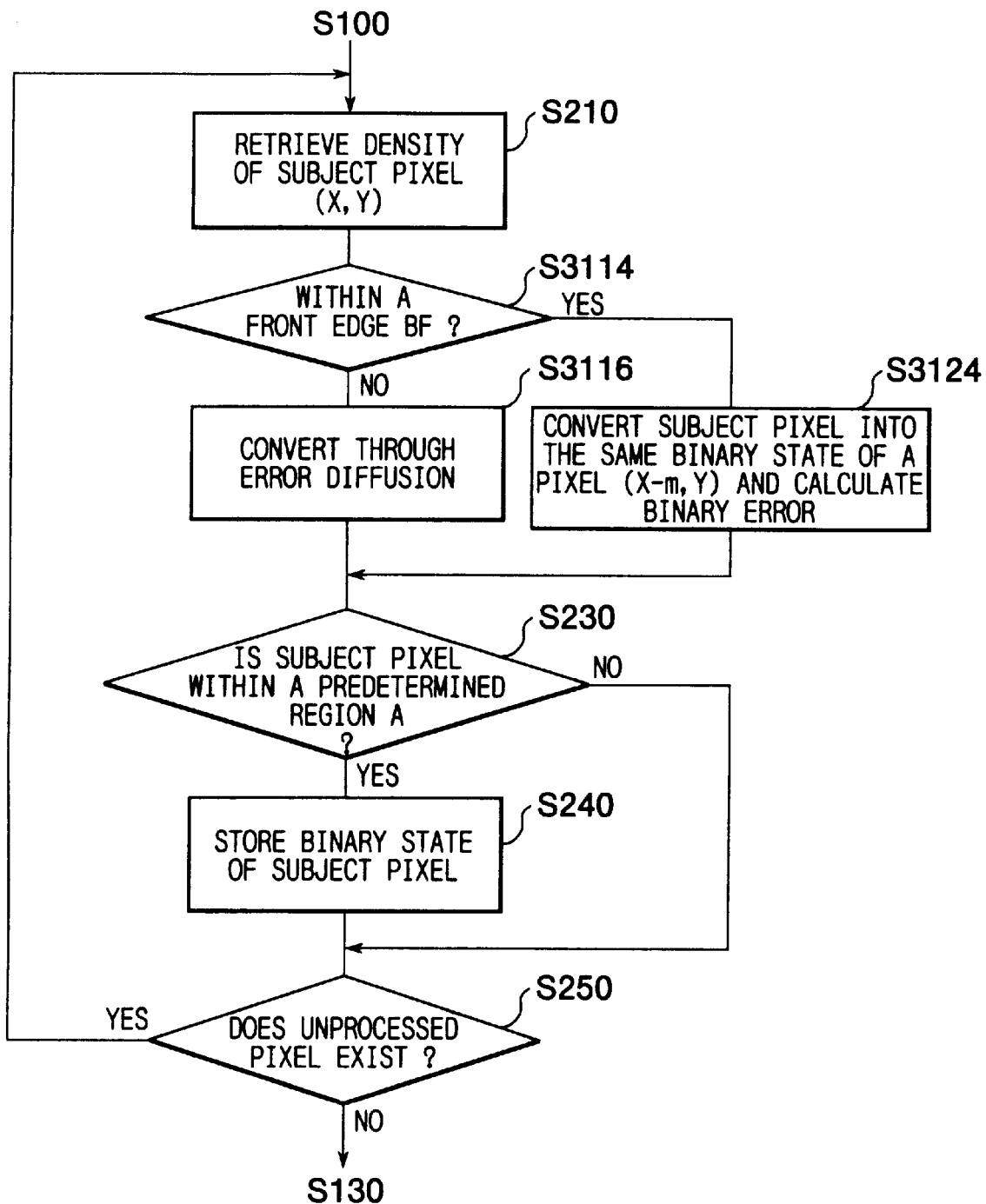
FIG. 16 shows a main portion of a flowchart of a fifth embodiment.

A fifth embodiment will be described below with reference to FIGS. 16–18.

The fifth embodiment is attained in order to further improve the dither matrix so that the dither matrix can convert continuous tone images into binary images which will not suffer from any nonuniformity of colors or tones at boundaries between the dither matrix-replicated regions. According to the present embodiment, a dither matrix DM' is produced based on the binary states of the matrices F0'–F255' each of which is produced only from the predetermined region A of a corresponding matrix D0'–D255' as in the second embodiment. During the binary conversion process performed onto the region A, a boundary process is employed to continuously convert pixels at both ends of the region A along the main scanning direction X.

The present embodiment will be described below in greater detail. The dither matrix producing process (FIG. 16) of the present embodiment is the same as that of the second embodiment except that the conversion process of S220 of the second embodiment (FIG. 8) is placed with steps of S3114, S3116, and S3124.

Accordingly, the steps S3114, S3116, and S3124 will be described below.

Figure 17:
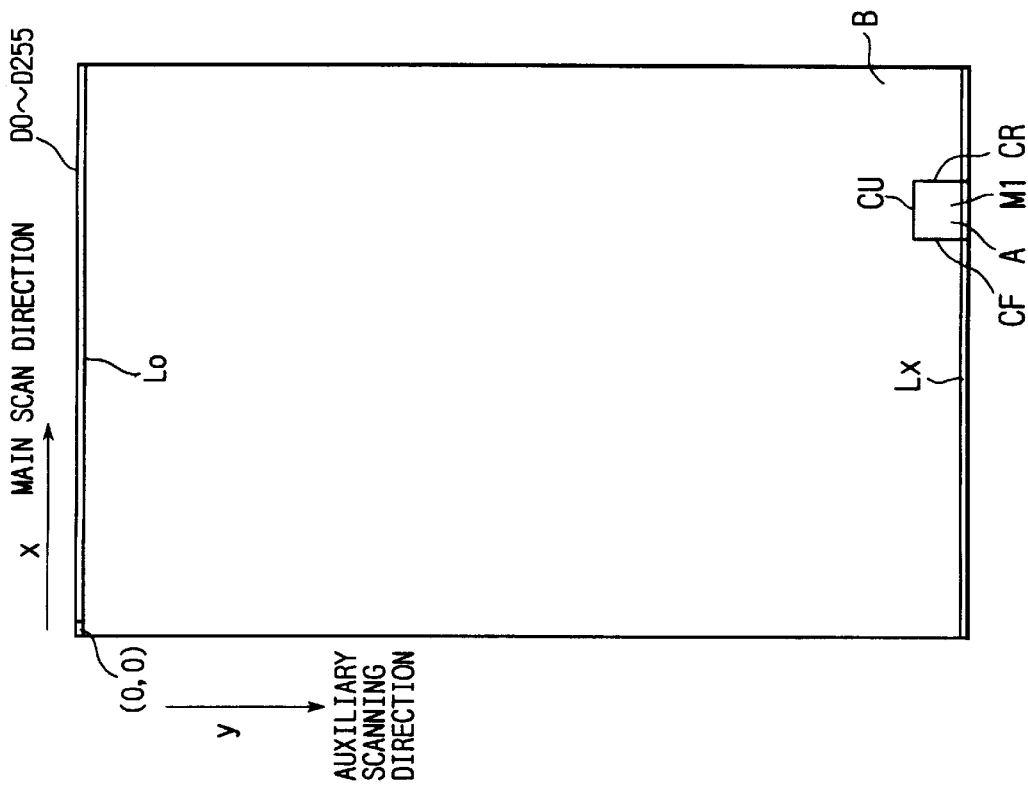
FIG. 17 shows how a predetermined portion A is located in each matrix Di.

It is noted that in the same manner as in the second embodiment, as shown in FIG. 17, the predetermined region A is defined in each of the matrices D0–D255. Each matrix Di has a remaining outside region B defined as outside of the predetermined region A. The predetermined region A contacts the outside region B via three boundaries CR, CF, and CU. As shown in FIG. 18, the outside region B has a front edge BF which contacts the boundary CR, across which the conversion process is successively performed in the main scanning direction X from the predetermined region A to the outside region B. The outside region B also has a rear edge BR which contacts the boundary CF, across which the conversion process is successively performed in the main scanning direction X from the outside region B to the predetermined region A. The region A has a rear edge AR contacting the boundary CR, and a front edge AF contacting the boundary CF.

The step S3114 judges whether or not the subject pixel (x, y) is located within the front edge BF. When the subject pixel is not within the front edge BF (no in S3114), the subject pixel is subjected to the binary conversion process through the error diffusion operation in S3116. The process of S3116 is the same as that in S220 in the second embodiment.

In this example, the error diffusion operation is achieved based on the minimized average error method defined by the formulas (1) through (5).

When the error diffusion conversion process of S3116 is completed for the subject pixel (x, y), it is judged in S230 whether or not the subject pixel (x, y) is within the predetermined region A. Only when the subject pixel is within the predetermined region A, the obtained binary value is stored in S240 in the same manner as in the second embodiment.

When it is determined that the subject pixel (x, y) is within the front edge BF (yes in S3114), on the other hand, another conversion operation is performed in S3124 in a manner described below.

The CPU 12 first calculates the formula (1) also for the subject pixel (x, y) to obtain a modified density I(x, y). However, the CPU 12 does not compare the modified density I(x, y) with the threshold t. The CPU 12 employs, as a binary result V(x,y) for the subject pixel (x, y), a binary result which has been already determined for a pixel (x-m, y) which is located prior to the subject pixel (x, y) and apart from the subject pixel (x, y) by "m" pixels' worth of distance in the main scanning direction X. Then, the CPU 12 calculates an error e as a difference between the thus determined binary state value 0 (OFF) or 255 (ON) and the modified density I(x, y). For example, when the binary result obtained at the pixel (x-m, y) is ON, then, the CPU 12 turns ON the subject pixel (x, y) and calculates the formula (4) to obtain the error e(x, y). When the binary result at the pixel (x-m, y) is OFF, on the other hand, the CPU 12 turns OFF the subject pixel (x, y) and calculates the formula (5) to obtain the error e(x, y). Thus, without comparing the modified density I with the threshold t, the CPU 12 performs an error diffusion process dependently on the binary result obtained for the already-processed pixel (x-m, y).

Figure 18:
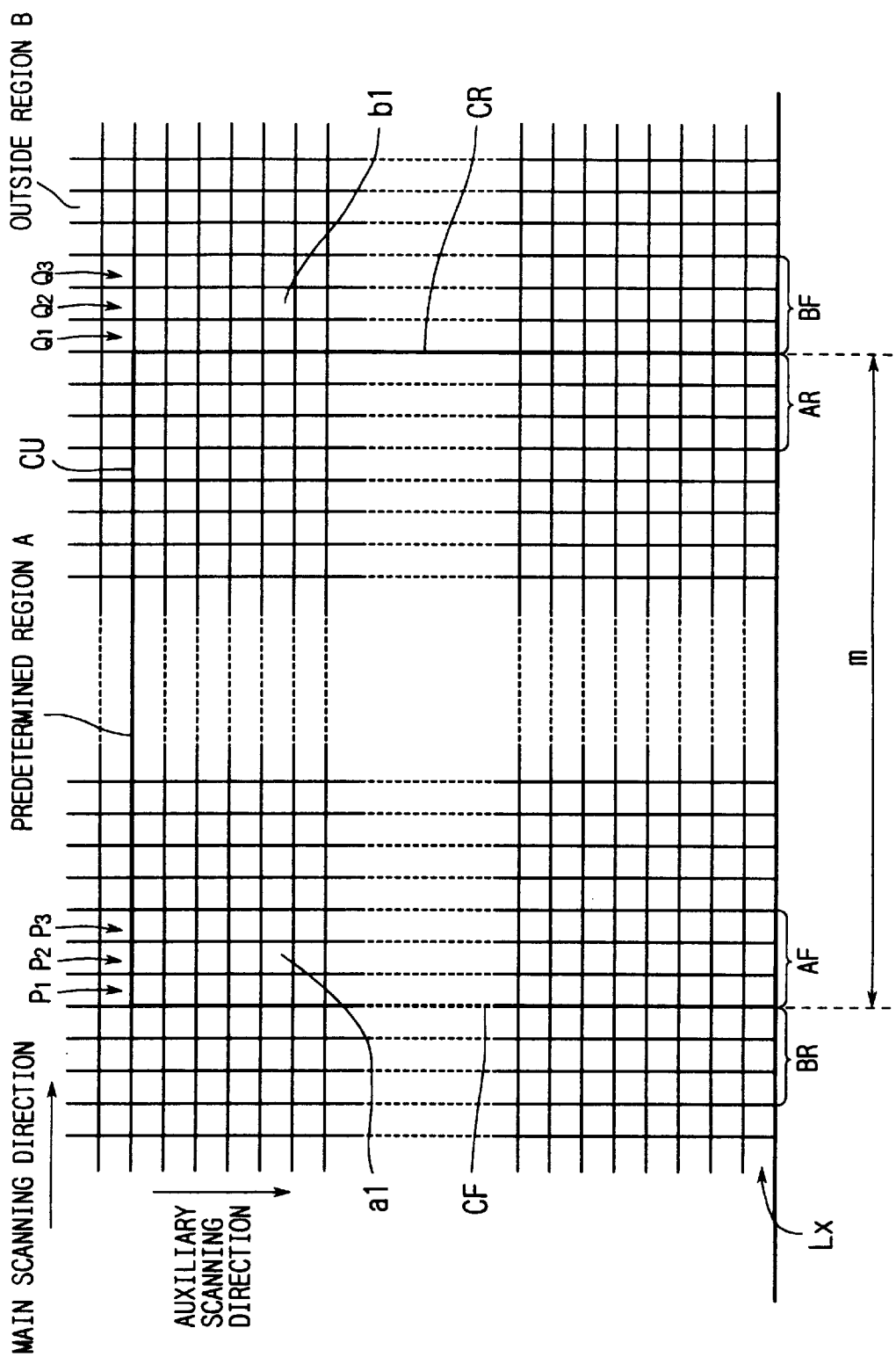
FIG. 18 is an enlarged view of the predetermined portion A and its neighboring portion.

It is noted that as shown in FIG. 18, the "m" pixels' worth of distance is equal to a width of the predetermined region A in the main scanning direction X. Accordingly, the pixels within the front edge BF are converted into binary states the same as those of pixels within the front edge AF of the predetermined region A. As shown in FIG. 18, the front edge BF includes three pixel columns Q1, Q2, and Q3. The front edge AF includes three pixel columns P1, P2, and P3. The three pixel columns Q1, Q2, and Q3 are converted into binary states the same as those of the three pixel columns P1, P2, and P3. For example, a pixel "b1" is converted into a binary state the same as that of a pixel "a1".

Similarly as in the second embodiment, when all the pixels of the dither matrix Di are converted into binary states, a matrix Fi' is completely produced. When all the dither matrices D0–D255 are subjected to the conversion process, and matrices F'0–F'255 are produced, the binary values are accumulated throughout all the matrices F'0–F'255 for each pixel position, and a matrix M1' is produced. Then, a dither matrix DM' is produced based on the matrix M1'.

As described above, according to the fifth embodiment, the pixels within the front edge BF are converted into binary states the same as those of the pixels within the front edge AF. Because each pixel receives binary errors from neighboring pixels located as required by the coefficient matrix α, the pixels within the rear edge AR can receive binary conversion errors directly or indirectly from the pixels within the front edge BF. Because the binary states of the pixels within the front edge BF are set the same as those of the pixels within the front edge AF, it can be said that a binary conversion process is performed continuously from the front edge AF to the rear edge AR. Accordingly, the dither matrix DM' produced according to the present embodiment can dither continuous tone images into pseudo-halftone images which will not suffer from any nonuniformity of colors or tones at boundaries between the dither matrix-replicated regions. The pseudo-halftone images will not suffer from any undesirable boundary lines.

A sixth embodiment will be described below with reference to FIGS. 19–21. According to the present embodiment, the binary conversion process is successively attained through the rear edge AR and the front edge BF in a direction reverse to the main scanning direction X. Thus, the binary state of the front edge AF can be more effectively influenced onto the rear edge AR.

Figure 19:
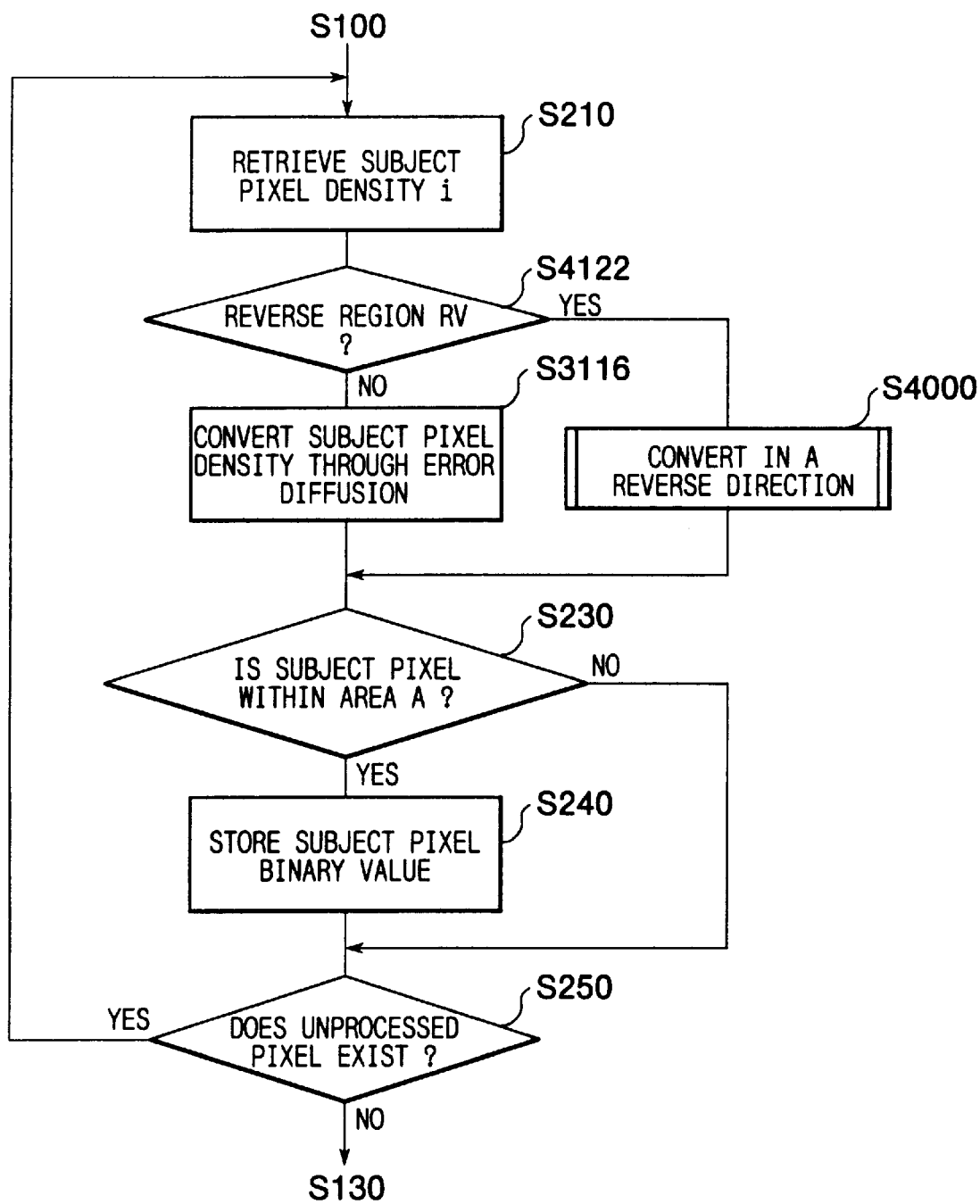
FIG. 19 shows a main portion of a flowchart of a sixth embodiment.
Figure 20:
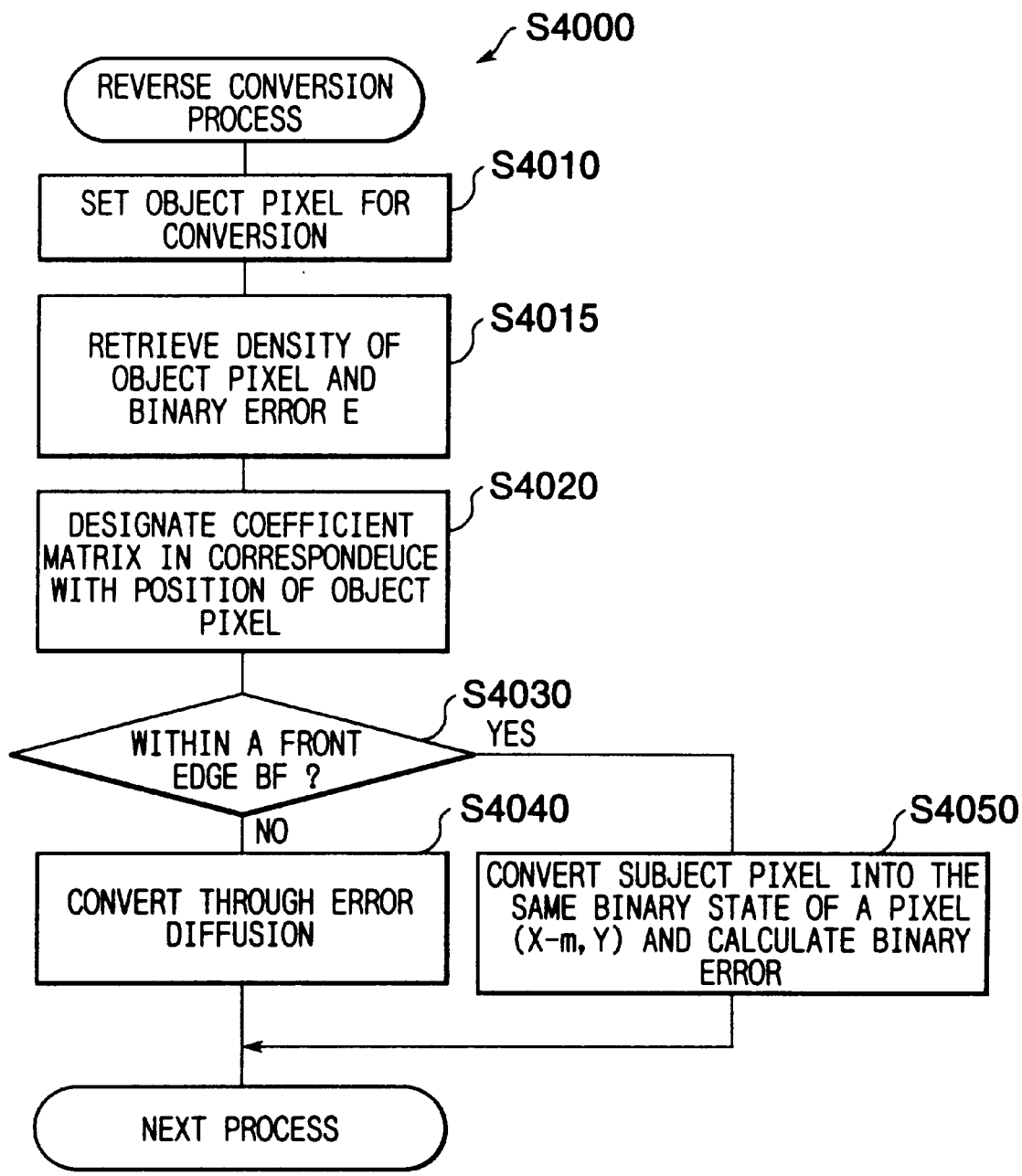
FIG. 20 is a flowchart of a reverse conversion process.

The dither matrix production process of the present embodiment shown in FIG. 19 is the same as that of the fifth embodiment except that the steps S3114 and S3124 of the fifth embodiment (FIG. 16) are placed with S4122 and S4000. In this example, the error diffusion operation is performed during S3116 and S4000 with using the error diffusion method defined by the formulas (6)–(9).

Figure 21:
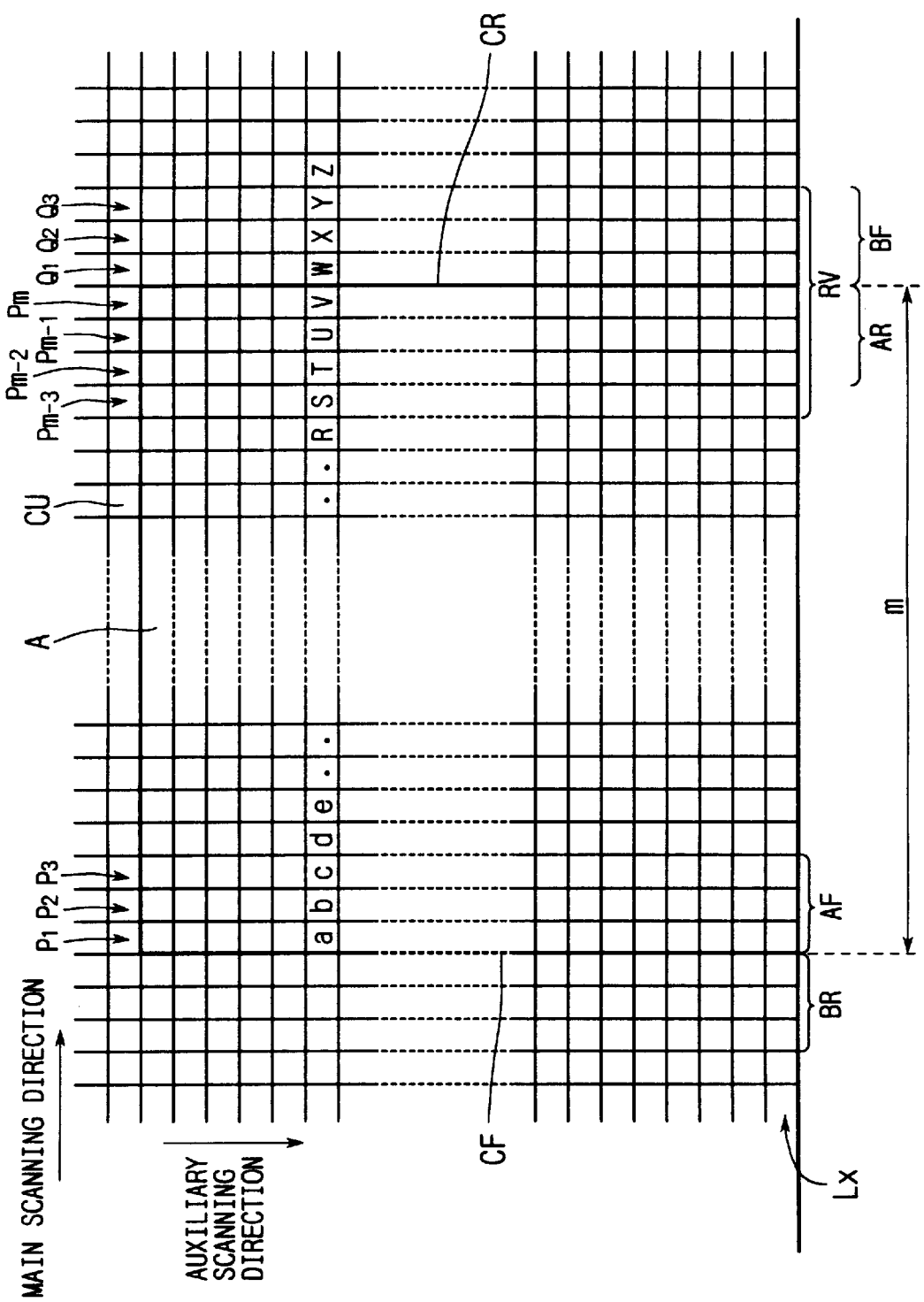
FIG. 21 is an enlarged view of the predetermined portion A and its neighboring portion.

According to the present embodiment, a reverse region RV is defined as shown in FIG. 21. That is, the reverse region RV includes a pixel column $P_{m-3}$, the entire rear edge AR (i,e., pixel columns $P_{m-2}$, $P_{m-1}$, and $P_m$), and the front edge BF (i.e., the pixel columns Q1, Q2, and Q3).

The points of the dither matrix producing process of the present embodiment differing from those of the fifth embodiment will be described below.

When the subject pixel density is retrieved in S210, it is judged in S4122 whether or not the subject pixel (x,y) is located within the reverse region RV. When the subject pixel is within the reverse region RV (yes in S4122), a reverse conversion process is performed in S4000. On the other hand, while the subject pixel is not within the region RV (No in S4122), the processes of S3116 to S250 are repeatedly executed in the same manner as in the fifth embodiment. The step S3116 is the same as that of S3116 in the fifth embodiment except that the step S3116 of the present embodiment employs the error diffusion method defined by the formulas (6)–(9). Thus, during a repeated routine of S210–S250, a subject pixel is shifted one by one in the main scanning direction X. The density value of the subject pixel is converted into a binary state through the error diffusion operation, and a produced binary error is distributed to neighboring pixels not yet processed on the weighted basis defined by the coefficient β in the formula (9). When the subject pixel (x,y) reaches the pixel column $P_{m-3}$, that is, the reverse region RV (yes in S4122), the process of S4000 is executed.

The process of S4000 will be described below with reference to FIG. 20.

First, in S4010, an object pixel is set. The object pixel is for being actually subjected to a conversion process. This setting process is described for a certain pixel line shown in FIG. 21. The pixel line includes pixel positions a, b, c, . . . , X, Y, Z, . . . When the subject pixel (x,y), which is shifted one by one through the loops S250–S210, reaches the pixel position S, the pixel Y is set as an object pixel to be subjected to a conversion process. When the subject pixel (x,y) reaches the next pixel T, the pixel X is set as an object pixel to be subjected to a conversion process. Thus, while the subject pixel is successively shifted to the pixel positions U, V, W, X, and Y, the pixels W, V, U, T, and S are successively set as an object pixel. To summarize, in the reverse region RV, the conversion process is successively performed in a direction reverse to the main scanning direction X, in which the conversion process is performed in other remaining regions.

When an object pixel is thus determined for the subject pixel in S4010, the density i of the object pixel is retrieved from the working memory 14, and the binary error sum E is retrieved from the error buffer 14a at a memory location for the object pixel in S4015. Next, in order to perform the conversion process, a coefficient matrix is designated in correspondence with a location of the object pixel in S4020.

The program memory 13 previously stores therein not only the coefficient matrix β but also five coefficient matrices β1 through β5. The matrices β1 through β5 are shown below.

$$\beta_1 \equiv \begin{pmatrix} 5/60 & 7/60 & * & 7/60 & 5/60 \\ 3/60 & 5/60 & 7/60 & 5/60 & 3/60 \\ 1/60 & 3/60 & 5/60 & 3/60 & 1/60 \end{pmatrix}$$

$$\beta_2 \equiv \begin{pmatrix} 5/53 & 7/53 & * & & 5/53 \\ 3/53 & 5/53 & 7/53 & 5/53 & 3/53 \\ 1/53 & 3/53 & 5/53 & 3/53 & 1/53 \end{pmatrix}$$

$$\beta_3 \equiv \begin{pmatrix} 5/48 & 7/48 & * & & \\ 3/48 & 5/48 & 7/48 & 5/48 & 3/48 \\ 1/48 & 3/48 & 5/48 & 3/48 & 1/48 \end{pmatrix}$$

$$\beta_4 \equiv \begin{pmatrix} & 7/43 & * & & \\ 3/43 & 5/43 & 7/43 & 5/43 & 3/43 \\ 1/43 & 3/43 & 5/43 & 3/43 & 1/43 \end{pmatrix}$$

$$\beta_5 \equiv \begin{pmatrix} & & * & & \\ 3/36 & 5/36 & 7/36 & 5/36 & 3/36 \\ 1/36 & 3/36 & 5/36 & 3/36 & 1/36 \end{pmatrix}$$

The matrix β5 is designated when the object pixel is located on the pixel column $P_{m-3}$. The matrix β4 is designated when the object pixel is located on at the pixel column $P_{m-2}$. The matrix β3 is designated when the object pixel is located on either one of the pixel columns $P_{m-1}$, $P_m$, and Q1. The matrix β2 is designated when the object pixel is on the pixel column Q2. The matrix β1 is designated when the object pixel is located on the pixel column Q3. Thus, the coefficient matrix β, which is utilized in the region other than the reverse region RV, is not used in the reverse region RV. This is because a positional relationship between the object pixel within the reverse region RV and unprocessed neighboring pixels is different from the positional relationship between the subject pixel not within the reverse region RV and unprocessed neighboring pixels.

Next, according to the judgment in S4030, the process of S4040 or the process of S4050 is executed. The judgment process of S4030 is the same as that of S3114 in the fifth embodiment (FIG. 16). The conversion process of S4040 is the same as that of S3116 except that the coefficient matrix, designated in S4020, is used. The conversion processes of S4040 and S4050 are respectively the same as those of S3116 and S3124 of the fifth embodiment except that the error diffusion method of the formulas (6)–(9) is used. That is, when the subject pixel reaches the pixel position S (yes in S4122), the pixel Y is set as an object pixel to be converted in S4010. Accordingly, first, the pixel density i of the pixel Y is modified by the error sum E for the pixel Y retrieved from the buffer memory 14a through the formula (6). Because the pixel Y is within the front edge BF (yes in S4030), the modified value I is not compared with the threshold t, but the pixel Y is automatically converted into a binary state the same as the already-obtained binary state of the pixel c in S4050 in the same manner as in the fifth embodiment. Then, a binary error e is calculated as a difference between the binary state value and the modified density I through the formula (7) or (8). The calculated binary error e is then distributed to unprocessed neighboring pixels with using the coefficient matrix β1.

Next, in the same manner as for the pixel Y, the pixel X is converted into a binary state the same as the already-obtained binary state of the pixel b. A calculated binary error e is distributed to unprocessed neighboring pixels with using the coefficient matrix β2. Next, in the same way, the pixel W is converted into a binary state the same as the already-obtained binary state of the pixel a. The generated binary error is distributed with using the coefficient matrix β3.

The next conversion process is achieved to the pixel V. Because the pixel V is not within the front edge BF (no in S4030), the density i of the pixel V is modified by a corresponding error sum E, and the modified value I is compared with the threshold t. Based on the compared result, the pixel V is converted into a binary state. A generated binary error e is distributed to unprocessed neighboring pixels with using the coefficient matrix β3. The next pixel U is converted into a binary state in the same manner as the pixel V.

The next conversion process is achieved to the pixel T. That is, the density i of the pixel T is modified by a corresponding error sum E, and the modified value I is compared with the threshold t. Based on the compared result, the binary state of the pixel T is determined. A generated binary error e is distributed to unprocessed neighboring pixels with using the coefficient matrix β4. The next conversion process is achieved to the pixel S. That is, the density i of the pixel S is modified by a corresponding error sum E, and the modified value I is compared with the threshold t. Based on the compared result, a binary state of the pixel S is determined, and a generated binary error e is distributed to unprocessed neighboring pixels with using the coefficient matrix β5.

Next, the subject pixel becomes the pixel Z, which is out of the reverse region RV (no in S4122), and therefore the pixel Z is converted into a binary state through an ordinary method in S3116. That is, the density value i of the pixel Z is modified by a corresponding error sum E, and the modified value I is compared with the threshold t. The binary state of the pixel Z is determined based on the compared result. A generated binary error is diffused to neighboring unprocessed pixels with the coefficient matrix β.

Thus, the method of the present embodiment can attain the same effects as that of the fifth embodiment. Especially, according to the present embodiment, the conversion order is reversed in the reverse region RV. Accordingly, binary errors produced in the pixels in the front edge BF can be more effectively distributed onto the pixels in the rear edge AR. Because the binary states of the pixels within the front edge BF are the same as those in the front edge AF, binary errors can be more effectively influenced from the front edge AF to the rear edge AR. Thus, binary results obtained at the front edge AF and the rear edge AR are more continuously arranged.

In the above-described fifth and sixth embodiments, the front edge BF has three pixel columns' worth of width. However, the front edge BF may be defined to have other various number of pixel columns' worth of width. However, the front edge BF may preferably be defined to have pixel columns, the number of which corresponds to the number of element columns of the employed coefficient matrices α, β, and β1–β5. That is, the front edge BF may preferably have, at minimum, a width affectable by error diffusion. In this example, each of the matrices α, β, and β1–β5 has two columns on either side of the center column where the subject pixel is located. Accordingly, the front edge BF should have a two pixel columns' worth of width at minimum.

The fifth embodiment employs the minimized average error method wherein each pixel receives fractions of binary conversion errors from neighboring pixels when the pixel is to be converted. However, the fifth embodiment may be modified to employ the error diffusion method as described in the sixth embodiment wherein every time each pixel is converted into a binary state, the produced error is distributed onto neighboring pixels which are not yet converted.

Similarly, the sixth embodiment may employ the minimized average error method. In this case, the following coefficient matrices α and α1 through α5 should be used:

$$\alpha \equiv \begin{pmatrix} 1/48 & 3/48 & 5/48 & 3/48 & 1/48 \\ 3/48 & 5/48 & 7/48 & 5/48 & 3/48 \\ 5/48 & 7/48 & * & & \end{pmatrix}$$

$$\alpha_1 \equiv \begin{pmatrix} 1/36 & 3/36 & 5/36 & 3/36 & 1/36 \\ 3/36 & 5/36 & 7/36 & 5/36 & 3/36 \\ & & * & & \end{pmatrix}$$

$$\alpha_2 \equiv \begin{pmatrix} 1/43 & 3/43 & 5/43 & 3/43 & 1/43 \\ 3/43 & 5/43 & 7/43 & 5/43 & 3/43 \\ & & * & 7/43 & \end{pmatrix}$$

$$\alpha_3 \equiv \begin{pmatrix} 1/48 & 3/48 & 5/48 & 3/48 & 1/48 \\ 3/48 & 5/48 & 7/48 & 5/48 & 3/48 \\ & & * & 7/48 & 5/48 \end{pmatrix}$$

$$\alpha_4 \equiv \begin{pmatrix} 1/53 & 3/53 & 5/53 & 3/53 & 1/53 \\ 3/53 & 5/53 & 7/53 & 5/53 & 3/53 \\ 5/53 & & * & 7/53 & 5/53 \end{pmatrix}$$

$$\alpha_5 \equiv \begin{pmatrix} 1/60 & 3/60 & 5/60 & 3/60 & 1/60 \\ 3/60 & 5/60 & 7/60 & 5/60 & 3/60 \\ 5/60 & 7/60 & * & 7/60 & 5/60 \end{pmatrix}$$

The above-described matrices are used for modifying the density value i of an object pixel, to be converted, into a modified density value I. The matrix α is used for converting a pixel located out of the reverse region RV. The matrix α5 is used for converting a pixel on the pixel column $P_{m-3}$. The matrix α4 is used for converting a pixel on the pixel column $P_{m-2}$. The matrix α3 is used for converting a pixel on either one of the pixel columns $P_{m-1}$, $P_m$, and Q1. The matrix α2 is used for converting a pixel on the pixel column Q2. The matrix α1 is used for converting a pixel on the pixel column Q3. 15 A seventh embodiment will be described below with reference to FIGS. 22–24.

This embodiment provides still another method of providing a dither matrix DM which can produce pseudo-halftone images with no nonuniformity of tones or colors between the dither matrix-replicated regions. According to the present embodiment, pixels at both edges of each matrix Di in the main scanning direction X are converted into binary values while the generated errors are distributed onto the both edges continuously. According to the present embodiment, conversion processings are achieved in each matrix Di assuming that pixels on a leading edge of the matrix Di in the main scanning direction X are located next to pixels on a trailing edge of the matrix. Thus, pixels on both edges of the matrix Di may be converted into binary states while being continuously affected by binary conversion errors.

In this example, each matrix Di may be converted into a matrix Fi assuming that pixels are arranged continuously in a single spirally-extending scanning line. When the conversion process is attained onto pixels on trailing and leading edges of each matrix Di in the main scanning direction, generated binary errors are distributed onto pixels continuously at both the trailing and leading edges.

Figure 22:
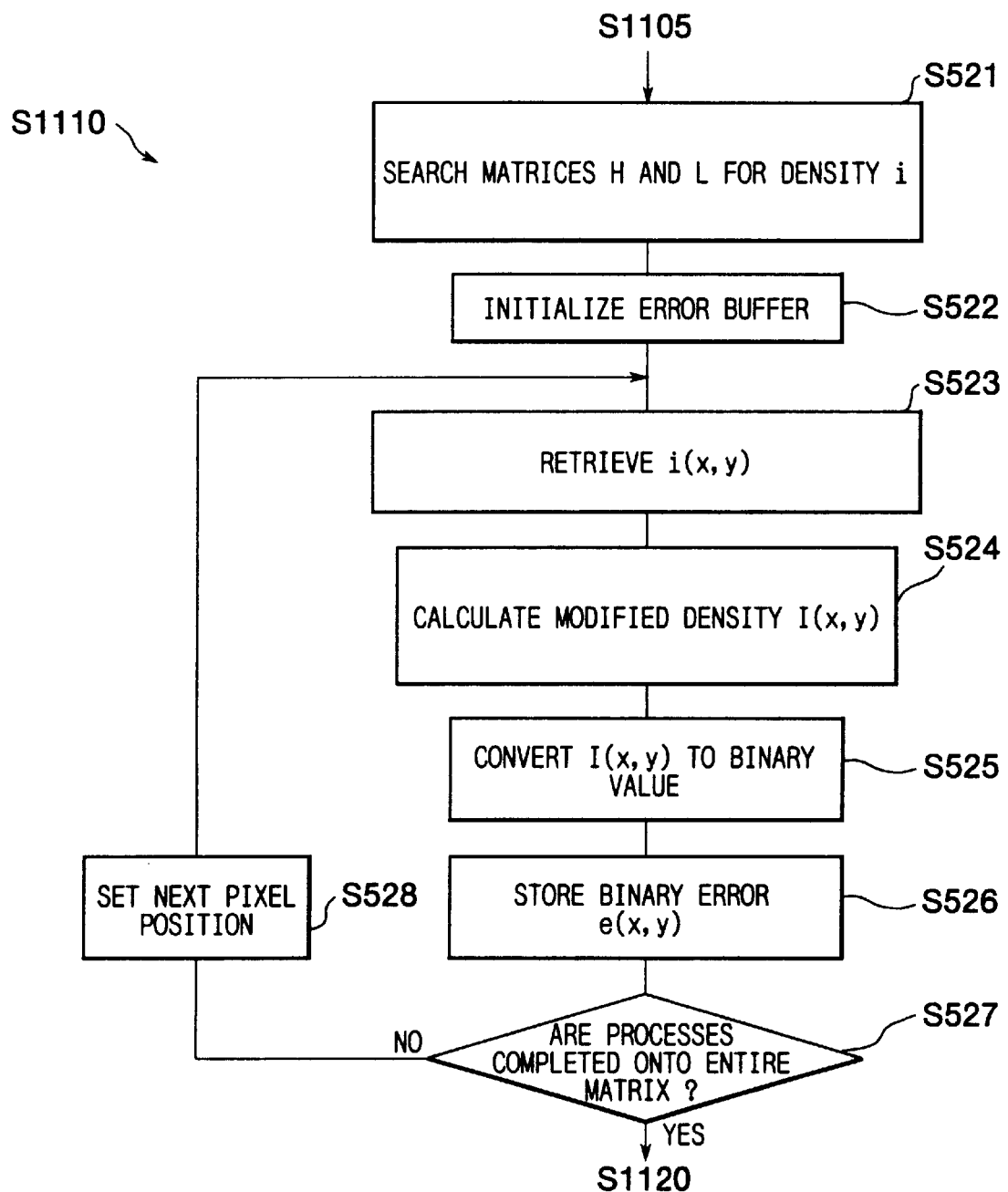
FIG. 22 is a flowchart of a binary conversion process according to a seventh embodiment.

The dither matrix production process of the present embodiment is the same as that of the fourth embodiment shown in FIG. 12 except that the conversion process of S1110 is performed as shown in FIG. 22.

Because the values 128, 64, 192, 32, 96, 160, 224, . . . are arranged in S1100, the matrix D128 is first subjected to the conversion process of S1110. During this process, the CPU 12 first searches out both an upper-closest and lower-closest matrices H and L for the matrix Di (i=128) in S521. In this case, because the density value i has now a value of 128 which is first appearing in the density value arrangement, the matrices F255 and F0 are determined as the upper-closest and lower-closest matrices H and L.

Next, the error buffer 14a is initialized in S522. Then, in the same manner as in the first embodiment, during the repeated routine of S523–S528, the pixels are processed from left to right along each pixel line. The pixel lines are processed from top to bottom. In this example, each pixel is processed through the minimized average error method. That is, in S523, the CPU 12 retrieves a density value i(x, y) of a subject pixel (x, y) in the subject matrix Di.

Then, in S524, the value i(x, y) of the subject pixel (x,y) is modified in S524 by an error sum E through the following formula (10):

$$I(x,y) \leftarrow i(x,y) + E \quad (10)$$

Figure 23:
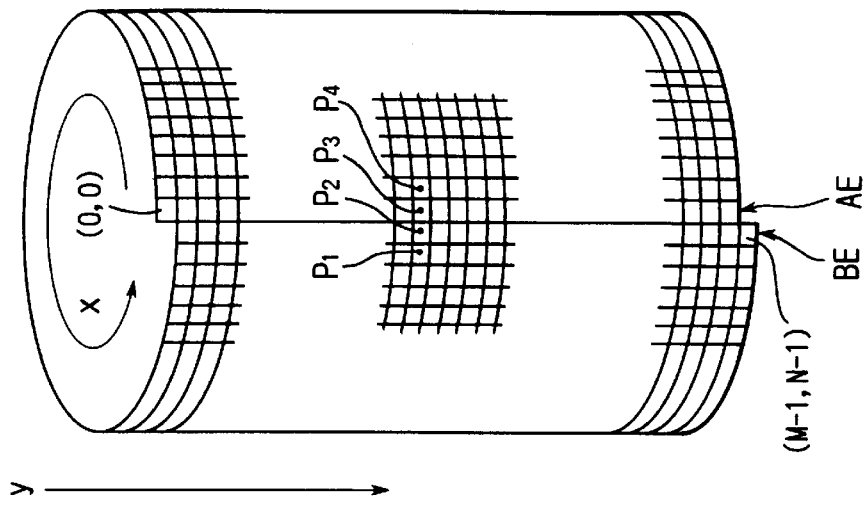
FIG. 23 illustrates how the binary conversion process is attained in the seventh embodiment.

According the present embodiment, the error sum E is calculated not by the already-described equation (2) but is calculated by the following formula (11):

$$E(x,y) \leftarrow (1/\Sigma \alpha pq) \times \Sigma(\alpha pq \times eab) \quad (11)$$

where $$\alpha \equiv \begin{pmatrix} 1 & 3 & 5 & 3 & 1 \\ 3 & 5 & 7 & 5 & 3 \\ 5 & 7 & * & & \end{pmatrix} \quad (12)$$

where $$a \leftarrow (x+p)\%M \quad (13)$$

$$b \leftarrow [y+q+int\{(x+p)/M\}] \quad (14)$$

where % is an operator for calculating a remainder produced when (x+p) is divided by M, int { } is an operator for calculating an integer part of a value within { }, and (p, q) is a coordinate of an element in the coefficient matrix α relative to the origin (0, 0) where the subject pixel * is located. Therefore, $-2 \leq q \leq 0$. When q=0, $-2 \leq p \leq -1$. When q=-1 or -2, $-2 \leq p \leq 2$ According to the present embodiment, the values a and b are set so that the leading edge AE and the trailing edge BE of the matrix Di be connected as shown in FIG. 23. Pixels (M−1, y) on the trailing edge BE at respective pixel lines are connected to pixels (0, y+1) on the leading edge AE at the next pixel lines. Thus, the pixels are processed assuming that the AND number of pixel lines continue in spiral fashion into a single scanning line.

The minimized average error method is therefore conducted as described below in the present embodiment.

It is now assumed that a subject pixel (x,y) is located at a pixel position P0 (M−3, k+1) as shown in FIG. 24(a). (It is noted that in FIGS. 24(a)–24(f), the matrix Di is shown in its original state for simplicity and clarity.) In this case, the subject pixel P0 receives fractional portions of errors "e" from neighboring pixels, which are indicated by slanted lines in that figure. The neighboring pixels are determined by the formulas (13) and (14) wherein x and y are respectively substituted by M−3 and k+1. In this case, for q=0, a=M−5 and M−4, and b=k+1. For q=−1, a=M−5, M−4, M−3, M−2, and M−1, and b=k. For q=−2, a=M−5, M−4, M−3, M−2, and M−1, and b=k−1.

When the subject pixel is shifted to a next pixel position P1 (M−2, k+1) as shown in FIG. 24(b), the subject pixel P1 receives errors from neighboring pixels indicated by slanted lines in that figure. The neighboring pixels are determined by the formulas (13) and (14) wherein x=M−2 and y=k+1. That is, for q=0, a=M−4 and M−3, and b=k+1. For q=−1, a=M−4, M−3, M−2, and M−1, and b=k, and a=0 and b=k+1. For q=−2, a=M−4, M−3, M−2, and M−1, and b=k−1, and a=0 and b=k. As apparent from the drawing, the neighboring pixels, determined for diffusing errors to the pixel P1, partly protrude out of the trailing edge BE. The protruded portion is located on the leading edge AE and is shifted downwardly by one pixel line from the remaining portion.

Then, in the similar manner as described above, when the subject pixel is located at a pixel position P2 (M−1, k+1) on the trailing edge BE as shown in FIG. 24(c), the pixel P2 receives errors from neighboring pixels indicated by slanted lines in that figure. The neighboring pixels are determined by the formulas (13) and (14) wherein x=M−1 and y=k+1. When the subject pixel is further shifted to a pixel position P3 (0, k+1) on the leading edge AE as shown in FIG. 24(d), the pixel P3 receives errors from neighboring pixels indicated by slanted lines in that figure. The neighboring pixels are determined by the formulas (13) and (14) wherein x=0 and y=k+1.

When the subject pixel is further shifted to the next pixel position P4 (1, k+1) as shown in FIG. 24(e), the subject pixel P4 receives errors from neighboring pixels indicated by slanted line in that figure. The neighboring pixels are determined by the formulas (13) and (14) wherein x=1 and y=k+1. When the subject pixel is further shifted to the next pixel position P5 (2, k+1) as shown in FIG. 24(f), the subject pixel P5 receives errors from neighboring pixels indicated by slanted line in that figure. The neighboring pixels are determined by the formulas (13) and (14) wherein x=2 and y=k+1. Thus, the error diffusion operation is continuously performed while a subject pixel position is shifted from the trailing edge BE to the leading edge AE. Binary errors are continuously and spirally distributed from the edge BE to the edge AE.

In S524, the density value i(x,y) of the subject pixel (x,y) is modified by a sum E of error fractional portions distributed from its neighboring pixels determined in the above-described manner in S524. Thus modified density value I(x,y) is then converted into a binary state in S525. The conversion process in S525 is the same as that of the fourth embodiment achieved in S110 (S112 and S116 in FIG. 10). That is, when the subject pixel does not satisfy each of the conditions [1] and [2], the modified value I(x,y) is compared with the threshold t. Based on the compared result, a binary state of the subject pixel is determined. When the subject pixel satisfies the condition [1] or [2], the subject pixel (x,y) is set to the binary state of the corresponding pixel (x,y) at the matrix H or L. Next in S526, the error e(x,y) is calculated by the formula (4) or (5), and stored in the corresponding error buffer 14a for the subject pixel (x,y). When all the pixels of the subject matrix Di have been processed (yes in S527), the program proceeds to S1120 (FIG. 12).

According to the present embodiment, the error diffusion process is performed assuming that the pixels are arranged continuously from the trailing edge BE to the leading edge AE. Accordingly, it is possible to ensure continuity between the edges AE and BE in the main scanning direction. Accordingly, a dither matrix DM, produced during the process of the present embodiment, will dither continuous tone image data into binary image data while preventing nonuniformity of colors or tones from occurring at boundaries of the dither matrix-replicated regions.

The pixels on the trailing edge BE at respective pixel lines are continued to the pixels on the leading edge AE at the next pixel lines. Accordingly, all the pixels on the dither matrix Di are arranged spirally into a single scanning line. It is therefore possible to perform the same error diffusion operation with the same coefficient matrix a even when the pixel is shifted from the trailing edge BE to the leading edge AE. A dither matrix DM can therefore be produced through a simple calculation operation. The binary conversion process can be conducted more continuously, thereby more reliably preventing undesirable boundary lines from generating.

In the present embodiment, during the binary conversion process of S525, binary conversion is performed while considering, with using the conditions [1] and [2], the binary states of the already-produced matrices H and L. Accordingly, the advantages obtained in the third and fourth embodiments are obtained also in the present embodiment. Therefore, threshold value TH(x,y) of each element (x,y) in the dither matrix DM may be determined as a density value i of a matrix Di, at which the corresponding pixel (x,y) has been first converted into ON (or OFF) as shown in FIG. 11(a).

The process of the present embodiment may be conducted while performing the process of FIG. 14. The order of converting the matrices Di into matrices Fi may be modified in the same manner as in the third embodiment. The error diffusion method as defined by the formulas (6)–(9) may be employed.

An eighth embodiment will be described below with reference to FIGS. 25–28. The eighth embodiment is directed to a method of producing a dither matrix which can prevent any undesirable boundary lines from appearing at upper and lower edges of the dither matrix-replicated regions in produced binary images.

Figure 26:
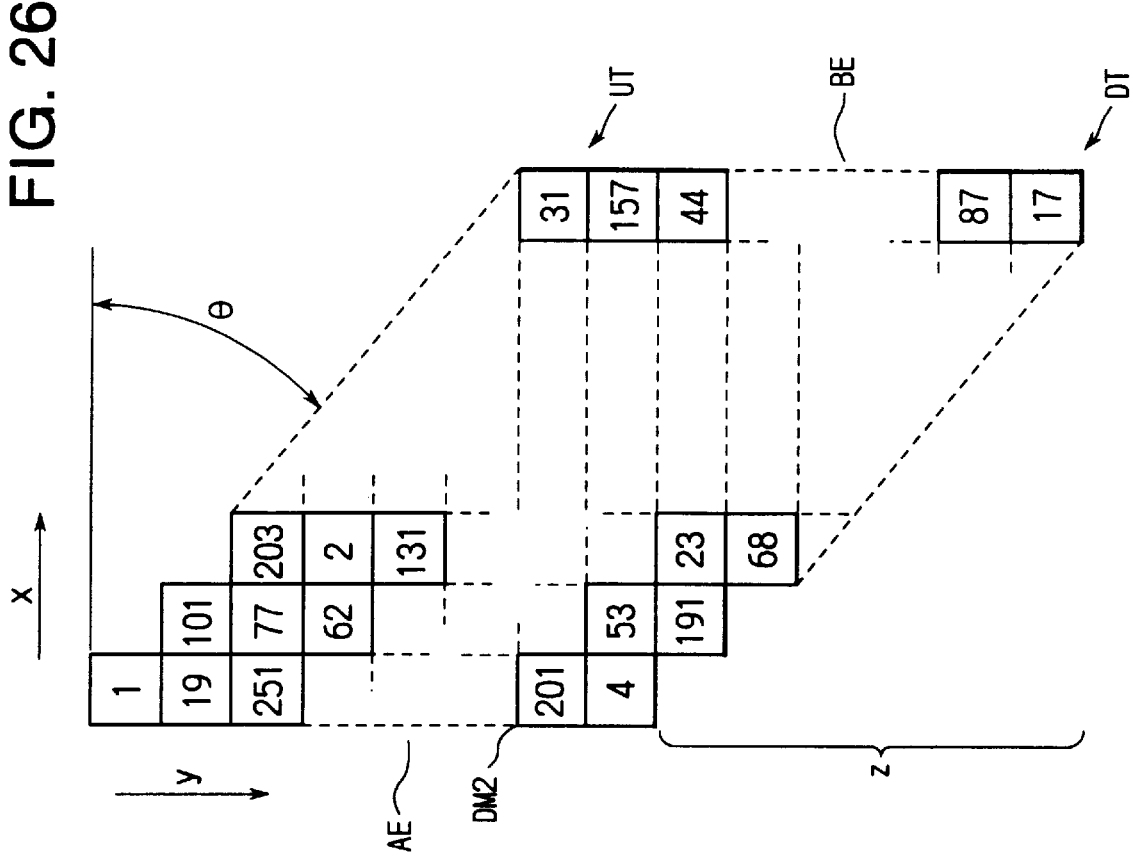
FIG. 26 illustrates how the dither matrix is deformed according to an eighth embodiment.
Figure 25:
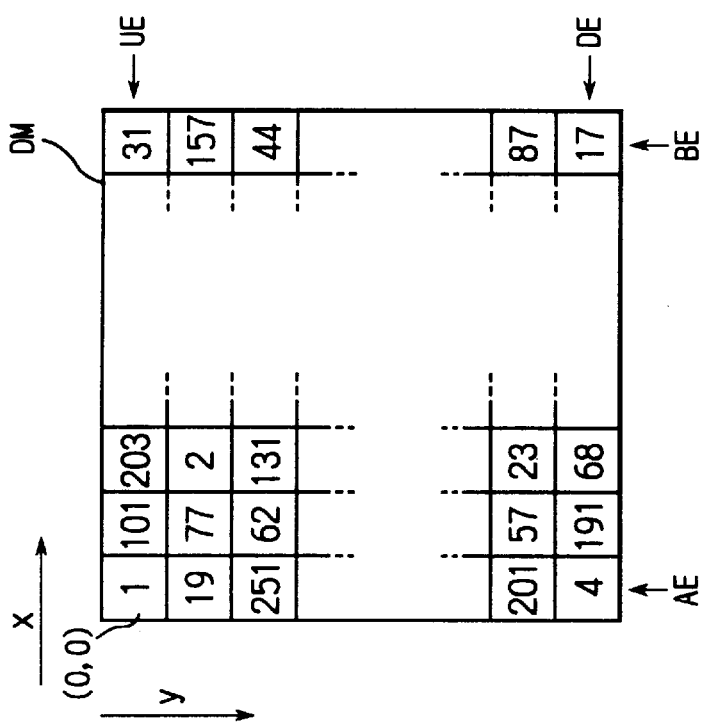
FIG. 25 illustrates a dither matrix produced through the seventh embodiment.
Figures 27, 28:
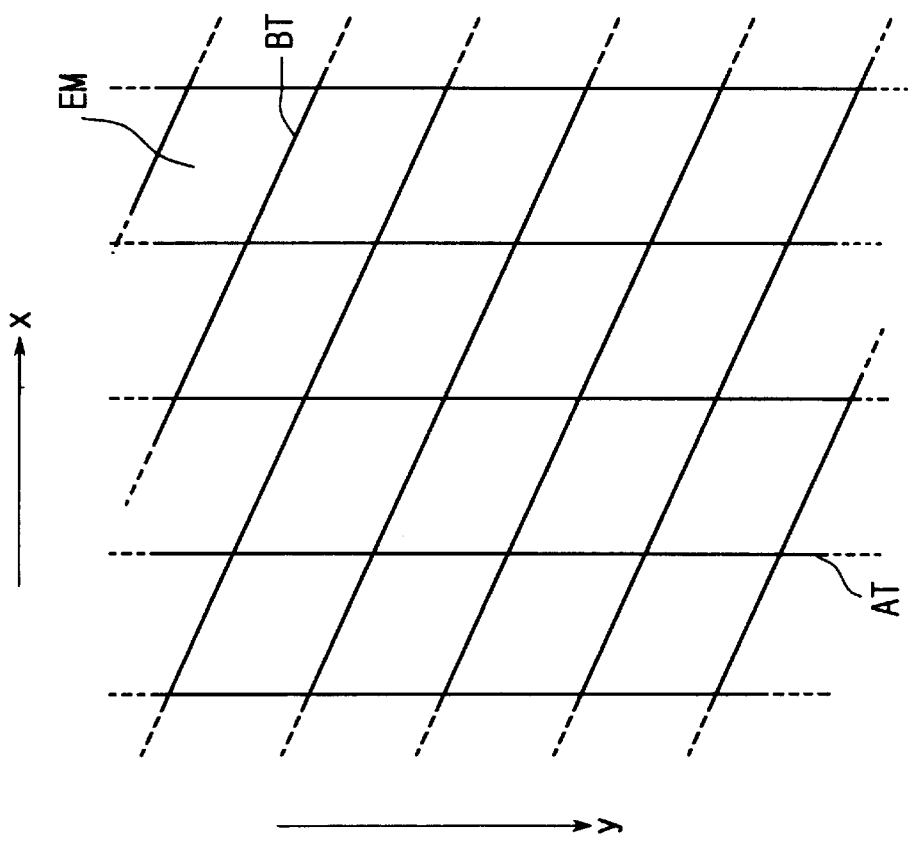
FIG. 27 illustrates how the dither matrix is replicated over a continuous tone image.
FIG. 28 illustrates how the dither matrix is further deformed.

According to the present embodiment, threshold values in the dither matrix DM as shown in FIG. 25, which is produced according to the seventh embodiment, are rearranged. The threshold element columns of the dither matrix DM are shifted one by one in the auxiliary scanning direction y as shown in FIG. 26. A threshold element column at the leading edge AE includes threshold values 1, 19, 251, . . . , and 4. A threshold element column at the trailing edge BE includes threshold values 31, 157, 44, . . . , and 17. As a result, upper and lower edges of the respective columns are made inconsistent with each other. A resultant dither matrix DM2 has therefore upper and lower edges UT and DT which are slanted with respect to the main scanning direction x. Thus produced dither matrix DM2 will be used for dithering input continuous tone images into pseudo-halftone images. The edges UT and DT are thus formed as linear lines slanted with respect to the main scanning direction X with a certain angle θ. The dither matrix DM2 therefore becomes a parallelogram shape. The dither matrix DM2 is used for dithering continuous tone images as shown in FIG. 27. That is, the dither matrix DM2 is located on each of the plurality of regions EM, and dithering is performed on each region EM. That is, in each region, a density of each pixel in the continuous tone image is compared with a threshold value of the dither matrix DM2 at a corresponding location. No nonuniformity of colors or tones are generated in the boundaries AT between the dither matrix-replicated regions EM because the dither matrix DM2 is originally produced through the method of the seventh embodiment. Accordingly, no undesirable boundary lines will be generated along the auxiliary scanning direction Y. On the other hand, there is a possibility that nonuniformity of colors or tones will be generated in the boundaries BT and therefore that undesirable boundary lines will be generated. However, the boundary lines are slanted with respect to the main scanning direction x. When the binary images with the thus generated boundary lines are printed by a printer, however, the boundary lines will not appear clearly.

Those edges UT and DT may be formed with corrugations. Alternatively, the entire edges UT and DT may be changed into a V- or U-shape. That is, the upper and lower edges UT and DT may be changed from the linear line parallel to the main scanning direction x into other various lines, such as the slanted linear line, the corrugated line, or the curved line. Thus produced dither matrix DM2 can further prevent any undesirable boundary lines from clearly appearing in dithered images.

In the above-described seventh and eighth embodiments, the dither matrix DM is produced based on the binary state of the entire region of each of the uniform density pixel matrices D0–D255. However, similarly as in the second embodiment, a dither matrix DM' can be produced based on a binary state obtained only within a predetermined region in each matrix Di. It is noted, however, that according to the seventh and eight embodiments, the dither matrix DM' has to be produced based on a binary state within a predetermined region C as surrounded by a solid line in FIGS. 24(a)–24(f). This region C has an area of [M×(N−k)], and spreads entirely between the edges AE and BE of the corresponding matrix Di and includes the last pixel line Lx of the matrix Di.

In the eighth embodiment, the dither matrix DM produced according to the seventh embodiment is deformed into the dither matrix DM2. However, the dither matrix DM may not be deformed. Instead, when dithering images with the dither matrix DM, the threshold elements of the dither matrix DM may be rearranged so that the respective threshold element columns will be shifted one by one as shown in FIG. 26.

The dither matrix DM2 deformed as in the eighth embodiment as shown in FIG. 26 can be further deformed as shown in FIG. 28. That is, an element group Z of the dither matrix DM2, protruding downwardly from the original position and shown in FIG. 26, may be shifted to an upper side of the dither matrix DM2, thereby recovering an original rectangular shape. Thus produced dither matrix DM3 can obtain the same advantages as that of the eighth embodiment. In addition, the rectangular dither matrix DM3 can be more easily applied to input images which are generally rectangular. Accordingly, the dithering process can be more easily performed.

A ninth embodiment will be described below with reference to FIGS. 29–37.

Figure 34:
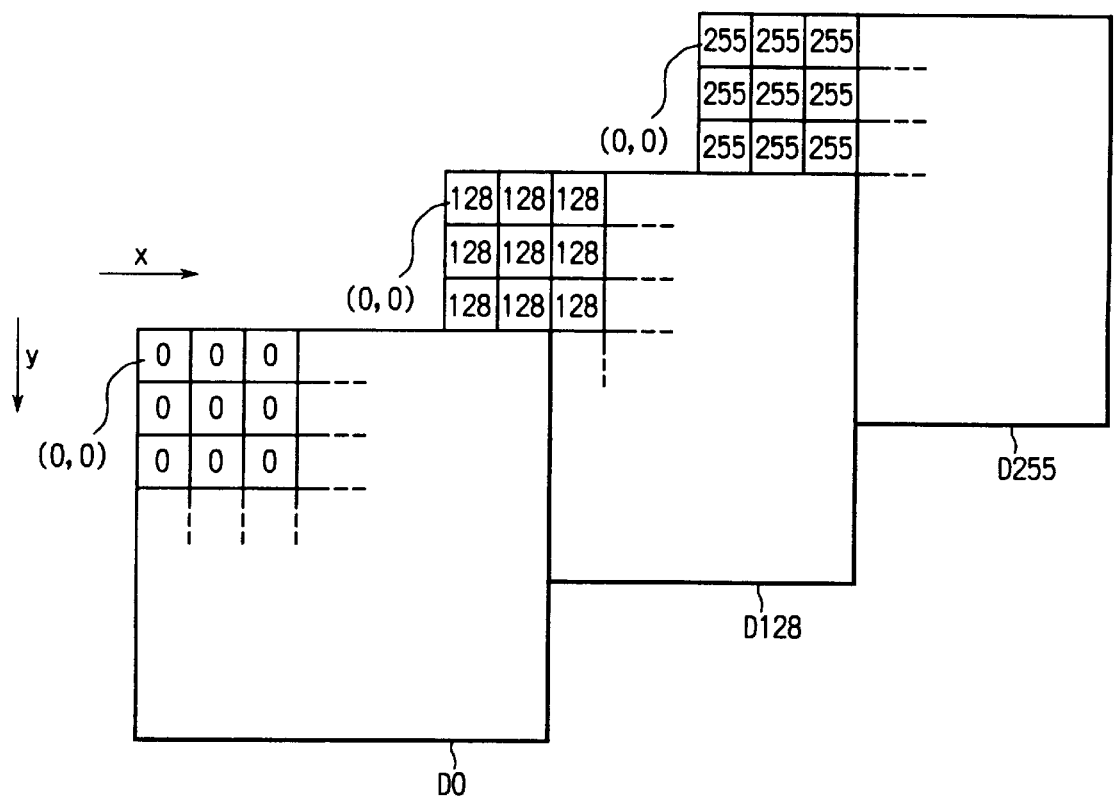
FIG. 34 illustrates matrices D0, D128, and D255.

According to the present embodiment, as shown in FIG. 34, only three matrices D0, D128, and D255 are previously stored in the working memory 14.

Figure 29:
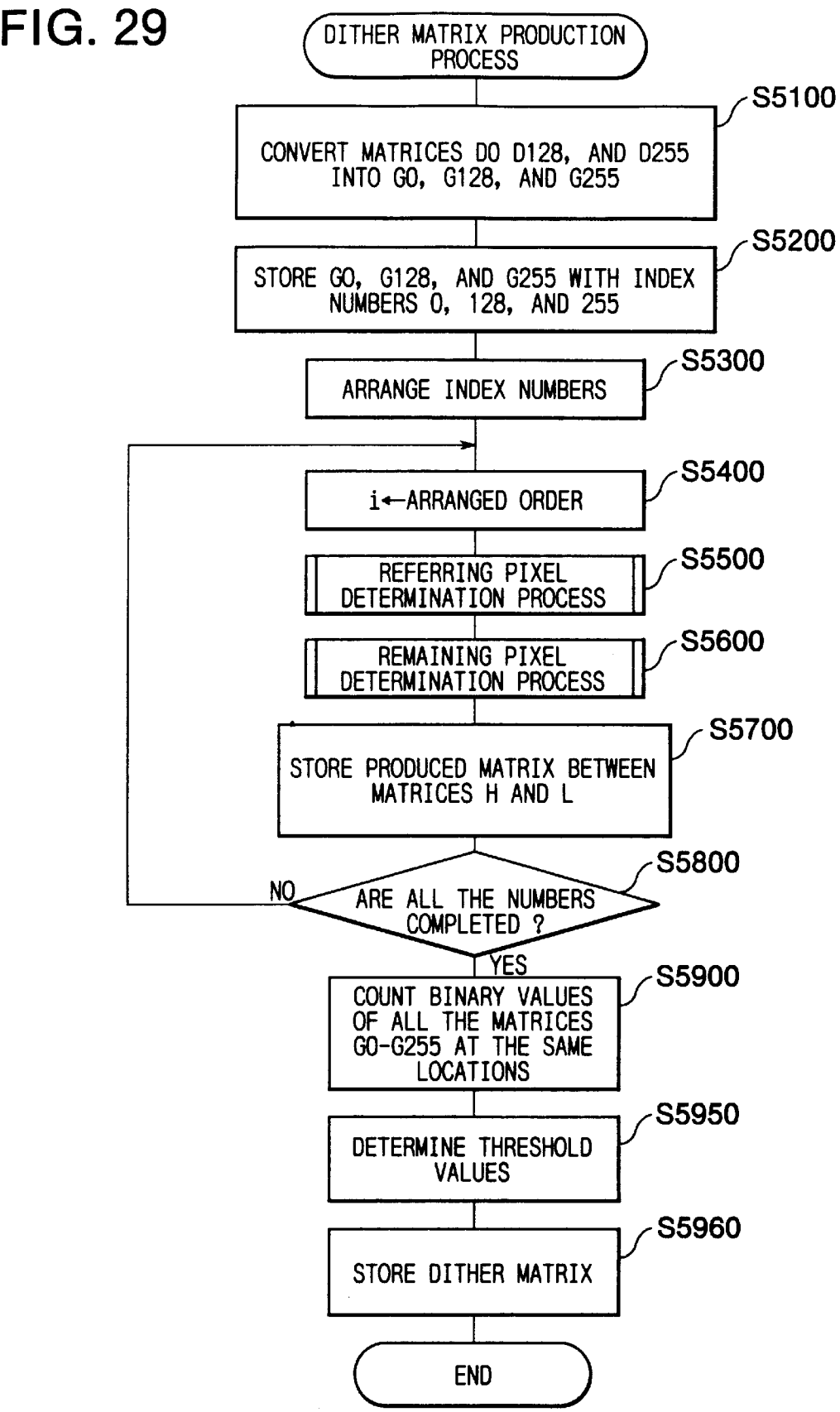
FIG. 29 is a flowchart of a dither matrix producing process of a ninth embodiment.

The dither matrix production process of the present embodiment will be described below while referring to FIG. 29.

Figure 35:
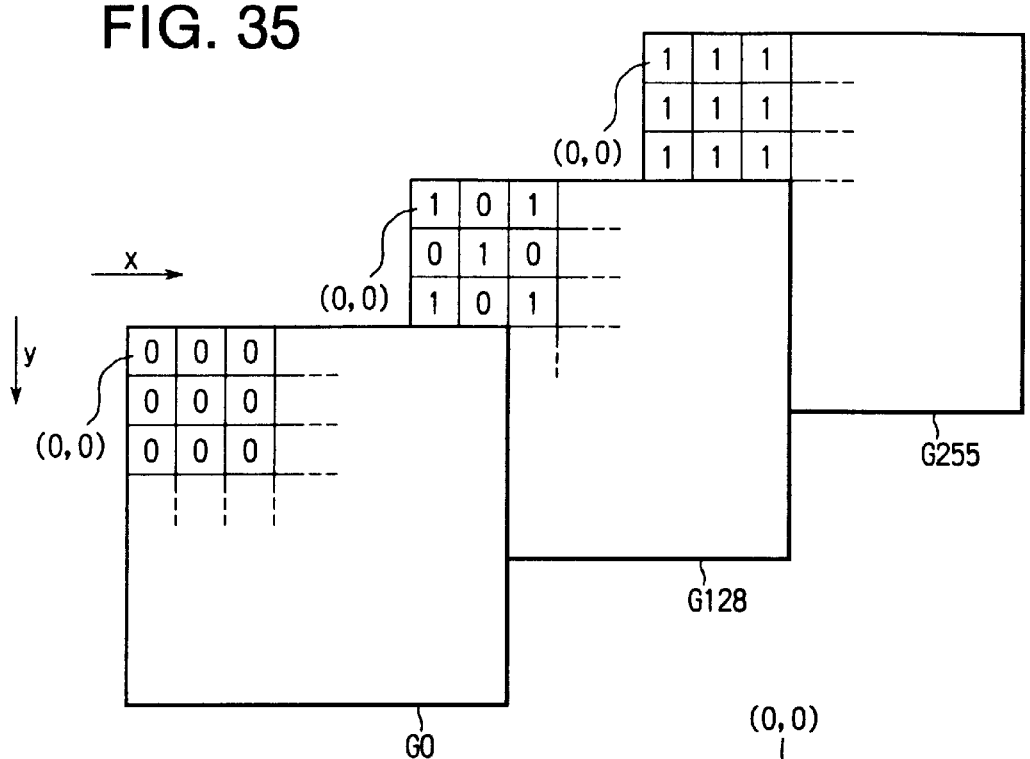
FIG. 35 illustrates matrices G0, G128, and G255.

First, the three matrices D0, D128, and D255 are converted into binary value pixel matrixes G0, G128, and G255 in S5100. In S5100, the matrices D0, D128, and D255 are subjected to a binary value conversion process in the same manner as in S110 of the first embodiment (FIG. 6). Accordingly, the matrices G0, G128, and G255 are the same as the matrixes F0, F128, and F255 produced in the first embodiment. Then, in S5200, the thus produced binary value pixel matrices G0, G128, and G255 are arranged in this order or a reversed order, and stored in the working memory 14 together with their index numbers 0, 128, and 255 as shown in FIG. 35.

It is noted that the matrices G0 and G255 may be previously produced and stored in the memory 14. The matrix G0 has all the pixels of zero (0), and the matrix G255 has all the pixels of 255. Similarly, the matrix G128 may not be produced in S5100. The matrix G128 may be previously produced through converting the matrix D128 through the error diffusion process and stored in the working memory 14.

Figure 36:
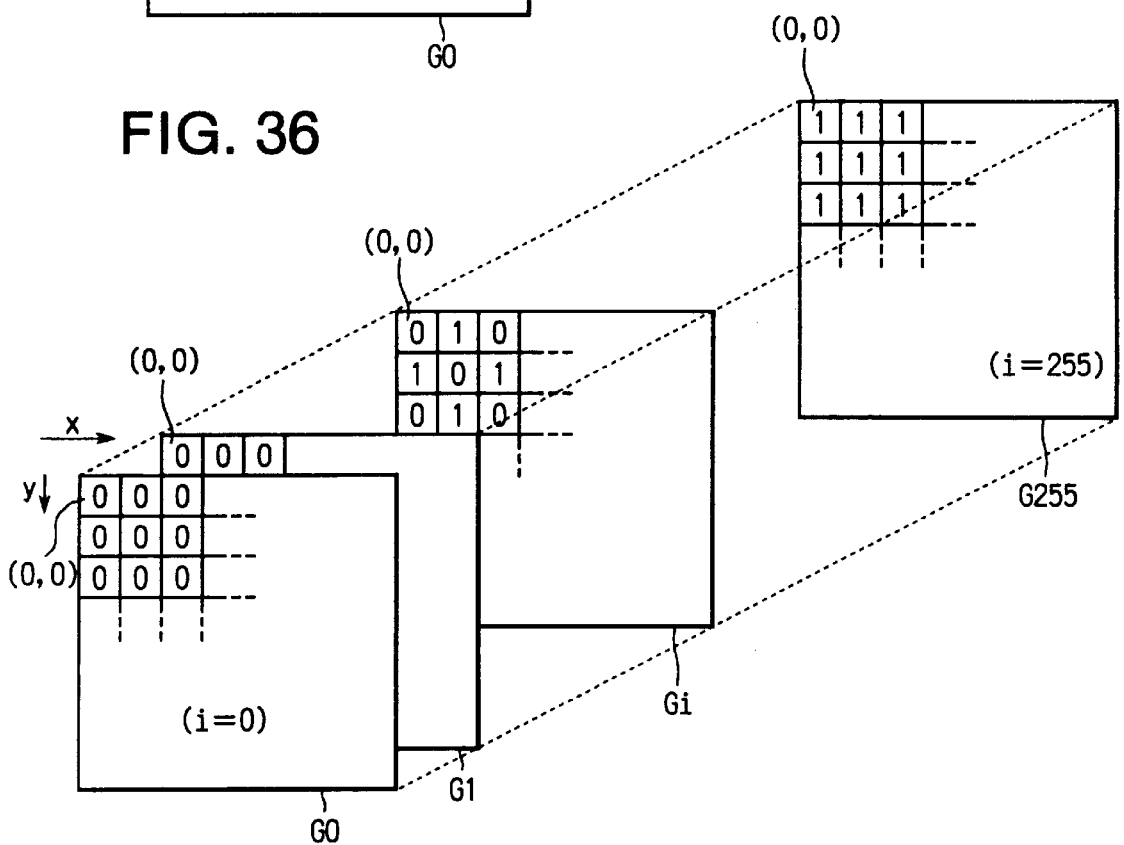
FIG. 36 illustrates matrices G0–G255.

It is further noted that according to the present embodiment, other matrices D1–D127 and D129–D254 are not prepared. According to the present embodiment, as will be described later, binary value pixel matrices G1–G127 and G129–G254 are produced through a referring pixel determination step of S5500 and a remaining pixel determination process of S5600. That is, during the steps of S5500 and S5600, binary states of all the pixels in each matrix Gi (i=1–127 and 128–254) are produced. As shown in FIG. 36, each of the matrices G1–G127 and G128–G254 is produced to have a plurality of pixels arranged in N pixel lines and in M pixel columns in the same manner as the matrices F1–F127 and F128–F254 in the already-described embodiments. The product of M and N is equal to or higher than 256. Each pixel line extends along a main scanning direction x, and each pixel column extends along an auxiliary scanning direction y. Each pixel location is represented by (x, y). A pixel location at the upper and left corner is an original point represented by (0,0) and a pixel location at the lower and right corner is an end point represented by (M−1, N−1). Each pixel (x, y) has a binary value 1 (ON) or 0 (OFF). It is noted that each of the matrices G0, G128, and G255 has the same structure as those of the matrices F1–F127 and F128–F254.

When the matrices G0, G128, and G255 are stored in S5200, the program proceeds to S5300. The process of S5300 is the same as that of S1100 (FIG. 12) in the fourth embodiment except that an index number arrangement produced in this step S5300 does not include 128 which is first appearing in the number arrangement produced in S1100. That is, the index number arrangement produced in S5300 includes: 64, 192, 32, 96, 160, 224, . . . .

Then, the program proceeds to S5400 wherein one index number i is retrieved from the number arrangement according to its order. Then, a referring pixel determination process is performed in S5500 to produce a binary value pixel matrix Gi of the present index number i. Because "64" is first appearing in the index number arrangement, a matrix G64 is produced in S5500.

Figure 30:
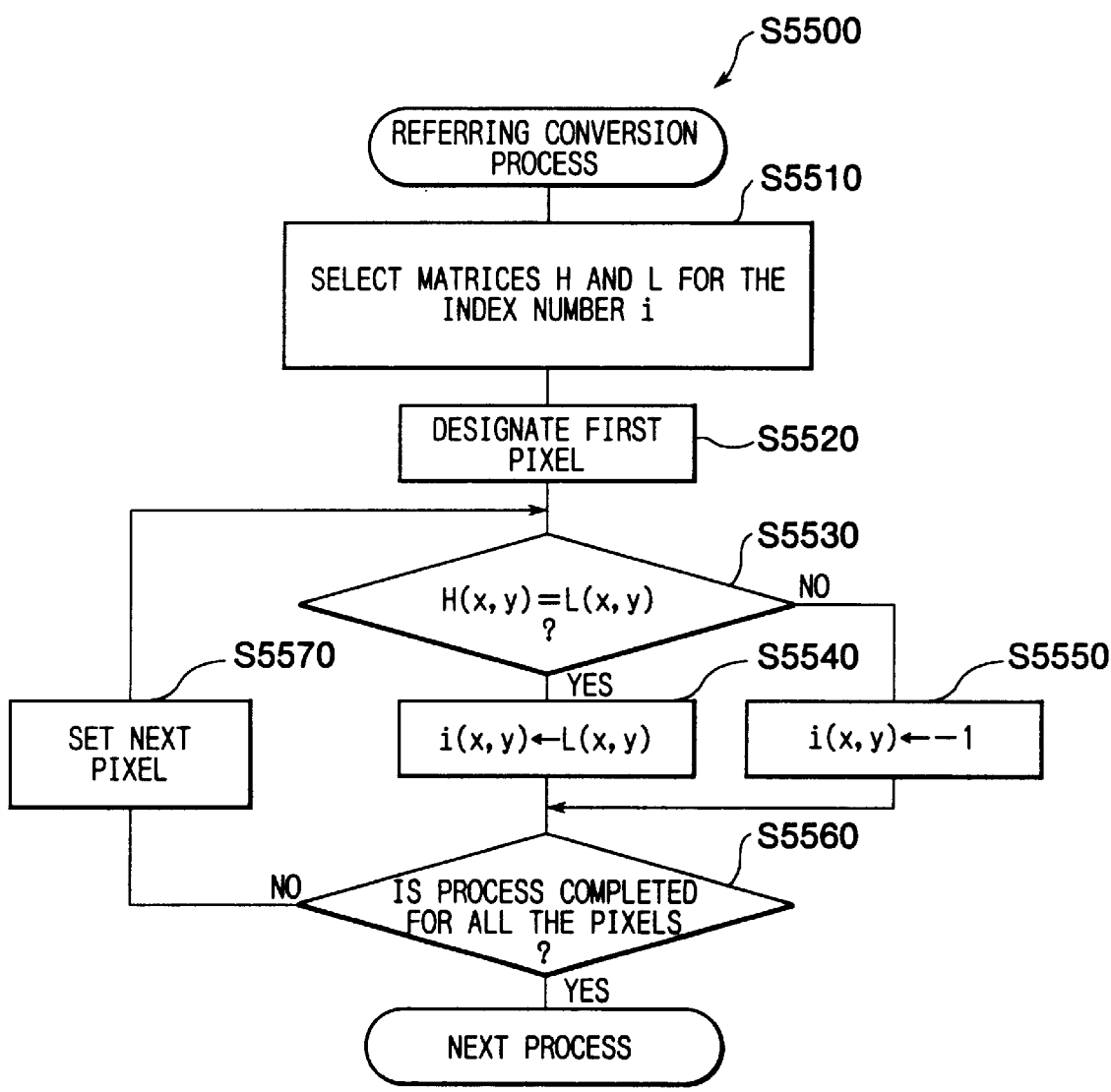
FIG. 30 is a flowchart of a referring pixel determination process.

The referring pixel determination process of S5500 will be described below with reference to FIG. 30.

First, in S5501, an upper-closest binary value pixel matrix H and a lower-closest binary pixel matrix L for the present number "64" are searched out from the working memory 14. The lower-closest matrix L is an already-produced matrix GiL with its index number iL being lower than and closest to the present number i (64 in this case). The lower-closest matrix L for the present number "64" is the matrix G0. The upper-closest matrix H is an already-produced matrix GiH with its index number iH being higher than and closest to the present number i (64 in this case). The upper-closest matrix H for the present number 64 is the matrix G128.

In order to determine binary states of all the pixels in the matrix Gi of the present number i (64 in this case), the original element (0, 0) is first designated in S5520. Then, in S5530, it is judged whether or not a binary value of a corresponding pixel H(x, y) at the matrix H is equal to a binary value of a corresponding pixel L(x, y) at the matrix L, where x=0 and y=0 in this case. When H(x, y) is equal to L(x, y) (Yes in S5530), a binary value of the present pixel i(x, y) is set equal to the value of the pixel L(x, y) or H(x, y) in S5540. That is, when both of the binary values of the corresponding pixels H(x, y) and L(x, y) are one (1), the subject pixel i(x, y) of the present matrix Gi is also set to one (1). When both of the binary values of the corresponding pixels H(x, y) and L(x, y) are zero (0), the subject pixel i(x, y) is also set to zero (0). When the pixel value H(x, y) is not equal to the pixel value L(x, y) (No in S5530), on the other hand, the subject pixel value i(x, y) of the present matrix Gi is set in S5550 to a value of "−1" which is intended to mean that the subject pixel (x, y) is not yet determined in the referring pixel determination process of S5500.

Next, it is judged in S5560 whether or not the processes of S5530, S5540, and S5550 have been completely performed and all the pixels of the present matrix Gi are set to either one of 1, 0, and −1. When the processes have not yet been completed (no in S5560), a next pixel (x, y) in the present matrix Gi is set in S5570. Then, the processes of S5530, S5540, and S5550 are performed. Thus, while the processes of S5530 through S5570 are repeatedly conducted, the pixels of the present matrix Gi are processed from left to right along each pixel line, and the pixel lines are processed from top to bottom until the last pixel (M−1, N−1) is processed. When the last pixel (M−1, N−1) is processed and the processes are completed for all the pixels (yes in S5560), the referring pixel determination process of S5500 is completed. Then, a remaining pixel determination process is executed in S5600 in order to determine binary states of pixels whose values are set to −1 in S5550. Those pixels will be referred to as undetermined pixels hereinafter. The binary status of those undetermined pixels are not determined to 0 or 1 during the referring pixel determination process of S5500.

Figure 31:
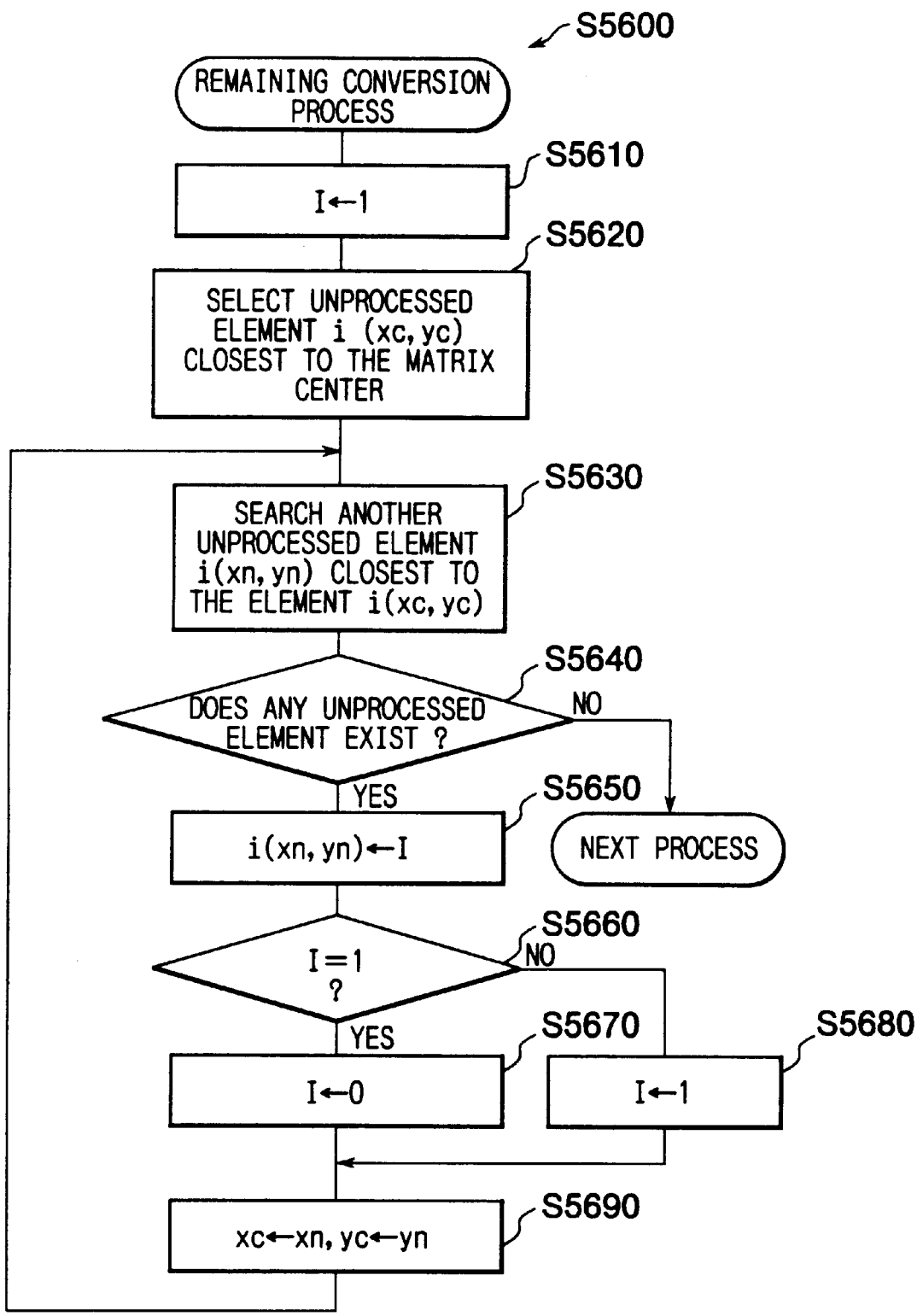
FIG. 31 is flowchart of a remaining pixel determination process.
Figure 32:
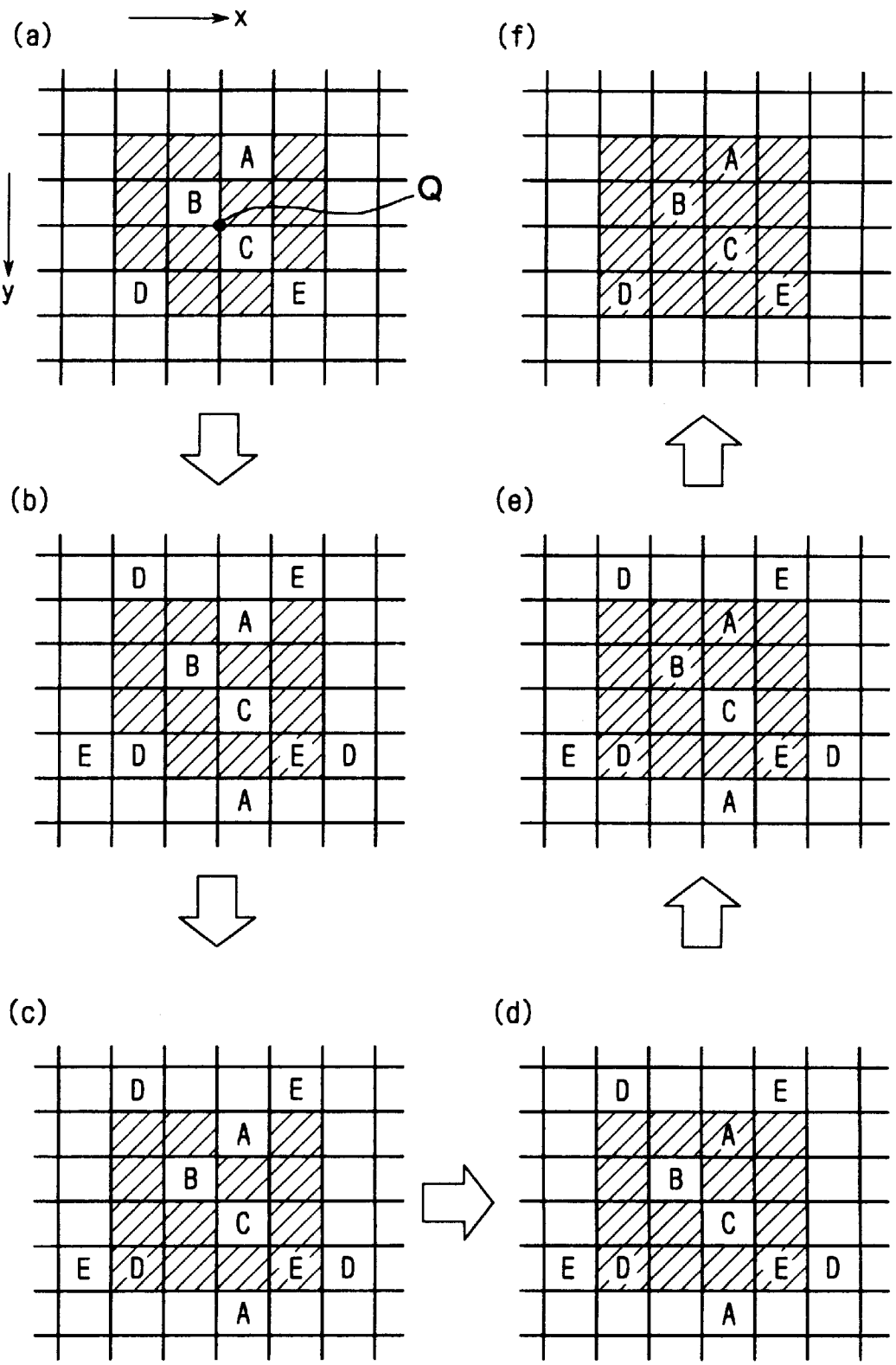
FIG. 32 illustrates how to determine remaining pixels during the remaining pixel determination process.
Figure 33:
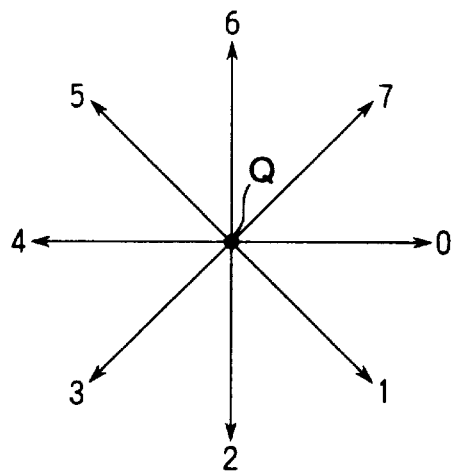
FIG. 33(a) illustrates priority in determination of pixels.
FIG. 33(b) shows a graph of a relationship between the total number of undetermined pixels and a closest pixel searching time length and shows both states where the total number of the undetermined pixels is high and low.
Figure 33:
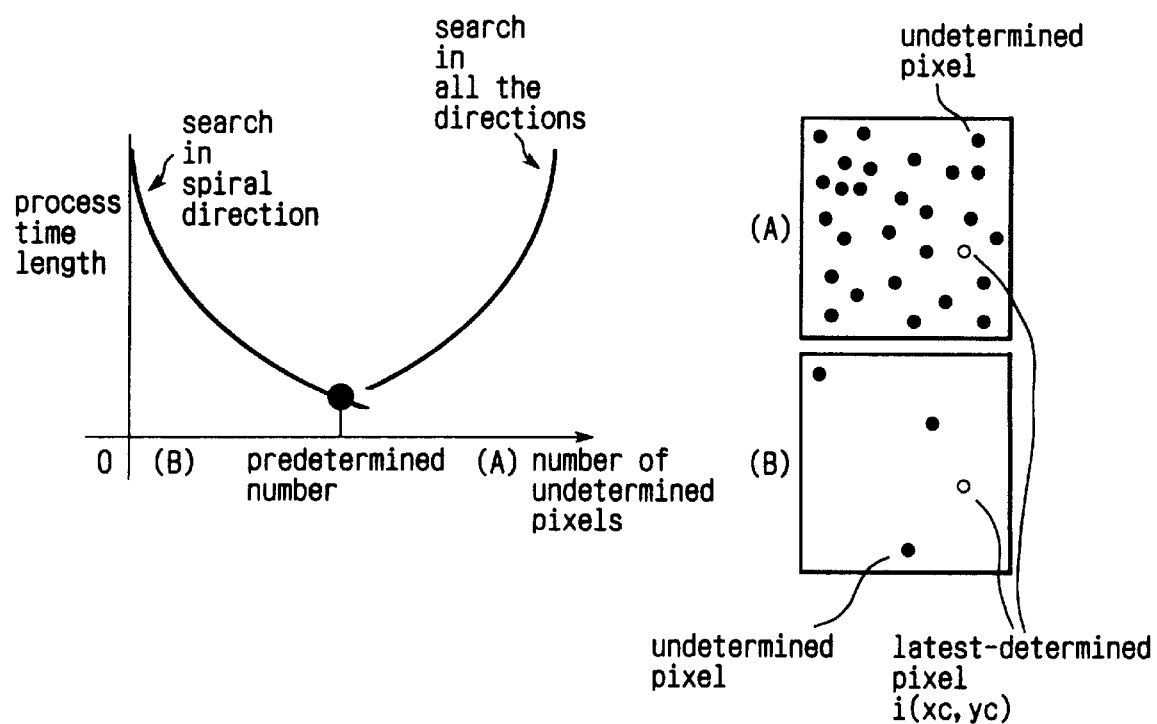

The remaining pixel determination process of S5600 will be described blow with reference to FIG. 31.

During this remaining pixel determination process, a variable I is first initialized to one (1) in S5610. Then, in S5620, the CPU 12 selects one undetermined pixel i(xc, yc) that is located closest to the center of the present matrix Di. Next, in S5630, the CPU 12 searches another undetermined pixel i(xn, yn) which is located closest to the undetermined pixel i(xc, yc) selected in S5620.

When no undetermined pixel exists in the present matrix Gi (no in S5640), the process of S5600 is completed without performing no calculations. When the search of S5630 turns out that at least one undetermined pixel exists in the present matrix Gi (yes in S5640), on the other hand, the variable I is set to the undetermined pixel i(xn, yn), which is searched as that closest to the pixel i(xc, yc) in S5650. Next, in S5660, it is judged whether or not the variable I is now ON (1). When I is presently equal to ON (1) (yes in S5660), the variable I is set to OFF (0)in S5670. When I is equal to OFF (0) (no in S5660), on the other hand, the variable I is set to ON (1) in S5680.

Then, in S5690, the presently-determined pixel i(xn, yn) is set as a newly-determined pixel i(xc, yc). Then, the process of S5630 is again started. That is, another undetermined pixel i(xn, yn), which is closest to the presently-set pixel i(xc, yc), is searched. When such an undetermined pixel is found out, the present variable I is set to the pixel.

The variable I is set to ON (1) and OFF (0) alternately in S5660 through S5680 every time the variable I is set to a newly-selected undetermined pixel i(xn,yn). Accordingly, the searched out pixels i(xn, yn) are successively turned ON and OFF in alternation.

Next will be given a detailed description of a method how to determine the pixel i(xc, yc) in S5620 and how to search the pixel i(xn, yn) closest to the pixel i(xc, yc) in S5630.

It is now assumed that the present matrix Gi is a 4 by 4 matrix as surrounded by bold line in FIG. 32(a) and that binary status of eleven pixels of the matrix Gi have been already determined during the referring pixel determination process of S5500 and are filled with dashed lines. Accordingly, before the remaining pixel determination step of S5600 starts, there remain five undetermined pixels A, B, C, D, and E in the matrix Gi.

The binary states of the pixels A through E are determined in the process of S5600 in the following manner.

In S5620, the CPU 12 first determines a pixel i(xc, yc) which is located closest to the center Q of the matrix Gi. In this example, two pixels B and C are candidates for the pixel i(xc, yc). It is noted that according to the present embodiment, selections are performed in the priority shown in FIG. 33(a). That is, the priority is highest at an orientation "0." The priority decreases in the clockwise direction from the orientation "0" to the orientation "7." In this example, the pixel B is located in an orientation "5" with respect to the matrix center Q, and the pixel C is located in an orientation "1." Accordingly, the pixel C is selected as a pixel i(xc,yc) closest to the center Q.

It is noted that in order to determine the pixel i(xc, yc) in S5620, actual distances D may be calculated between the center Q and all the pixels A–E as shown below.

$$D=(\Delta x \cdot \Delta x + \Delta y \cdot \Delta y)^{1/2}$$

where $\Delta x$ is a difference between the x coordinates of the center Q and each of the pixels A–E, and $\Delta y$ is a difference between the y coordinates of the center Q and each of the pixels A–E. Then, the obtained distances D between the center Q and the pixels A–E are compared with one another. In this example, the distances D obtained between the center Q and pixels B and C are the smallest. Accordingly, the pixels B and C become candidates for the center-closest pixel i(xc,yc).

It is noted that quasi-distances d may be calculated between the center Q and all the pixels A–E as shown below.

$$d=|\Delta x|+|\Delta y|$$

The quasi-distances d between the center Q and the pixels A–E may be compared with one another.

Next, in S5630, the CPU 12 searches another undetermined pixel i(xn, yn) which is closest to the pixel C. This search is also performed by calculating the distances between the pixel C and the remaining pixels A, B, D, and E with using the above-described formulas. In this example, the pixels B and E are the candidates for the pixel i(xn, yn). Also in this case, the priority defined in FIG. 33(a) is applied to determine the element E as closest to the element C. Accordingly, the element E is turned ON (1) in S5650, and the element E is newly determined as a pixel i(xc, yc) in S5690.

Next, the program returns to S5630 where an undetermined pixel i(xn,yn) as closest to the pixel E (newly-determined pixel i(xc,yc)) is searched. In this example, the pixel D is determined as closest to the pixel E in the following manner. As apparent from FIG. 32(a), the pixels E and D are sufficiently distant from each other, and therefore the distance between the pixels E and D may not be regarded as smaller than the distance between the pixels E and B. It is noted, however, that a dither matrix DM, which will be produced based on matrices G0–G255 including this matrix Gi, will have the same size as the matrices G0–G255 and therefore will be used as repeatedly overlaid on input continuous tone images as shown in each of FIGS. 32(a) through 32(f). In view of this, when determining the pixel i(xn, yn) as closest to the pixel i(xc, yc), it is necessary to consider the pixel arrangement produced when the matrix Gi were repeatedly arranged in the same manner as the finally-produced dither matrix DM. When the matrix Gi is repeatedly arranged as shown in FIG. 32(b), the pixel D, located in the right-side located matrix Gi, becomes closest to the pixel E. Accordingly, the pixel D is selected as a new pixel i(xn,yn) as shown in FIG. 32(c). Then, in S5650, the pixel D is turned OFF (0).

Next, in S5630, an undetermined pixel closest to the pixel D is searched. In this example, the three pixels A, B, and C are equally closest to the pixel D as shown in FIG. 32(c). While referring to the priority defined in FIG. 33(a), the pixel A is selected as closest to the pixel D and turned ON (1) in S5650 as shown in FIG. 32(d). Next, in S5630, an undetermined pixel closest to the pixel A is searched. In this example, because the pixel B is closest to the pixel A, the pixel B is selected and turned OFF (0) in S5650 as shown in FIG. 32(e). Finally, as shown in FIG. 32(f), the last pixel C is determined as closest to the pixel B, and turned ON (1) in S5650, and the remaining pixel determination process of S5600 is completed.

It is noted that the binary state of the undetermined pixel C, initially selected in S5620 as the first pixel i(xc,yc) is not determined when it is initially selected as the pixel i(x,y) in S5620. If the pixel C thus selected as closest to the matrix center Q is turned ON (for example) at the first step of S5620, the possibility that the ON state will be concentrated around the center Q will greatly increase. The binary values will be inappropriately distributed in the produced matrix Gi. In view of this, the binary status of the center-closest pixel i(xc,yc) determined in S5620 is not determined at that stage.

Alternatively, the binary status of the center-closest pixel i(xc, yc) determined in S5620 may be determined also in S5620. In this case, the step S5610 may be designed to set the initialization value of the variable I to ON (1) and OFF (0) in alternation with respect to the successively-produced matrices Gi. For example, during the routine of producing the matrix G64, the step S5610 is designed to initialize the variable I to ON (one). During the next routine producing a matrix G192, the step S5610 may be designed to initialize the variable I to OFF (zero). During the next routine producing a matrix G32, the step S5610 may be designed to initialize the variable I to ON (one). The step S5610 may be thus designed to initialize the variable I to ON (one) and OFF (zero) alternately for the successively-conducted routines of S5400–S5800. Or, the step S5610 may be designed to set the initialization value of the variable I to ON (1) and OFF (0) at random for the successively-conducted routines of S5400–S5800.

When the binary status of all the pixels in the matrix Gi are determined (yes in S5560), the produced matrix Gi is stored in S5700 in the working memory 14 together with its index number of i (64 in this example). In the memory, the matrix Gi is located between its lower-closest matrix L (G0 in this case) and its upper-closest matrix H (G255 in this case). As a result, the working memory 14 stores therein four matrices G0, G64, G128, and G255 arranged in this order with the index numbers 0, 64, 128, and 255.

Next, it is judged in S5800 whether or not the pixel determination processes have been completed for all the index numbers in the number arrangement. When not yet completed (no in S5800), the next number in the arrangement is set to the present number i in S5400. Then, for the present number i, the referring pixel determination process of S5500 and the remaining pixel determination process of S5600, and the storage process of S5700 are performed. In more concrete terms, i is set to 192 during a routine next to the routine where the matrix G64 is produced. The matrices G255 and G128 are selected as upper-closest and lower-closest matrices H and L for the index number 192.

Then, the processes of S5500, S5600, and S5700 are conducted in order to determine binary status of all the pixels of the matrix G192. As a result, the working memory 14 stores therein five matrices G0, G64, G128, G192, and G255 arranged in this order with the index numbers 0, 64, 128, 192, and 255.

Thus, as the value i is successively set to 32, 96, 160, 224, and so on, the above-described routines of S5400–S5800 are repeatedly performed. When i is set to 32, the matrix G32 is produced and arranged between its upper-closest and lower-closest matrices G64 and G0. Then, the matrix G96 is produced and located between its upper-closest and lower-closest matrices G128 and G64. Next, the matrix G160 is produced and located between its upper-closest and lower-closest matrices G192 and G128. Then, the matrix G224 is produced and located between its upper-closest and lower-closest matrices G255 and G192. As a result, the working memory 14 stores therein nine matrices G0, G32, G64, G96, G128, G160, G192, G224, and G255 arranged in this order with the index numbers 0, 32, 64, 96, 128, 160, 192, 224, and 255.

Thus, as the value i is successively set to the index numbers 64, 192, 32, 96, . . . in accordance with the number arrangement produced in S5300, the above-described processes are repeatedly performed so as to produce new matrices Gi. The newly-produced matrices Gi are stored in the working memory 14 together with the matrices G0, G128, and G255. When the value i reaches the last number in the number arrangement and when the processes of S5500, S5600, and S5700 are completed (yes in S5800), the working memory 14 finally stores therein 256 matrices G0–G255 with all the identification numbers 0–255 as shown in FIG. 36.

Then, in S5900, the accumulated result matrix M1 is produced from the matrices G0–G255 in the same manner as in the first embodiment. That is, the binary values (1) of all the matrices G0–G255 are accumulated for each pixel position (x,y). The thus calculated value S(x,y) is stored as an accumulated value of a corresponding location (x,y) of the accumulated result matrix M1. In other words, the total number of turned-ON pixels of all the matrices G0–G255 are accumulated for each pixel position (x,y). The thus calculated number of the ON-turned pixels is stored as the accumulated value S(x,y). It is noted that there is a case where the calculated numbers of the ON-turned pixels for two or more pixels will be equal to one another. (The two or more pixels will be referred to as "equally-counted pixels".) In this case, the calculated numbers may be arranged in a certain order. For example, the turned-ON pixel-counted numbers are summed for pixels located surrounding each of the equally-counted pixels. In accordance with the calculated sums, the calculated numbers for the equally-counted pixels may be arranged. Or, the counted numbers of the equally-counted pixels may be arranged in accordance with their positions, for example, their positions relative to the center of the matrix M1. Different threshold values TH may be determined based on the thus arranged equally-calculated numbers. It is further noted that similarly as in the above-described embodiments, it is preferable that each of all the integers 1–255 be set in at least one of all the elements of the dither matrix DM.

In the present embodiment, each of the matrices G1–G127 and G129–G254 is produced in the process of S5500 while considering the binary states of already-produced matrices H and L. Accordingly, the advantages the same as those obtained in the fourth embodiment are also obtained in the present embodiment. That is, in the same manner as in the fourth embodiment, when all the matrices G0–G255 are produced, the matrices G0–G255 satisfy the conditions shown in FIG. 11(a). Accordingly, the index number i of the matrix Gi, at which each element (x,y) is first turned ON (or OFF), may be used as a threshold of the dither matrix DM at a corresponding location (x,y).

Figure 37:
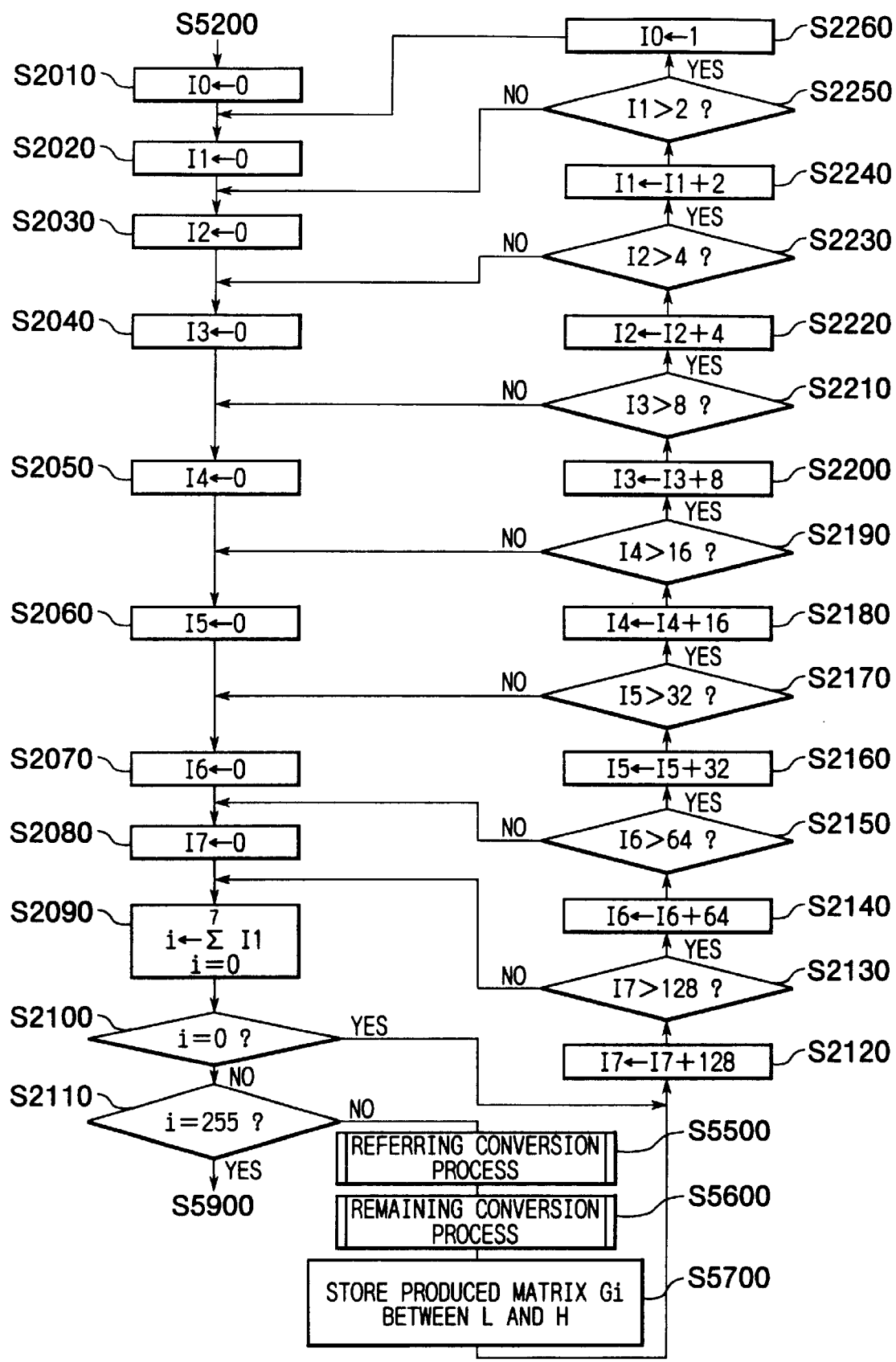
FIG. 37 is a flowchart of a modification of the ninth embodiment.

The processes of S5300–S5800 may be placed with the processes of S2010–S2260 shown in FIG. 37. The processes of S2010–S2260 are the same as those in FIG. 14 of the fourth embodiment except for the steps S5500–S5700. Thus, in the same manner as in the fourth embodiment, the index numbers i=1–254 may be calculated and the corresponding matrices G1–G254 may be produced and stored in S5500 to S5700 in the same manner as described above.

In the above description, the matrix G128 is obtained through converting the matrix D128. However, the matrix G128 may be produced through other various methods.

It is noted that in the matrix G128, the number of the pixels of ON state should be almost equal to the number of pixels of OFF state. In other words, the matrix G128 should have a medium state between the states of the matrices G0 and G255. Accordingly, the matrix G128 may be produced so that its pixels are randomly turned ON and OFF so that the total number of the ON pixels will be substantially equal to that of the OFF pixels. Still in this case, a dither matrix DM will be formed with no noisy patterns because other matrices D1–D127 and D129–D254 are produced through a non-random manner.

Alternatively, the matrix G128 may be produced in the same manner as in the remaining pixel determination process of S5600. Or, the matrix G128 may be produced so that the ON and OFF pixels will be arranged simply in a checkerboard manner. The index number i of 128 may be replaced with another number 127. That is, a matrix G127 may be produced from the matrix D127. Or, another matrix Gi (1≦i≦254) may be produced from a corresponding matrix Di.

In the above description, the remaining pixel determination process of S5600 is conducted so as to search an undetermined pixel i(xn, yn) which has a smallest linear distance from the pixel i(xc, yc) in terms of all the directions. Accordingly, pixels, successively arranged as closest to one another, are alternately turned ON and OFF. That is, when one pixel is determined to be turned ON, a pixel closest to the latest-determined pixel is selected and determined to be turned OFF. Then, a pixel closest to the latest-determined pixel is selected and determined to be turned ON.

In the above description, the pixel, closest to the latest-determined pixel, has the smallest distance from the latest-determined pixel in terms of all the directions. Alternatively, the pixel, closest to the latest-determined pixel, may be selected along a predetermined spiral direction with respect to the latest-determined pixel. That is, in order to select the pixel i(xn,yn), only those pixels that are located along the predetermined spiral direction from the pixel i(xc,yc) are searched, and one pixel closest to that pixel i(xc,yc) is selected. For example, the direction, along which the closest pixel is searched, is set as a clockwise or a counterclockwise direction around the latest-determined pixel. The undetermined pixels can be alternately turned ON and OFF in a direction traveling spirally around the matrix center Q.

Other various methods can be used while preventing the same binary values from being concentrated around certain pixels.

For example, the pixel i(xn, yn), closest to the latest-determined pixel i(xc,yc) can be selected in the following manner. That is, when the total number of the undetermined pixels in the subject matrix Gi is higher than a predetermined number, the pixel i(xn,yn) is selected along the predetermined clockwise or counterclockwise spiral direction with respect to the latest-determined pixel i(xc,yc). When the total number of the undetermined pixels reaches equal to or smaller than the predetermined number, the pixel i(xn,yn) is selected to have the smallest linear distance from the latest-determined pixel i(xc,yc) in all the directions. This is because as shown in FIG. 33(b), when many undetermined pixels remain in the matrix, it is possible to search out the closest undetermined pixel i(xn,yn) only along the spiral direction with respect to the latest-determined pixel i(xc,yc) within a shorter period of time than to search out the undetermined pixel i(xn,yn) defined as closest in terms of all the directions from the pixel i(xc,yc). However, when the total number of the undetermined pixels becomes less than the predetermined number, it is possible to search out the pixel i(xn,yn) through listing up all the undetermined pixels within a shorter period of time than to search out the pixel i(xn,yn) along the spiral direction with respect to the pixel i(xc,yc). For example, the predetermined number can be set in a range of 100 to 1,000 when the product of M and N is equal to 128×128.

The steps S5300–S5400 may be omitted. In this case, the index number i of a matrix Di produced through each routine of S5500–S5800 is determined in S5700 when the matrix Di is produced and stored between its lower-closest and upper-closed matrices Di.

During the remaining pixel determination process, undetermined pixels of the new matrix are turned ON or OFF so that the same values will not be concentrated around certain pixel locations. A dither matrix DM, which will be produced based on the thus produced matrices, can dither images into pseudo-halftone images while not lowering the resolution and while restraining textures from occurring. Thus produced images will not have dots arranged completely randomly and therefore will not be noisy.

As described above, according to the present embodiment, first, two matrices are selected from a group of matrices whose pixels have binary states of On and Off. It is judged whether or not the pixel values of the two matrices at the corresponding locations are equal to each other. When the pixel values are equal to each other, a corresponding element on a new matrix is set equal to the pixel values. When the pixel values are different from each other, on the other hand, a corresponding pixel on a new matrix is set so that the same values will not gather in the new matrix. The above-described processes will be repeated to produce a plurality of new matrices and insert the new matrices into the matrix group. Thus, a group of matrices is produced to include the predetermined number (256) of matrices. Threshold values of a dither matrix DM are determined based on the produced group of matrices.

The dither matrix producing device 2 was controlled to produce a dither matrix DM or a dither matrix DM' according to the dither matrix production process of each of the first through ninth embodiments. Then, the device 2 was controlled to convert, with the produced dither matrix DM (or DM'), continuous tone image data inputted from the input portion 10. The resultant binary image data was temporarily stored in the output image memory 17 and was outputted to the output portion 19. The output portion 19, i.e., the color printer, was controlled to print binary images based on the supplied binary image data. The resultant image was a desirable pseudo-halftone image which was not noisy, which did not have a deteriorated resolution, and which did not suffer from any undesirable textures. Because this conversion process used the dither matrix DM or DM', a number of computations were not needed.

A tenth embodiment will be described below with reference to FIGS. 38–41.

The tenth embodiment is a method of dithering input continues tone images with using the dither matrix DM produced through a process of either of the first through ninth embodiments while correcting the tone of the images according to a user's desired tone characteristic.

Figure 38:
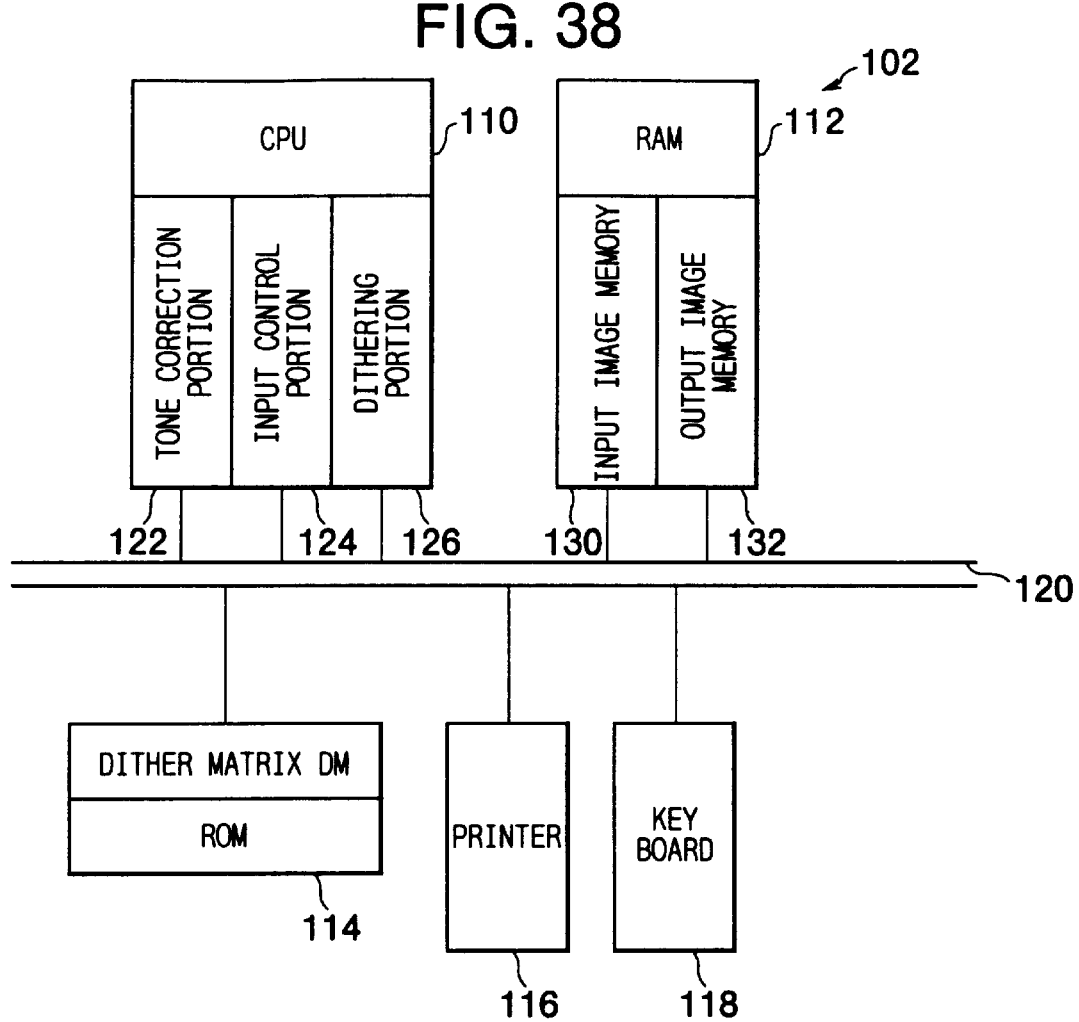
FIG. 38 is a block diagram of a tone conversion device of a tenth embodiment.

FIG. 38 shows an image dithering device 102 for dithering or converting input continuous tone images into pseudo-halftone images with the dither matrix DM produced through a process of either one of the first through ninth embodiments. As shown in FIG. 38, the device 102 includes a CPU 110, a RAM 112, a ROM 114, a printer 116, and a key board 118 which are connected via a bus 120. The CPU 110 includes a tone correction portion 122, an input control portion 124, and a dithering portion 126. The RAM 112 includes an input image memory 130 and an output image memory 132. The ROM 114 stores therein the dither matrix DM produced through a process of either one of the first through ninth embodiments. The dither matrix DM includes a M by N elements. Each of all the integers between 1 and 255 is allotted as a threshold value to at least one of the M×N elements of the dither matrix DM. Each element is represented by M (dx, dy) where (dx, dy) represents a position of the corresponding element in the dither matrix 46. Where $0 \leq dx < M$, $0 \leq dy < N$ It is noted that the device 102 may be constructed from the dither matrix producing device 2 of the first through ninth embodiments. That is, the ROM 114 may be constructed from the dither matrix storage memory 16, the CPU 110 may be constructed from the CPU 12, the RAM 112 may be constructed from the working memory 14, the printer 116 may be constructed from the output portion 19, and the key board 19 may be constructed from the input portion 10. In this case, the dither matrix producing device 2 can correct image tone characteristic while dithering continuous tone images into binary images with the produced dither matrix DM.

Figure 39:
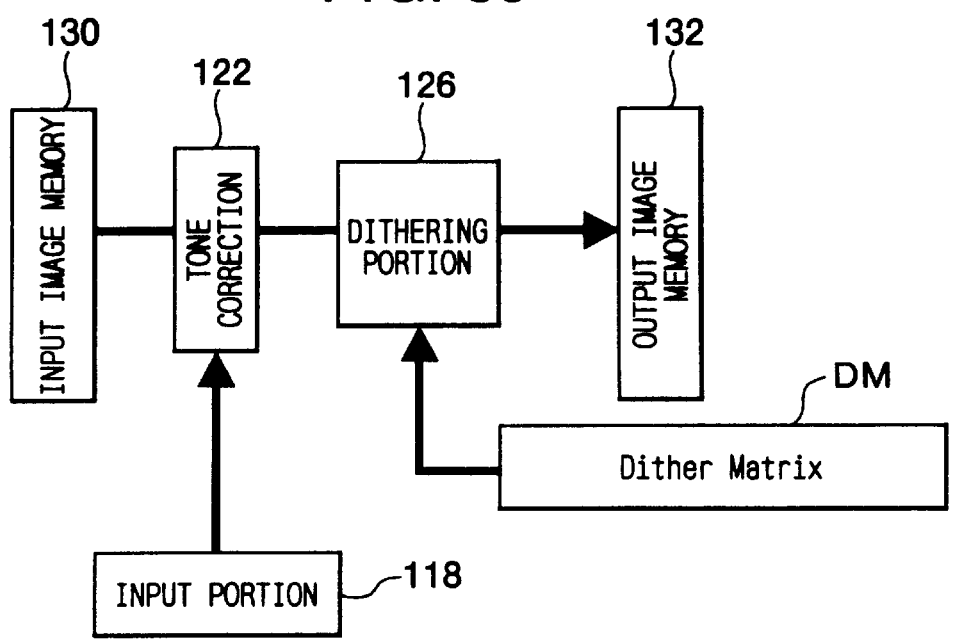
FIG. 39 is a function block diagram of the tenth embodiment.
Figure 40:
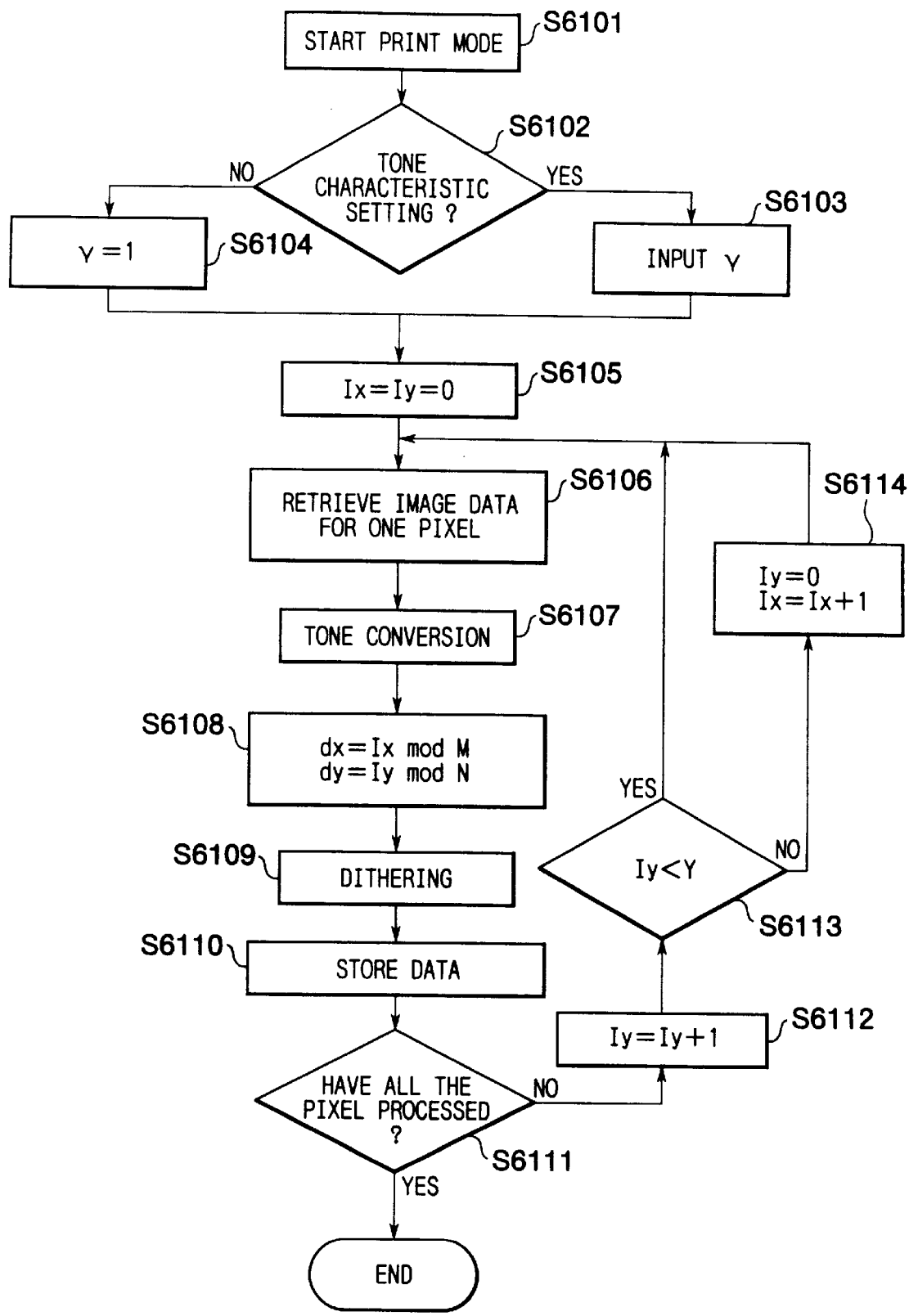
FIG. 40 is a flowchart of a tone conversion process of the tenth embodiment.

The operation of the tone conversion device 102 will be described below with reference to FIGS. 39 and 40. The input image memory 130 stores therein image data received from an image reading device (not shown). The image data is constructed from a plurality of pixels arranged two-dimensionally. In this example, the image data is comprised of X by Y pixels. A value of each pixel in the image data is an integer represented by D(Ix, Iy). This value will be referred to as a pixel value hereinafter, where $0 \leq Ix < X-1$, $0 \leq Iy < Y-1$, $0 \leq D(Ix, Iy) \leq 255$.

When a user depresses a print key (not shown), a print mode is started in S6101. The CPU 110 asks the user in S6102 whether or not the user desires to designate a tone characteristic. When desiring to designate a tone characteristic, the user manipulates the key board 118 to input his/her desired characteristic value γ. The input portion 134 receives the inputted value in S6103. The inputted value γ is higher than zero (0). When the user does not input the tone characteristic in S6102, the value γ is initialized to one (1) in S6104. Then, the variables Ix and Iy are set to zero (0) in S6105. Next, one pixel value D(Ix, Iy) is retrieved from the input image memory 130 in S6106. The retrieved pixel value is subjected to a tone conversion process represented by the following formula. As a result, a tone-corrected pixel value D'(x, Iy) is obtained.

$$D'(Ix,Iy)=int[\{D(Ix,Iy)/255\}^{\gamma}*255]$$

where value γ is the tone characteristic value set in S6103 or S6104, and int {} denotes a function to obtain an integer for a value within {}.

Next, values dx and dy are calculated in S6108 by the following equation.

$$dx = Ix \bmod M$$
$$dy = Iy \bmod N$$

where "A mod B" denotes a function to obtain a remainder obtained when A is divided by B.

Next, a threshold M (dx, dy) is selected from the dither matrix DM based on the values dx and dy calculated in S6108. Then, a record signal O(Ix, Iy) is calculated in S6109 based on the selected value M(dx, dy) and the corrected value D'(Ix, Iy) obtained in S6107. This calculation is achieved as shown in the following formula.

$$\text{if } (D(Ix,Iy) > M(dx,dy)), \ O(Ix,Iy)=1$$

else, O(Ix, Iy)=0

The record signal O(Ix, Iy) is for recording the dot location (Ix, Iy). O(Ix, Iy) of one (1) indicates to record a dot, and O(Ix, Iy) of zero (0) indicates not to record a dot. Then, the record signal is stored in the output image memory 132 in S6110.

Next, it is judged in S6111 whether or not all the image data D(Ix,Iy) are retrieved from the input image memory 130. When all the image data are retrieved (yes in S6111), the process is completed. When all the image data are not yet retrieved (No in S6111), the value Iy is first incremented in S6112. It is then judged in S6113 whether or not Iy<Y. When Iy>Y (no in S6113), Iy is set to zero (0), and Ix is incremented by one (1) in S6114. Then, the program returns to S6106. When Iy<Y (yes in S6113), the program directly returns to S6106. Through the above-described processings, the tone-corrected image is dithered by the dither matrix DM. The obtained record signals represent binary image of the user's desired tone characteristic.

The above description is directed to a bilevel recording where record signals have values of 0 or 1. Following are descriptions on multilevel recording where the record signals may have values not only of 0 or 1 but also other values. In order to perform the multilevel recording, the dither matrix DM has to be modified, and the program of S6109 for calculating the record signals O(Ix, Iy) have to be modified. By way of example, in the following description, the record signals O(Ix, Iy) will be produced to have values of either one of zero (0), one (1), and two (2). O(Ix, Iy) of zero (0) indicates not to record a dot, O(Ix, Iy) of one (1) indicates to record a small dot, and O(Ix, Iy) of two (2) indicates to record a large dot.

As shown in FIG. 41, the dither matrix DM is produced so that two threshold values M1(dx, dy) and M2(dx, dy) are set and stored in correspondence with each element location (dx, dy) of the dither matrix DM. The threshold values M1 may be produced from, for example, the predetermined portion A defined in the matrices D0–D255 through the process of the second embodiment. The threshold values M2 may be produced from, for example, another portion A' defined in the matrices D0–D255 also through the process of the second embodiment. The portion A' is set as different from the portion A.

The calculation performed in S6109 is modified as shown below. If D(Ix, Iy) is lower than both of M1(dx, dy) and M1(dx, dy), O(Ix, Iy) is set to 0. If D(Ix, Iy) is lower than only one of M1(dx, dy) and M1(dx, dy), O(Ix, Iy) is set to 1. If D(Ix, Iy) is equal to or higher than both of M1(dx, dy) and M1(dx, dy), O(Ix, Iy) is set to 2.

Through the above-described modification, the user's desired tone characteristic can be set also during multilevel recording operation.

An eleventh embodiment will be described below with reference to FIGS. 42–46.

The eleventh embodiment provides another method of dithering continuous tone images into pseudo-halftone images with using the dither matrix DM while changing the tones of the images.

According to the present embodiment, threshold values of the dither matrix DM are subjected to a user's desired tone conversion process. The thus converted threshold values are used as elements of a new dither matrix DM4. According to the present embodiment, therefore a dither matrix DM4 of a user's desired tone characteristic is produced. Image data is converted by the new dither matrix DM4 into record signals. Because the new dither matrix DM4 has been subjected to the desired tone conversion process, the record signals, obtained during dithering image data converted by the new dither matrix DM4, are also influenced by the desired tone conversion process. The number of the elements in the dither matrix DM is generally much smaller than the number of pixels constructing the image data. Accordingly, the number of times, at which the tone conversion process has to be repeatedly performed onto the elements of the dither matrix DM, is much smaller than the number of times, at which the tone conversion process has to be repeatedly performed onto the pixels of entire input image according to the tenth embodiment. The image processing operation can be performed within a shorter period of time.

It is noted that the number of tones reproducible by the record signals, depend on the variety of the threshold values of the dither matrix DM4, i.e., the total number of different threshold values provided on the dither matrix DM4. The threshold values of the dither matrix DM4 are obtained through converting the threshold values of the original dither matrix DM during the tone conversion process. Accordingly, the total number of the different threshold values on the dither matrix DM4 becomes lower than that of different threshold values on the original dither matrix DM. Accordingly, the dither matrix DM is preferably produced according to the first through ninth embodiments so that the total number of different threshold values on the dither matrix DM becomes greater than that of the tone levels reproducible by the input continuous tone image data. In this case, even when the total number of different threshold values of the dither matrix DM4 becomes smaller than that of the original dither matrix DM, it is still possible to prevent the number of tone levels to be reproduced by record signals from decreasing. It is possible to prevent the lowering of the tone level variety and the occurrence of undesirable outlines. When the total number of different threshold values on the dither matrix DM4 is equal to less than the number of values reproducible by the inputted continuous tone image data, it is possible to prevent too much amount of data from generating. It becomes unnecessary to use too much amount of memory area.

The present embodiment will be described below in more detail with referring to FIGS. 42–46. The image dithering device 102 of the present embodiment is the same as that of the tenth embodiment except for the following points.

The RAM 112 includes not only the input image memory 130 and the output image memory 132 but also a dither matrix storage area for a dither matrix DM4 which is produced through converting the tone characteristic of the dither matrix DM. Each of the matrices DM and DM4 is comprised of a plurality of two-dimensionally arranged elements. That is, each of the matrices DM and DM4 is comprised of M by N elements. According to the present embodiment, the product of M and N is set equal to 4,096. Each of all the integers 1–4,096 is set as a threshold in at least one of all the elements in the original matrix DM. In order to produce this dither matrix DM, for example, M×N (4,096) uniform density pixel matrices Di (i=0–4,095) may be prepared. Then, the dither matrix DM may be produced in the same manner as in either one of the first through eighth embodiments. Alternatively, the dither matrix DM may be produced from 4,096 matrices Gi (i=0–4,095) in the same manner as in the ninth embodiment.

Each element value of the dither matrix DM is indicated by Mo(dox, doy). The (dox, doy) represents an element location in the matrix DM where dox and doy are integers and $0 \leq dox < M$ and $0 \leq doy < N$. Each element in the dither matrix DM4 is allotted to an integer of either one of 1 to 255. Each element value in the dither matrix DM4 is indicated by Mn(dnx, dny). The (dnx, dny) represents an element location in the matrix DM4 where dnx and dny are integers and $0 \leq dnx < M$ and $0 \leq dny < N$.

Figure 43:
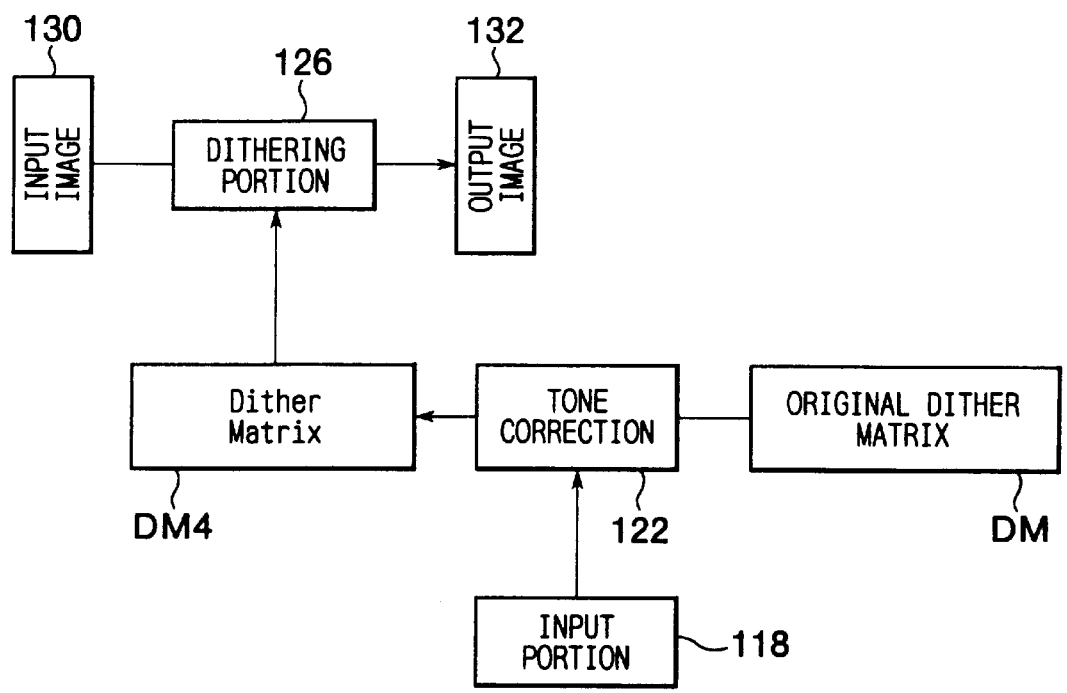
FIG. 43 is a function block diagram of the eleventh embodiment.
Figure 44:
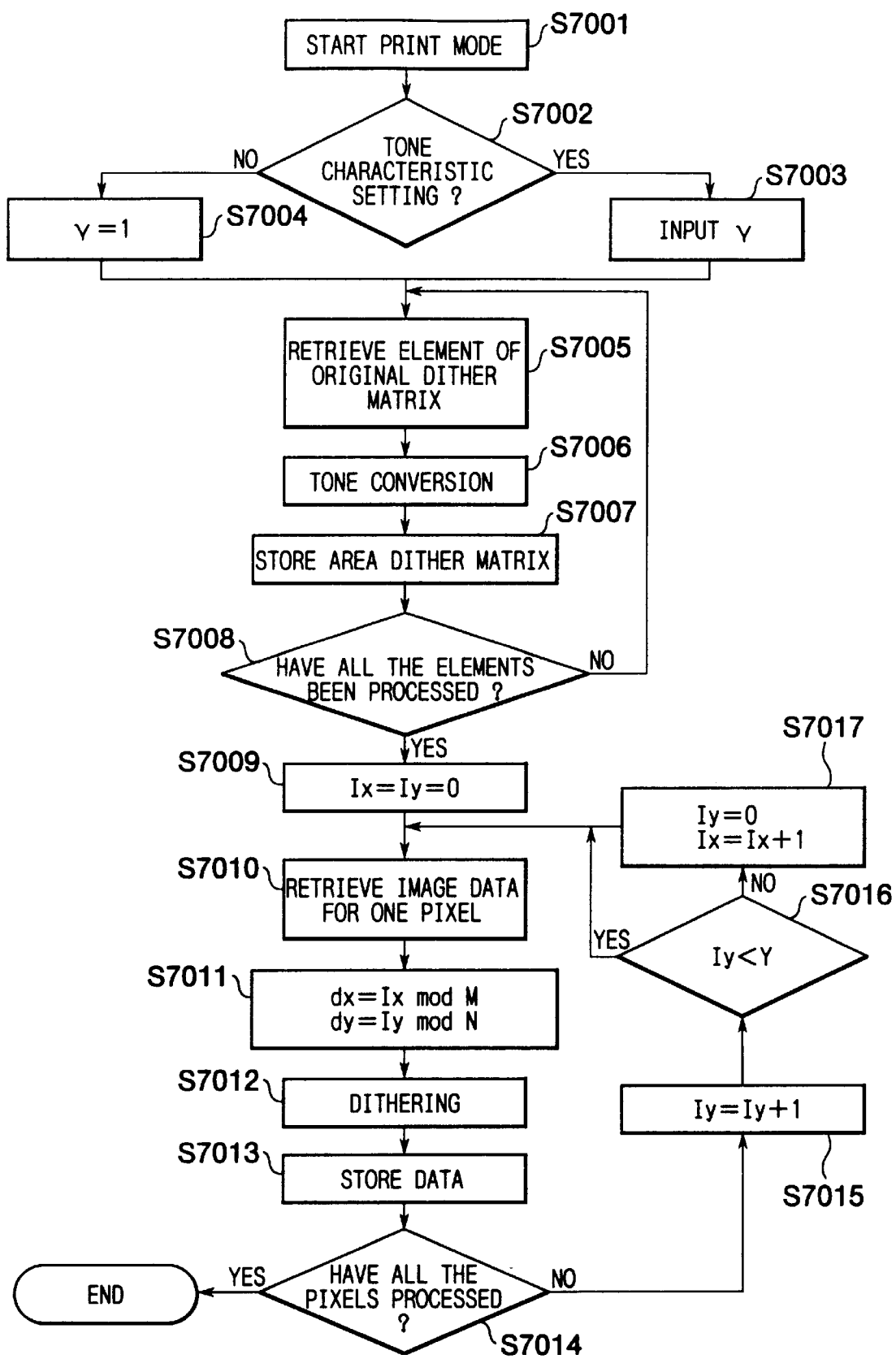
FIG. 44 is a flowchart of a tone conversion process of the eleventh embodiment.

Next, the operation of the tone conversion device 102 will be described below with reference to FIGS. 43 and 44.

When a user depresses a print key (not shown), a print mode is started in S7001. The CPU 110 asks the user in S7002 whether or not the user desires to designate a tone characteristic. When desiring to designate a tone characteristic, the user manipulates the key board 118 or the like to input his/her desired characteristic value γ. The input portion 124 receives the inputted value in S7003. Then, the tone correction portion 122 selects one element value Mo(dx,dy) from the original dither matrix DM in S7005 where $0 \leq dx < M$, $0 \leq dy < N$. Then, a tone conversion process represented by the following formula is performed to calculate a correction value H in S7006.

$$H = int[\{Mo(dx, dy)/(M*N)\}^{1/\gamma} * 255]$$

It is noted that if H>255, H is set to 255 where int [ ] is a function for obtaining an integer for a value within [ ] through a round-up operation. Then, in S7007, the obtained correction value H is stored as a corresponding element in the dither matrix DM4. That is, Mn(dx, dy)=H.

Then, it is judged in S7008 whether or not all the elements in the original dither matrix DM have been subjected to the above-described processes. When all the elements have been processed, the program proceeds to S7009 where the variables Ix and Iy are initialized. That is, Ix=Iy=0. Next, the pixel value D(Ix, Iy) is retrieved from the input image memory 130 in S7010, and the values dx and dy are calculated in S7011 by the following formulas:

$$dx = Ix \bmod M$$

$$dy = Iy \bmod N$$

Then, the dithering or converting process, represented by the following formula, is attained by the dithering portion 126 to calculate a record signal O(Ix, Iy) in S7012. if (D(Ix, Iy)<Mn(dx, dy)), O(Ix, Iy)=0 else O(Ix, Iy)=1

Then, the record signal O(Ix, Iy) is stored in the output image memory 132 in S7013. Then, it is judged in S7014 whether or not all the pixels of the input image data have been retrieved. When all the pixels have not yet been retrieved (no in S7014), the variable Iy is added by one (1) in S7015. It is judged in S7016 whether or not the sum "Iy+1" is smaller than the value Y. When the sum "Iy+1" is equal to Y (no in S7016), the variable Ix is added to one in S7017. Then, the program returns to S7010. When the user does not desire to set any tone characteristic, the value γ is set to one (1) in S7004, and the program proceeds to S7005. When all the elements of the original dither matrix DM have not yet been processed (no in S7008), the program returns to S7005. When all the pixels of the input image data have been retrieved (yes in S7014), the program ends. When the sum "Iy+1" is smaller than Y (yes in S7016), the program directly returns to S7010.

For example, when input image data is constructed from pixels arranged at a resolution of 300 dpi in an A4 sized original, the total number of pixels is as large as about eight millions. Contrarily, the number of elements in the dither matrix DM is relatively small. That is, the dither matrix DM is comprised of 4,096 elements, for example. According to the present embodiment, the tone conversion process of S7006 is performed not onto the pixel values of the image data but onto the threshold values of the dither matrix DM. Accordingly, the number of processings can be greatly reduced. The entire image processings can be performed within a much shorter period of time.

It is noted that the dither matrix DM is produced during a process of either one of the first through ninth embodiments so that the variety of thresholds in the original dither matrix DM will be greater than the number of tone levels reproducible by the input image data pixel values. For example, when the pixel values of the input image data may have 256 different values in the range of 0 to 255, the original dither matrix DM may have 256 or more different threshold values. In this example, the dither matrix DM has 4,096 different threshold values. Accordingly, the following advantages can be obtained.

Figure 45:
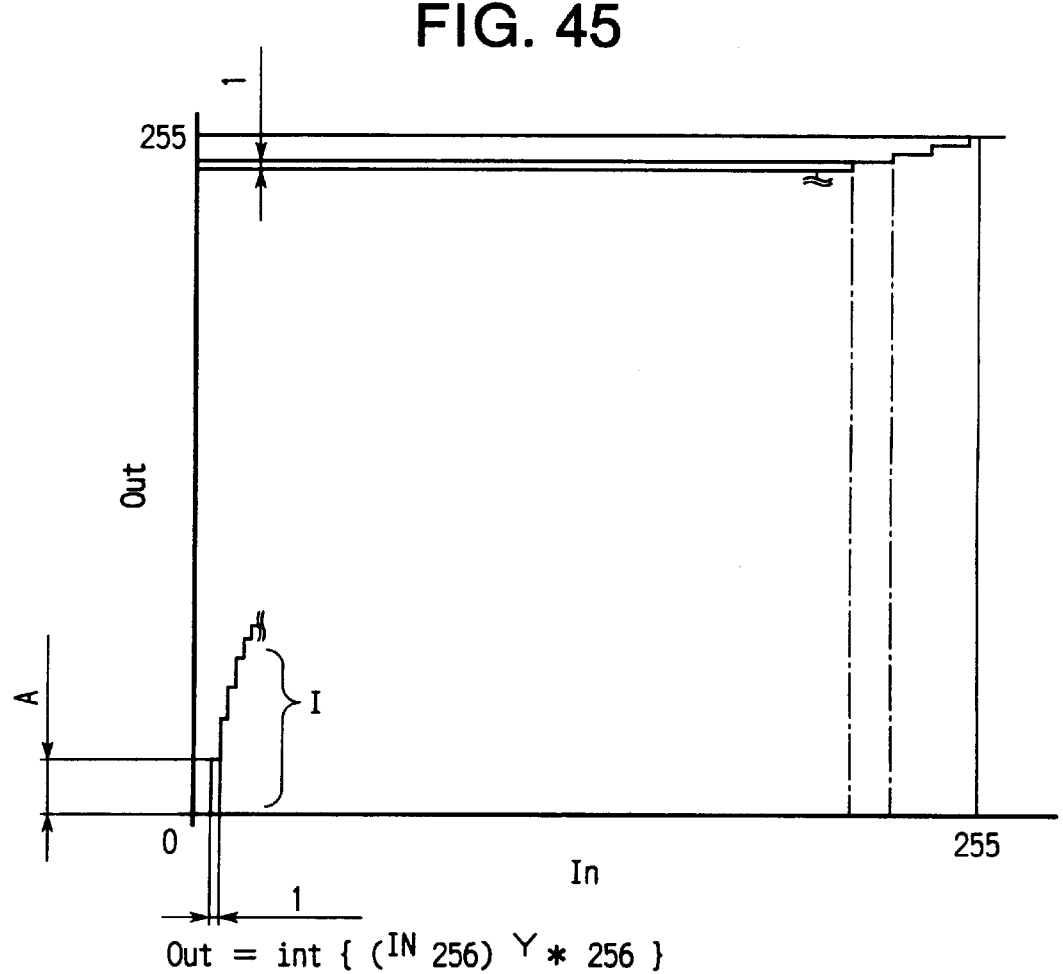
FIG. 45 shows how tone level number decreases through the tone conversion process.

FIG. 45 illustrates how to perform the tone conversion process of S7006. The horizontal axis denotes an input value In of an element of the dither matrix DM to be subjected to the tone conversion process, and the vertical axis denotes an output value Out which is obtained through the process of S7006 from the value In and which is to be used as an element of the dither matrix DM4. It is now assumed that the input values In include only 256 different threshold values distributed in the range of 0 to 255, and that the total number (M * N) of elements in the dither matrix DM is 256. When the conversion of S7006 is achieved onto the input value In, output values Out will be produced intermittently in the range I as shown in FIG. 45. That is, for example, because the threshold value A of the dither matrix DM is not one but nine, output values "1"–"9" will not be produced for the elements of the matrix DM4. This means that though the reading device supplies the device 102 with 256 different tone levels between 0 to 255, the dither matrix DM4 may not recognize between tone levels 1 to 8. Output images, converted by the dither matrix DM4, will therefore suffer from undesirable outlines and will have a deteriorated image quality. According to the present embodiment, therefore, the dither matrix DM is prepared during a process according to either one of the first through ninth embodiments so that the total number of different threshold values in the original dither matrix DM be greater than the number of different pixel values inputtable into the device 102. It therefore becomes possible to prevent any tone levels from being lost.

This advantage will be described in greater detail while referring to examples shown in FIGS. 46(a) and 46(b). FIG.

46(a) partly shows threshold values "Out1" of the dither matrix DM4 obtained through the following tone correction formula when the original dither matrix DM has only 256 different threshold values "In1" of 0 to 255:

$$Out1 = Int[(In1/255)^{0.6} * 255]$$

where In1 and Out1 represent integers within the range of 0 to 255, and Int { } is a function for obtaining an integer for a value within { } through a round up calculation.

FIG. 46(b) partly shows threshold values Out2 of the dither matrix DM4 according to the present embodiment which are obtained through the following tone correction formula when the original dither matrix DM has 4,096 threshold values "In2" of 0 to 4,095:

$$Out2 = Int[(In2/4096)^{0.6} * 255]$$

where In2 represents all the integers within the range of 0 to 4,095, and On2 represents all the integers within the range of 0 to 255.

As apparent from the tables of FIGS. 46(a) and 46(b), when the number of different kinds of the threshold values of the dither matrix DM is as small as the number of the pixel densities to be inputtable to the device as shown in FIG. 46(a), several threshold values will not be produced through the tone conversion process. For example, while the threshold value of the dither matrix DM changes from zero (0) to one (1), the threshold value of the dither matrix DM4 greatly changes from zero (0) to nine (9). It is therefore apparent that threshold values 1 through 8 will be lost from the dither matrix DM4. Accordingly, the dither matrix DM4 will convert pixel densities 1–8 of input images into a single "0" state. Thus, the obtained images will not have a good halftone condition.

Contrarily, according to the present embodiment, the number of different kinds of the threshold values on the dither matrix DM is greater than the inputtable tone level number 256 as shown in FIG. 46(b). Accordingly, all the values in the range of 0–255 will be certainly produced as the threshold values of the dither matrix DM4. That is, all the threshold values in the range of 0 to 255 will be reproduced for the dither matrix DM4 based on the threshold values of the dither matrix DM in the range of 0 to 4,095. Accordingly, the dither matrix DM4 will properly convert all the pixel densities 0–255 of input images into binary values.

Because the dither matrix DM4 has threshold values in the range of 0 to 255, each threshold value can be represented by one byte data. Accordingly, the memory 112 can be used highly efficiently.

As described above, according to the present embodiment, the original dither matrix is prepared to have a plurality of elements representing a plurality of threshold values, whose variety being greater than that of tone levels of input images. The threshold values are converted based on the user's set tone conversion characteristic. The converted threshold values are used for converting continuous tone image data into binary image data. Because the original dither matrix has a greater variety of threshold values than the number of tones of inputtable image data, the converted dither matrix DM4 can produce halftone images of high reproducibility.

A twelfth embodiment will be described below with reference to FIGS. 47–50.

The above-described various advantages of the eleventh embodiment can be obtained not only for the bilevel recording operation but also for multilevel recording operation. The multilevel recording is performed through converting image data into record signals using a plurality of threshold values which are stored in the dither matrix DM in correspondence with each element location. According to the present embodiment, the original dither matrix DM has a single threshold at each element. However, a user can set a plurality of different tone characteristics. The plurality of tone characteristics will be used to convert the single threshold value on each element of the dither matrix DM into a plurality of threshold values. Accordingly, a user's desired tone characteristic can be reproduced even during a multilevel printing operation using a combination of the inputted plural different tone characteristics.

The present embodiment will be described below in greater detail.

According to the present embodiment, the dither matrix DM4 will be produced to have two values for each element location.

First, details of the original dither matrix DM and the dither matrix DM4 will be described below with reference to FIG. 47. The dither matrix DM is produced during a process of either one of the first through ninth embodiments. The dither matrix DM has a single threshold value on each element location (x,y). Each element (dx, dy) of the dither matrix DM4 has two thresholds "low" and "high". The two thresholds "low" and "high" are indicated by Ml (dx, dy) and Mh (dx, dy) where $1 \leq Ml(dx, dy)$, $Mh(dx, dy) \leq 255$.

Figure 48:
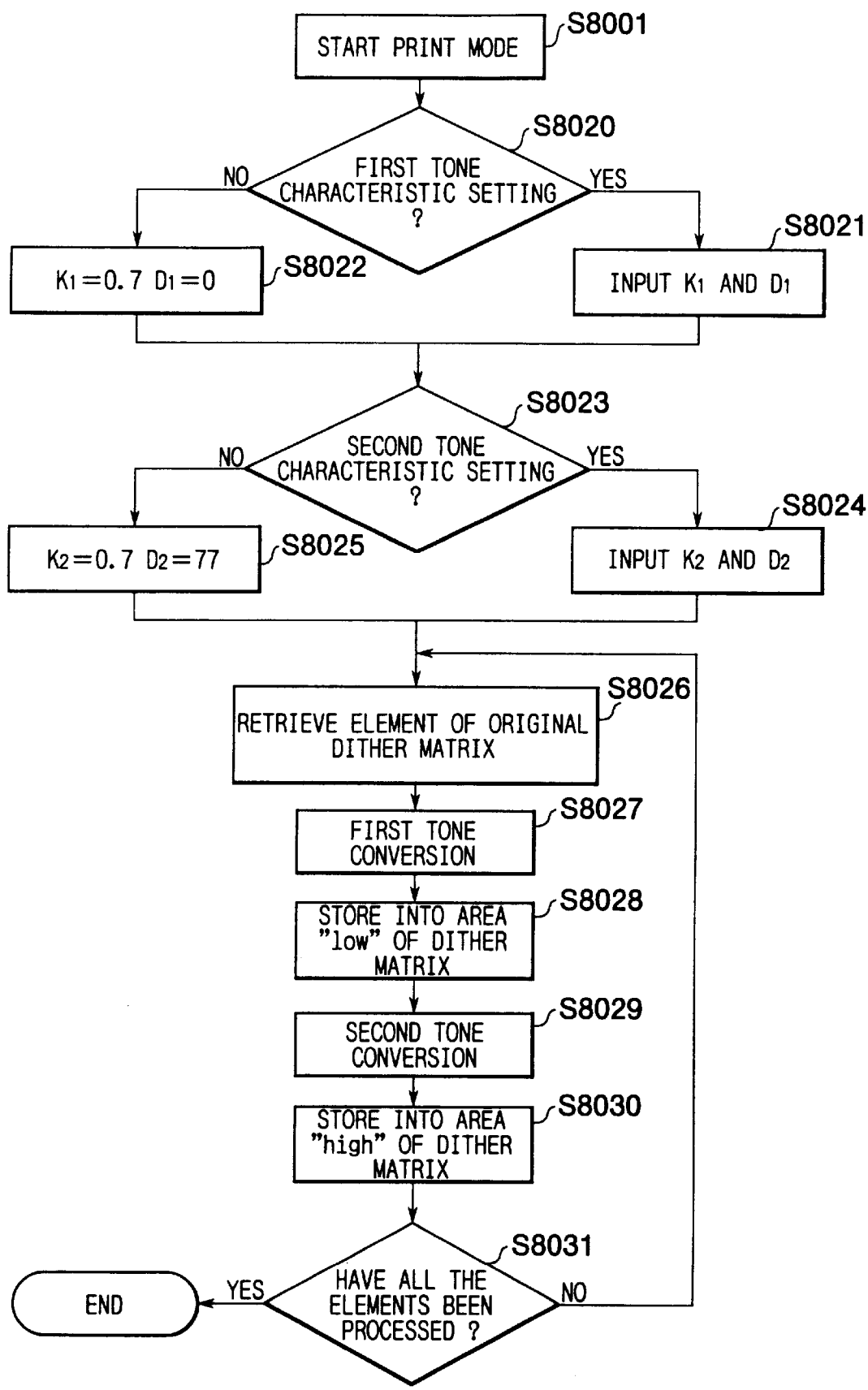
FIG. 48 is a flowchart of a tone conversion process of the twelfth embodiment.

Next will be given a description of how to produce the dither matrix DM4 from the dither matrix DM with reference to FIG. 48.

When the print mode starts in S8001, the CPU 110 asks the user in S8020 whether or not the user wants to set a first tone characteristic. When the user wants to set the first tone characteristic (yes in S8020), the user operates the key board 118 or the like to input values K1 and D1. In S8021, the input control portion 124 receives the inputted values K1 and D1, and stores them into a storage region (not shown) in the RAM 112. Next, the CPU 110 asks the user in S8023 whether or not the user wants to set a second tone characteristic. When the user wants to set the second tone characteristic (yes in S8023), the user operates the key board 18 or the like to input values K2 and D2. In S8024, the input control portion 124 receives the inputted values K2 and D2, and stores them into the storage region in the RAM 112.

Then, the tone correction portion 122 retrieves one element threshold Mo(dx, dy) from the original dither matrix DM in S8026. Then, the tone correction portion 122 performs a first tone correction as represented by the following formula to calculate a value Ml(dx, dy) in S8027:

$$Ml(dx,dy) = (Mo(dx,dy)/(M*N)*K1*255) + D1$$

if $(Ml(dx,dy) > 255)$, $Ml(dx,dy) = 255$ else if $(Ml(dx,dy) < 0)$, $Ml(dx,dy) = 0$ Then, the value Ml(dx, dy) is stored in an area "low" of the dither matrix DM4 in S8028. Then, the tone correction portion 122 performs a second tone correction as represented by the following formula to calculate a value Mh(dx, dy) in S8029:

$$Mh(dx,dy) = (Mo(dx,dy)/(M*N)*K2*255) + D2$$

if $(Mh(dx,dy) > 255)$, $Mh(dx,dy) = 255$ else if $(Mh(dx,dy) < 0)$, $Mh(dx,dy) = 0$ Then, the value Mh(dx, dy) is stored in an area "high" of the dither matrix DM4 in S8030. It is judged in S8031 whether or not all the pixels have been retrieved. When all the pixels have been retrieved (yes in S8031), the program ends. When the user does not want to set the first tone characteristic value (no in S20), on the other hand, K1 is set to 0.7, and D1 is set to 0, and the program proceeds to S8023. When the user does not want to set the second tone characteristic value (no in S8023), K2 is set to 0.7, and D2 is set to 77, and the program proceeds to S8026. When all the pixels have not yet been retrieved (no in S8031), the program returns to S8026.

Through the above-described processes, the original dither matrix DM is converted into the dither matrix DM4 for the multilevel recording while being subjected to the tone conversion operation. Then, with the use of the dither matrix DM4, input images will be converted into multilevel images in the same manner as in S7009–S7017 (FIG. 44) in the eleventh embodiment. Because it is sufficient to previously store only a single original dither matrix DM, the amount of the memory area can be reduced.

Figure 49:
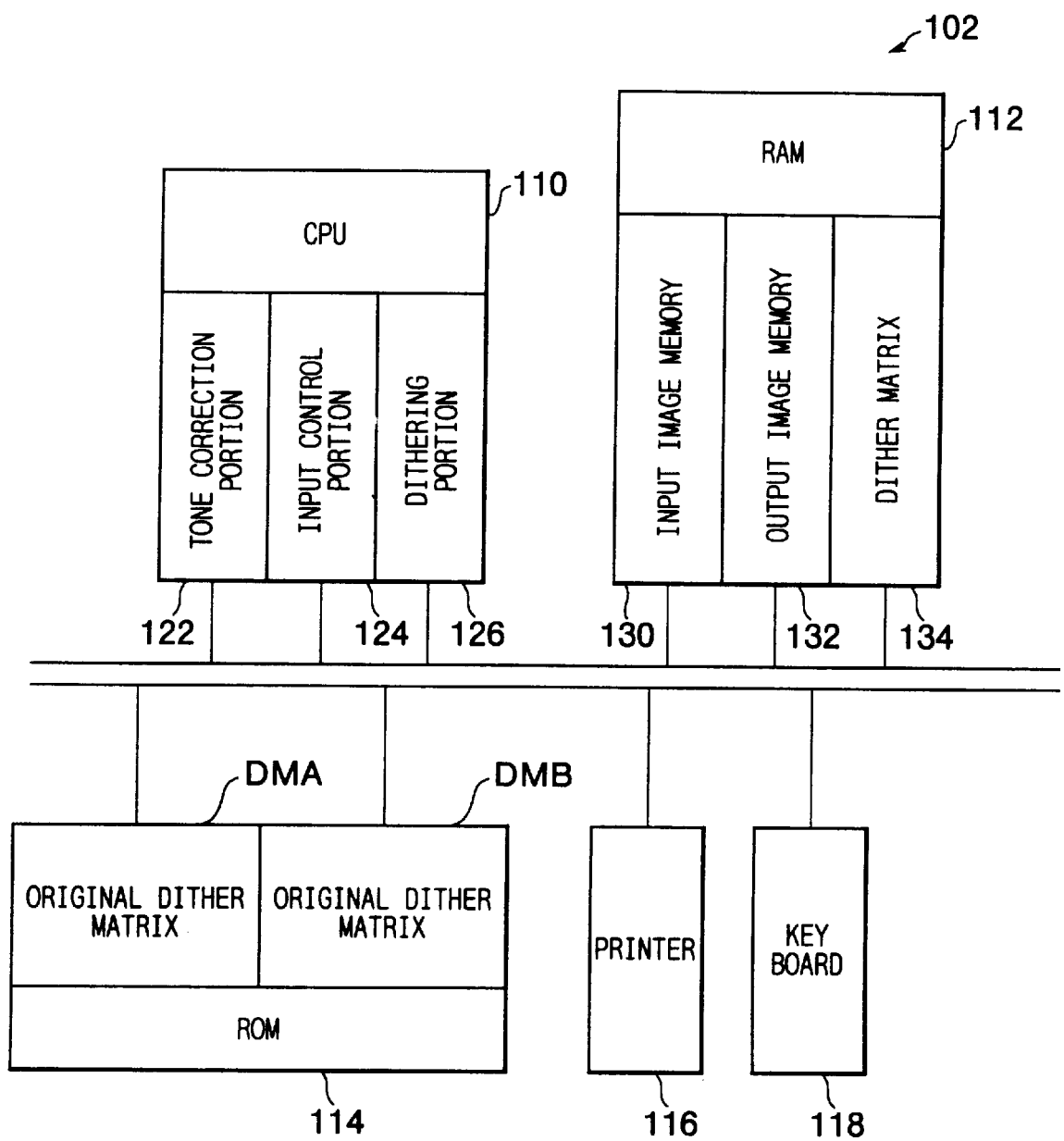
FIG. 49 shows a tone conversion device of a modification.

A modification of the multilevel recording process will be described below with reference to FIGS. 49 and 50. This modification is different from that of the twelfth embodiment except for the following points:

According to the present modification, the ROM 14 includes two dither matrices: an original dither matrix DMA and another original dither matrix DMB. These matrices have threshold values different from each other. The thresholds in the matrix DMA are indicated by Mo1(dx, dy), and the thresholds in the matrix DMB are indicated by Mo2(dx, dy). The dither matrix DM4 has the same structure as shown in FIG. 47 for performing multilevel recording operation. The original matrices DMA and DMB are produced through the process of the second embodiment from the two different portions A and A' defined in the matrices D0–D255.

Next will be given a description of how to produce the dither matrix DM4 according to this modification.

Figure 50:
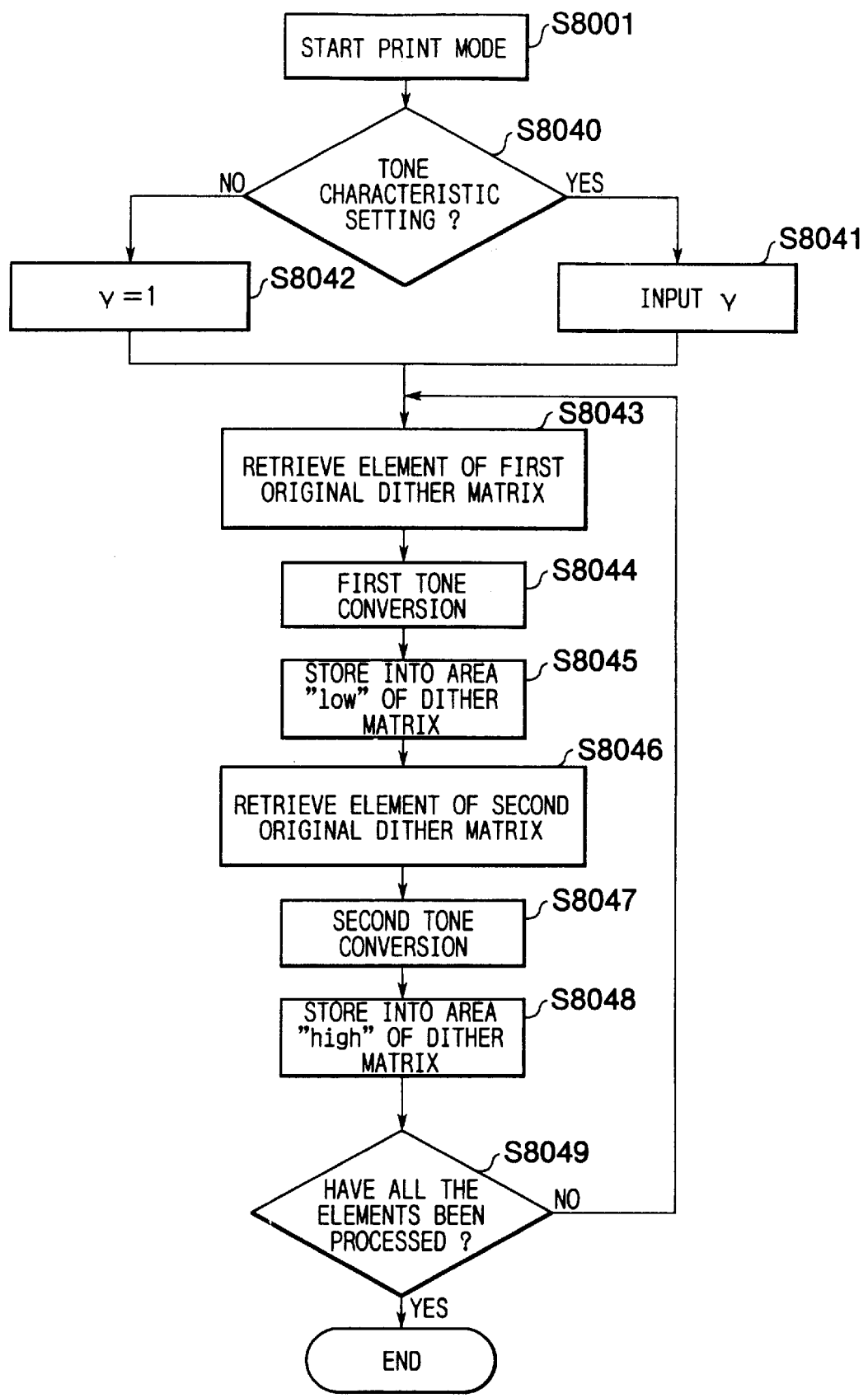
FIG. 50 is a flowchart of a tone conversion process of the modification.

As shown in FIG. 50, when the print mode starts in S8041, first, the CPU 110 asks the user whether or not the user wants to set a desired tone characteristic in S8040. When the user wants to set the tone characteristic (yes in 8040), the user operates the key board 118 or the like to input the value γ. The input control portion 124 receives the inputted value, and stores the value in a storage area (not shown) of the ROM 12 in S8041.

The tone correction portion 122 retrieves one element threshold Mo1(dx, dy) from the original dither matrix DMA in S8043. Then, the tone correction portion 122 performs a first tone conversion as represented by the following formula to calculate a value M1(dx, dy) in S8044:

$$M1(dx,dy)=(Mo1(dx,dy)/(M*N))^{\gamma}*255$$

The calculated value M1 (dx, dy) is stored in an area "low" of the dither matrix DM4 in S8045.

Next, the tone correction portion 122 retrieves one element threshold Mo2(dx, dy) from the original dither matrix DMB in S8046. Then, the tone correction portion 122 performs a second tone conversion as represented by the following formula to calculate a value Mh(dx, dy) in S8047:

$$Mh(dx,dy)=(Mo2(dx,dy)/(M*N))^{65}*255$$

The calculated value Mh(dx, dy) is stored in an area "high" of the dither matrix DM4 in S8048.

It is judged in S8049 whether all the elements of the dither matrices DMA and DMB have been retrieved. When all the elements have been retrieved (yes in S8049), the program ends. When the user does not want to set the tone characteristic (no in S8040), the CPU 110 sets the value γ to one (1) in S8042, and the program proceeds to S8043. When all the elements have not yet been retrieved (no in S8049), the program returns to S8043.

Also through the above-described structure and operation, the dither matrix DM4 for the multilevel recording can be produced while being subjected to a tone conversion processing. Especially, according to this modification, the tone characteristic γ may be set only once. The operability of the device is enhanced.

In the tenth through twelfth embodiments, the dither matrix DM is produced through the first through ninth embodiments. However, the dither matrix DM', produced through the first through ninth embodiments, may be used in place of the dither matrix DM. That is, the dither matrix DM4 may be produced from the dither matrix DM'.

While the invention has been described in detail with reference to specific embodiments thereof, it would be apparent to those skilled in the art that various changes and modifications may be made therein without departing from the spirit of the invention.

For example, in the tenth and twelfth embodiments, in order to prepare two sets of threshold values for performing a multilevel recording, the process of the second embodiment is used. However, the threshold values can be produced through other various processes. Similarly, in the tenth through twelfth embodiments, the original dither matrix DM can be produced through various methods other than those of the first through ninth embodiments.

In the first through ninth embodiments, all the values 1–255 may not be set as threshold values for the dither matrix DM (DM'). The size M×N (m×n) of the dither matrix DM (DM') may be set smaller than 256.

What is claimed is:

1. A method of producing a dither matrix, the dither matrix being for converting a continuous tone image data representative of a density level within a predetermined input density range into pseudo-halftone image data representative of either one of two density levels, the method comprising the steps of:

preparing a plurality of binary value pixel matrices, each of which includes a plurality of pixels which are two-dimensionally arranged and have binary values; and producing a dither matrix constructed from a plurality of elements which are arranged two-dimensionally, each of the plurality of elements having a threshold value which is determined based on the binary values of the plurality of binary value pixel matrices at corresponding pixels.

2. A method as claimed in claim 1, wherein the dither matrix producing step includes the steps of:

accumulating, at each pixel position, the binary values of all the plurality of binary value pixel matrices; and determining, based on the accumulated result, the threshold value of an element located at a corresponding position.

3. A method as claimed in claim 1, wherein the dither matrix producing step includes the steps of:

counting, at each pixel position, the total number of pixels that have a first binary value in all the plurality of binary value pixel matrices; and determining, based on the accumulated result, the threshold value of an element located at a corresponding position.

4. A method as claimed in claim 1, wherein the binary value pixel matrix preparing step includes the steps of:

preparing a plurality of uniform density pixel matrices for a plurality of density values, the plurality of density values being distributed discretely in a predetermined density range, each of the plurality of uniform density pixel matrices having a plurality of pixels which are arranged two-dimensionally and which have density values equal to the corresponding density value; and producing the plurality of binary value pixel matrices based on the plurality of uniform density pixel matrices.

5. A method as claimed in claim 4, wherein the binary value pixel matrix producing step includes the steps of:

subjecting all the pixels of each uniform density pixel matrix to a binary conversion process to convert the density values of the pixels into binary values while distributing generated errors to neighboring pixels; and producing a binary value pixel matrix based on the binary values produced for pixels which are located at least within a part of each uniform density pixel matrix.

6. A method as claimed in claim 5, wherein a binary value pixel matrix is produced based on the binary values produced for all the pixels of each uniform density pixel matrix.

7. A method as claimed in claim 5, wherein each of the plurality of uniform density pixel matrices has the plurality of pixels arranged in a plurality of pixel lines, and wherein the binary value conversion process is performed pixel by pixel along each pixel line in a main scanning direction.

8. A method as claimed in claim 7, wherein a binary value pixel matrix is produced based on the binary values produced for pixels located within a predetermined portion of each uniform density pixel matrix.

9. A method as claimed in claim 8, wherein the plurality of pixel lines include a leading pixel line and an end pixel line, the binary value conversion process being performed successively from the leading pixel line toward the end pixel line, the predetermined portion excluding the leading pixel line.

10. A method as claimed in claim 9, wherein the predetermined portion includes the end pixel line.

11. A method as claimed in claim 8, wherein the predetermined portion has front and rear edges along the main scanning direction, the front and rear edges contacting edge areas of a remaining portion other than the predetermined portion in each uniform density pixel matrix, the binary value conversion process including a boundary process attained onto at least one of the edges of the predetermined portion and the edge areas of the remaining portion, the boundary process setting, at pixels on both front and rear edges, binary values which are obtained as affected by errors distributed from one to another.

12. A method as claimed in claim 11, wherein the predetermined portion contacts the remaining portion of the uniform density pixel matrix via first and second boundaries, the front edge contacting a rear edge area of the remaining portion via the first boundary and the rear edge contacting a front edge area of the remaining portion via the second boundary, the main scanning direction extending across the first and second boundaries, the boundary process being attained onto either one of the rear edge of the predetermined portion and the front edge area of the remaining portion so that the rear edge of the predetermined portion will receive errors produced at the front edge of the predetermined portion through the front edge area of the remaining portion.

13. A method as claimed in claim 12, wherein during the boundary process, a binary state of the front edge in the predetermined portion is set as a binary state of the front edge area of the outside portion.

14. A method as claimed in claim 13, wherein the error-diffusion binary conversion process is performed in a direction reverse to the main scanning direction both in the rear edge of the predetermined region and the front edge area of the remaining portion.

15. A method as claimed in claim 5, wherein each uniform density pixel matrix has a leading end and a trailing end along a main scanning direction, the density values of the pixels in each uniform density pixel matrix being successively subjected to the error-diffusion binary conversion process in the main scanning direction, and wherein the binary value conversion step includes the step of successively converting the density values of the pixels into binary values in the main scanning direction while generated errors are distributed to neighboring pixels assuming that the pixels in the uniform density pixel matrix are arranged so that the pixels on the leading end are located subsequent to the pixels on the trailing end along the main scanning direction.

16. A method as claimed in claim 15, wherein the plurality of pixels in each uniform density pixel matrix are arranged in a plurality of pixel lines each extending in the main scanning direction, each pixel line having a leading end and a trailing end along the main scanning direction, and wherein the pixels on the uniform density pixel matrix are successively subjected to the error-diffusion binary conversion process so that the density value of a subject pixel is converted into a binary value while a generated error is distributed to neighboring pixels assuming that a single scanning line is produced from the plurality of pixel lines in a manner that a trailing end of each pixel line is connected to a leading end of a pixel line next to the each pixel line.

17. A method as claimed in claim 15, wherein a binary value pixel matrix is produced based on the binary values produced for pixels located within a predetermined portion of each uniform density pixel matrix, the predetermined portion including at least one entire pixel line from the leading end toward the trailing end.

18. A method as claimed in claim 17, wherein the plurality of pixel lines include a leading pixel line and an end pixel line, the predetermined portion excluding the leading pixel line.

19. A method as claimed in claim 18, wherein the predetermined portion includes the end pixel line.

20. A method as claimed in claim 16, wherein the dither matrix has a plurality of threshold element columns, each extending in an auxiliary scanning direction substantially perpendicular to the main scanning direction and each being constructed from several elements, further comprising the step of deforming the dither matrix so that the threshold element columns are shifted from one another in the auxiliary scanning direction, whereby upper and lower ends of the plurality of threshold element columns are shifted from one another in the auxiliary scanning direction.

21. A method as claimed in claim 20, wherein the dither matrix is deformed into a parallelogram shape in which upper and lower sides of the dither matrix in the auxiliary scanning direction are in linear lines which extend in a direction slanted relative to the main scanning direction with a predetermined angle.

22. A method as claimed in claim 5, wherein all the uniform density pixel matrices are successively subjected to the binary value conversion process.

23. A method as claimed in claim 22, wherein the density value of each pixel on each uniform density pixel matrix is converted into a binary value dependent on a binary value of a corresponding pixel on another already-processed uniform density pixel matrix.

24. A method as claimed in claim 23, wherein the density value of each pixel of each uniform density pixel matrix is converted into a binary value dependent on a binary value of a corresponding pixel on another uniform density pixel matrix which has been already processed and which has a density value closest to that of the uniform density pixel matrix.

25. A method as claimed in claim 24, wherein the density value of each pixel on each uniform density pixel matrix is converted compulsively into a first value with a generated error being distributed to neighboring pixels when a corresponding pixel on a lower-closest uniform density pixel matrix, which has been already processed and which has a density value closest to and lower than that of the uniform density pixel matrix, has been converted to the first value.

26. A method as claimed in claim 25,
wherein all the uniform density pixel matrices are converted into the binary value pixel matrices successively from a lowest uniform density pixel matrix which has a minimum uniform density value, and
wherein the density values of all the pixels on the lowest uniform density pixel matrix are converted into binary values while generated errors are distributed to neighboring pixels.

27. A method as claimed in claim 24, wherein the density value of each pixel on each uniform density pixel matrix is converted compulsively into a second value with a generated error being distributed to neighboring pixels when a corresponding pixel on an upper-closest uniform density pixel matrix, which has been already processed and which has a density value closest to and higher than that of the uniform density pixel matrix, has been converted to the second value.

28. A method as claimed in claim 27,
wherein all the uniform density pixel matrices are converted into the binary value pixel matrices successively from a highest uniform density pixel matrix which has a maximum uniform density value, and
wherein the density values of all the pixels on the highest uniform density pixel matrix are converted into binary values while generated errors are distributed to neighboring pixels.

29. A method as claimed in claim 24,
wherein the density value of each pixel on each uniform density pixel matrix is converted compulsively into a first value with a generated error being distributed to neighboring pixels when both of a corresponding pixel on a lower-closest uniform density pixel matrix, which has been already processed and which has a density value closest to and lower than that of the uniform density pixel matrix, and a corresponding pixel on an upper-closest uniform density pixel matrix, which has been already processed and which has a density value closest to and higher than that of the uniform density pixel matrix, have been converted to the first value, and
wherein the density value of each pixel on each uniform density pixel matrix is converted compulsively into a second value with a generated error being distributed to neighboring pixels when both of a corresponding pixel on the lower-closest uniform density pixel matrix and a corresponding pixel on the upper-closest uniform density pixel matrix have been converted to the second value.

30. A method as claimed in claim 29,
wherein highest and lowest uniform density pixel matrices, which have maximum and minimum uniform density values, are converted into binary value pixel matrices before all the remaining uniform density pixel matrices are converted into binary value pixel matrices, and
wherein the density values of all the pixels on each of the highest and lowest uniform density pixel matrices are converted into binary values while generated errors are distributed to neighboring pixels.

31. A method as claimed in claim 29, wherein the plurality of density values are integers discretely distributed in the predetermined range, and wherein the uniform density pixel matrices are selected one by one to be subjected to the binary value conversion process so that a difference between the density values of the subject pixel matrix and of its upper-closest matrix is substantially equal to a difference between the density values of the subject pixel and of its lower-closest matrix.

32. A method as claimed in claim 31, wherein the difference between the density values of the subject pixel matrix and of its upper-closest matrix is equal to the difference between the density values of the subject pixel and of its lower-closest matrix.

33. A method as claimed in claim 5, wherein the dither matrix producing step includes the steps of:
arranging all the plurality of binary value pixel matrices in accordance with the uniform density values of their original uniform density pixel matrices from its minimum value to its highest value;
searching, at each pixel position, a binary value pixel matrix at which the first value first appears; and
determining the threshold value of an element located at each position based on a uniform density value of a uniform density pixel matrix which corresponds to a binary value pixel matrix searched at the corresponding pixel position.

34. A method as claimed in claim 5, wherein the dither matrix producing step includes the steps of:
arranging all the plurality of binary value pixel matrices in accordance with the uniform density values of their original uniform density pixel matrices from its highest value to its lowest value;
searching, at each pixel position, a binary value pixel matrix at which the second value first appears; and
determining the threshold value of an element located at each position based on a uniform density value of a uniform density pixel matrix which corresponds to a binary value pixel matrix searched at the corresponding pixel position.

35. A method as claimed in claim 1, wherein the binary value pixel matrix preparing step includes the steps of:
preparing at least two binary value pixel matrices, each of which includes a plurality of pixels having binary values;
selecting two binary value pixel matrices from the at least two binary value pixel matrices, the selected two binary value pixel matrices having different distributions of the binary values;
producing at least one new binary value pixel matrix based on the selected two binary value pixel matrices; and
producing a binary value pixel matrix group constructed from the at least two binary value pixel matrices and the produced new binary value pixel matrix, wherein the dither matrix producing step includes the step of determining the threshold value at each element based on the binary values of the binary value pixel matrices in the binary value pixel matrix group at a corresponding pixel.

36. A method as claimed in claim 35, wherein the new binary value pixel matrix producing step includes the steps of:

performing a referring pixel determination process to refer to each pixel position of each of the selected two binary value pixel matrices and to determine a binary value of the new matrix at a corresponding pixel position under a predetermined condition; and performing a remaining pixel determination process onto an undetermined pixel whose binary value is not determined through the referring pixel determination process, to thereby determine a binary value of the remaining pixel while preventing the same binary value from being concentrated around any pixels.

37. A method as claimed in claim 36, wherein the new binary value pixel matrix producing step is repeatedly performed so as to produce several new binary value pixel matrices while the produced new binary value pixel matrices are added to the at least two binary value pixel matrices, thereby producing the binary value pixel matrix group constructed from a predetermined number of binary value pixel matrices.

38. A method as claimed in claim 37, wherein during the remaining pixel determination process, the binary states of the undetermined pixels, successively arranged as closest to one another, are determined alternately into first and second values.

39. A method as claimed in claim 38, wherein the remaining pixel determination process step includes the steps of:

selecting one undetermined pixel that is located closest to a predetermined position from all the undetermined pixel; and determining the binary value of the selected undetermined pixel;

repeatedly selecting another undetermined pixel that is closest to the latest-determined undetermined pixel; and determining the binary states of the thus successively-selected undetermined pixels alternately into first and second states.

40. A method as claimed in claim 39, wherein the other undetermined pixel is selected as closest to the latest-determined undetermined pixel along a predetermined spiral direction.

41. A method as claimed in claim 39, wherein the other undetermined pixel is selected as closest to the latest-determined undetermined pixel, the selected pixel having the smallest linear distance from the latest-determined undetermined pixel with respect to all the directions.

42. A method as claimed in claim 39, wherein the other undetermined pixel is selected as closest to the latest-determined undetermined pixel along the predetermined spiral direction when the total number of the undetermined pixels is higher than a predetermined number, and wherein the other undetermined pixel is selected as having the smallest linear distance from the latest-determined undetermined pixel with respect to all the directions when the total number of the undetermined pixels becomes equal to or smaller than the predetermined number.

43. A method as claimed in claim 1, wherein the at least two binary value pixel matrices include a first matrix whose pixels all have the first values, a third matrix whose pixels all have the second values, and a second matrix which have pixels of both the first and second values, the first through third pixels being arranged in this order or in a reverse order, and wherein two adjacent matrices are selected from the arranged three matrices, the selected two matrices being referred to during the referring pixel determination process, the new matrix, whose binary values are determined through the referring pixel determination process and the remaining pixel determination process, being located between the selected two matrices, whereby the binary value pixel matrix group is produced.

44. A method as claimed in claim 43, wherein the total number of the pixels of the first value in the second matrix is almost a half of the total number of the pixels in the second matrix.

45. A method as claimed in claim 43, wherein the second matrix is produced through subjecting a uniform density matrix, whose pixels have all the same pixel densities, to a binary conversion process for converting the density values of the pixels into binary values while distributing generated errors to neighboring pixels.

46. A method as claimed in claim 45, wherein all the pixels of the uniform density matrix for producing the second matrix have either 128 or 127, and wherein a group of matrices constructed from 256 binary value pixel matrices is produced.

47. A method as claimed in claim 46, wherein during the referring pixel determination process, the binary values of the pixels in the new matrix are set in the first state when pixels of the selected two matrices are both in the first state at corresponding locations, and the binary values of the pixels of the new matrix are set in the second state when pixels of the selected two matrices are both in the second state at corresponding locations.

48. A method as claimed in claim 4, wherein the predetermined density range, in which the plurality of density values are discretely distributed, is equal to the predetermined input density range.

49. A method as claimed in claim 4, wherein the predetermined density range is defined between a minimum value and a maximum value, and wherein the minimum value is zero and the maximum value is 255.

50. A method as claimed in claim 4, wherein the plurality of density values are constructed from the number of density values which are distributed one by one from the minimum density value to the maximum density value.

51. A method as claimed in claim 4, wherein the predetermined density range is included in and smaller than the predetermined input density range.

52. A method as claimed in claim 4, wherein the predetermined density range is wider than the predetermined input density range.

53. A method as claimed in claim 1, further comprising the steps of:

setting a desired tone conversion characteristic; and converting the threshold values of the dither matrix based on the set tone conversion characteristic to produce a tone-corrected dither matrix.

54. A method as claimed in claim 53, wherein the set conversion characteristic includes a plurality of tone characteristics, and wherein the threshold value of the dither matrix at each element location is converted into a plurality of threshold values with the plurality of tone characteristics.

55. A method as claimed in claim 53, wherein the total number of different threshold values provided in the dither matrix is larger than the total number of different density values distributed in the predetermined input density range.

56. A method as claimed in claim 53, wherein the total number of the different threshold values provided in the tone-corrected dither matrix is equal to or smaller than the total number of different density values distributed in the predetermined input density range.

57. A method as claimed in claim 53, wherein the dither matrix includes a plurality of threshold values in correspondence with each element.

58. A method of converting an input continuous tone image into a pseudo-halftone image, the method comprising the steps of:
   preparing a plurality of binary value pixel matrices, each of which includes a plurality of pixels which are arranged two-dimensionally and which have binary values;
   producing a dither matrix constructed from a plurality of elements which are arranged two-dimensionally, each of the plurality of elements having a threshold value which is determined based on the binary values of the plurality of binary value pixel matrices at corresponding pixels;
   comparing input continuous tone image data representative of each pixel of the input continuous tone image with a threshold value of the dither matrix at a corresponding location; and
   determining, based on the compared result, pseudo-halftone image data representative of each pixel of a pseudo-halftone image.

59. A method as claimed in claim 58, wherein the dither matrix has a plurality of threshold element columns each extending in an auxiliary scanning direction, wherein the comparing step includes the step of deforming the dither matrix so that the threshold element columns are shifted from one another in the auxiliary scanning direction, whereby upper and lower ends of the plurality of threshold element columns are shifted from one another in the auxiliary scanning direction.

60. A method as claimed in claim 58, further comprising the steps of:
   setting a desired tone conversion characteristic; and
   converting the threshold values of the dither matrix based on the set tone conversion characteristic to produce a tone-corrected dither matrix, the comparing step using the tone-corrected dither matrix.

61. A method as claimed in claim 60, wherein the set conversion characteristic includes a plurality of tone characteristics, and wherein the threshold value of the dither matrix at each element location is converted into a plurality of threshold values with the plurality of tone characteristics, the input continuous tone image being converted into a pseudo-halftone image with the tone-converted dither matrix, the pseudo-halftone image being constructed from a plurality of tone levels, the number of which corresponds to the number of the plurality of tone characteristics.

62. A tone conversion device for converting tone of input image data, the device comprising:
   first memory means for storing a plurality of values in correspondence with a plurality of recording dot locations;
   tone setting means for setting a conversion characteristic;
   tone conversion means for converting the values stored in the first memory means based on the conversion characteristic set by the tone setting means;
   second memory means for storing the values converted by the tone conversion means;
   comparison means for comparing image data with the values stored in the second memory means; and
   output means for outputting record signals for the plurality of recording dot locations based on the comparison results.

63. A device as claimed in claim 62, wherein the total number of different values stored in the first memory means is greater than the total number of different tone levels reproducible by the input image data.

64. A device as claimed in claim 62, wherein the total number of different values stored in the second memory means is equal to or smaller than the total number of different tone levels reproducible by the input image data.

65. A device as claimed in claim 62, wherein the second memory means stores a plurality of values in correspondence with each of the plurality of recording dot locations.

66. A device as claimed in claim 65, wherein the conversion characteristic set by the tone setting means includes a plurality of tone characteristics, and wherein the plurality of values, stored in the second memory means in correspondence with each of the plurality of recording dot locations, are obtained through converting the values stored in the first memory means with the plurality of tone characteristics set by the tone setting means.

67. A device as claimed in claim 65, further comprising third memory means for storing a plurality of values in correspondence with the plurality of recording dot locations, the values being different from those stored in the first memory means, and wherein the plurality of values, stored in the second memory means in correspondence with each of the plurality of recording dot locations, are obtained through converting the values stored in the first and third memory means by the tone conversion means.

68. A method as claimed in claim 1, wherein the dither matrix producing process produces a dither matrix through calculating a threshold, to be located on each of the plurality of elements, based on the binary values of the plurality of binary value pixel matrices at corresponding pixels without changing the binary values of the binary value pixel matrices.

69. A method as claimed in claim 1, wherein the binary value pixel matrices preparing step includes the steps of:
   preparing at least two uniform density pixel matrices for at least two density values, the at least two density values being distributed discretely in a predetermined density range, each of the at least two uniform density pixel matrices having a plurality of pixels which are arranged two-dimensionally and which have density values equal to the corresponding density value;
   producing at least two binary value pixel matrices, each of which includes the plurality of pixels which are two-dimensionally arranged and have binary values, based on the at least two uniform density pixel matrices; and
   additionally producing at least one binary value pixel matrix, each of which includes a plurality of pixels which are two-dimensionally arranged and have binary values, based on at least one of the at least two binary value pixel matrices and at least one additional uniform density pixel matrix for at least one additional uniform density value, the additional uniform density value being in the predetermined density range, each of the at least one additional uniform density pixel matrix having a plurality of pixels which are arranged two-dimensionally and which have density values equal to the corresponding additional density value.

70. A method as claimed in claim 5, wherein the binary conversion process subjecting step includes a step of subjecting, pixel one by one, all the pixels of each uniform density pixel matrix to an error diffusion method to convert the density value of each pixel into a binary value while distributing an error, generated when each pixel is processed, to neighboring pixels not yet processed.

71. A method as claimed in claim 5, wherein the binary conversion process subjecting step includes a step of subjecting, pixel one by one, all the pixels of each uniform density pixel matrix to a minimized average error method, in which the density value of each pixel is added with fractional portions of binary-conversion errors, which have been generated when neighboring pixels are processed, and is converted into a binary value.

72. A method as claimed in claim 53, wherein the tone conversion characteristic setting step includes the step of enabling a user to set his/her desired tone conversion characteristic, the converting step converting the threshold values of the dither matrix based on the set tone conversion characteristic to produce a tone-corrected dither matrix.

73. A tone conversion device as claimed in claim 62, wherein the tone setting means enables a user to set his/her desired conversion characteristic, the tone conversion means converting the values based on the set conversion characteristic.

* * * * *